US011611989B2

(12) United States Patent
Kim et al.

(10) Patent No.: US 11,611,989 B2
(45) Date of Patent: Mar. 21, 2023

(54) METHOD AND APPARATUS FOR EXTENDING COVERAGE IN COMMUNICATION SYSTEM

(71) Applicant: ELECTRONICS AND TELECOMMUNICATIONS RESEARCH INSTITUTE, Daejeon (KR)

(72) Inventors: Cheul Soon Kim, Daejeon (KR); Jae Heung Kim, Daejeon (KR); Sung Hyun Moon, Daejeon (KR); Jung Hoon Lee, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 72 days.

(21) Appl. No.: 17/347,662

(22) Filed: Jun. 15, 2021

(65) Prior Publication Data

US 2021/0392679 A1 Dec. 16, 2021

(30) Foreign Application Priority Data

| Jun. 16, 2020 | (KR) | 10-2020-0072735 |
| Jun. 26, 2020 | (KR) | 10-2020-0078646 |
| Oct. 15, 2020 | (KR) | 10-2020-0133809 |
| Oct. 30, 2020 | (KR) | 10-2020-0143666 |
| Nov. 11, 2020 | (KR) | 10-2020-0150548 |
| Jan. 18, 2021 | (KR) | 10-2021-0007102 |
| Apr. 9, 2021 | (KR) | 10-2021-0046728 |
| May 10, 2021 | (KR) | 10-2021-0060352 |
| Jun. 10, 2021 | (KR) | 10-2021-0075293 |

(51) Int. Cl.
*H04W 74/00* (2009.01)
*H04W 74/08* (2009.01)
*H04W 72/14* (2009.01)
*H04W 24/10* (2009.01)
*H04W 72/1268* (2023.01)
*H04W 72/04* (2023.01)

(52) U.S. Cl.
CPC ......... *H04W 74/008* (2013.01); *H04W 24/10* (2013.01); *H04W 72/042* (2013.01); *H04W 72/1268* (2013.01); *H04W 72/14* (2013.01); *H04W 74/0833* (2013.01)

(58) Field of Classification Search
None
See application file for complete search history.

(56) References Cited

U.S. PATENT DOCUMENTS

2017/0141833 A1* 5/2017 Kim ................. H04L 5/0057
2019/0342921 A1 11/2019 Loehr et al.
(Continued)

FOREIGN PATENT DOCUMENTS

WO 2015/095560 A1 6/2015
WO 2020/096330 A1 5/2020

*Primary Examiner* — Hong S Cho
(74) *Attorney, Agent, or Firm* — Rabin & Berdo, P.C.

(57) ABSTRACT

An operation method of a terminal in a communication system may comprise receiving first random access (RA) configuration information and second RA configuration information from a base station; transmitting a Msg1 to the base station based on the second RA configuration information; receiving a Msg2, which is a response to the Msg1, from the base station; and repeatedly transmitting a Msg3 K times to the base station.

20 Claims, 29 Drawing Sheets

(56) References Cited

U.S. PATENT DOCUMENTS

| | | |
|---|---|---|
| 2020/0037347 A1 | 1/2020 | Yang et al. |
| 2020/0044781 A1 | 2/2020 | Rudolf et al. |
| 2020/0100297 A1 | 3/2020 | Agiwal et al. |
| 2020/0136781 A1 | 4/2020 | Yi et al. |
| 2020/0154469 A1 | 5/2020 | Chin et al. |
| 2020/0162208 A1 | 5/2020 | Moon et al. |
| 2020/0367295 A1 * | 11/2020 | Zhao ................. H04W 74/0833 |

* cited by examiner

FIG. 28

| | | | | | | | | |
|---|---|---|---|---|---|---|---|---|
| R | TA command | | | | | | | octet 1 |
| TA command | | | | | UL grant | | | octet 2 |
| UL grant | | | | | | | | octet 3 |
| UL grant | | | | | | | | octet 4 |
| UL grant | | | | | | | | octet 5 |
| TC-RNTI | | | | | | | | octet 6 |
| TC-RNTI | | | | | | | | octet 7 |

METHOD AND APPARATUS FOR EXTENDING COVERAGE IN COMMUNICATION SYSTEM

CROSS-REFERENCE TO RELATED APPLICATIONS

This application claims priority to Korean Patent Applications No. 10-2020-0072735 filed on Jun. 16, 2020, No. 10-2020-0078646 filed on Jun. 26, 2020, No. 10-2020-0133809 filed on Oct. 15, 2020, No. 10-2020-0143666 filed on Oct. 30, 2020, No. 10-2020-0150548 filed on Nov. 11, 2020, No. 10-2021-0007102 filed on Jan. 18, 2021, No. 10-2021-0046728 filed on Apr. 9, 2021, No. 10-2021-0060352 filed on May 10, 2021, and No. 10-2021-0075293 filed on Jun. 10, 2021 with the Korean Intellectual Property Office (KIPO), the entire contents of which are hereby incorporated by reference.

BACKGROUND

1. Technical Field

The present disclosure relates to a technique of coverage extension in a communication system, and more specifically, to a technique of coverage extension for an uplink signal and/or channel.

2. Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

Meanwhile, in order to decrease an error rate of data, a lower modulation and coding scheme (MCS) may be used. In order to prevent the size of a field indicating the MCS in downlink control information (DCI) from becoming too large, frequently-used MCSs may be selectively used. If it is required to apply a lower MCS, repeated transmission may be used. If a quadrature phase shift keying (QPSK) scheme, which is the lowest modulation order, is used in the repeated transmission, the effect of further lowering a code rate may be achieved. In particular, since a transmit power is restricted in case of uplink, repeated transmission in the time domain may be utilized rather than repeated transmission in the frequency domain.

A low MCS may be used for eMBB traffic and URLLC traffic supported by the 5G system (e.g., NR system). The purpose of using a low MCS for the eMBB traffic may be different from the purpose of using a low MCS for the URLLC traffic. For example, in order to extend a coverage of the eMBB traffic, a lower MCS may be needed. A lower MCS may be needed to reduce a latency of the URLLC traffic and achieve a lower error rate. Since requirements of the eMBB traffic are different from those of the URLLC traffic, the eMBB traffic may be repeatedly transmitted despite a relatively long latency. On the other hand, in case of the URLLC traffic, new MCS(s) may be introduced rather than the repeated transmission, and the new MCS(s) may be indicated by radio resource control (RRC) signaling and/or DCI signaling.

In order to support repeated transmission of the eMBB traffic in the time domain, a physical uplink shared channel (PUSCH) repetition (e.g., PUSCH repetition type A) may be introduced. When the PUSCH repetition is used, a PUSCH allocated on a slot basis (e.g., PUSCH mapping type A) may be repeatedly transmitted. In order to extend a coverage of the PUSCH, a time resource including a plurality of slots may be allocated. When DCI signaling (e.g., type 2 configured grant (CG), dynamic grant) and/or RRC signaling (e.g., type 1 CG) is used, time resource allocation may include only a time resource for transmission in in the first slot. In this case, the time resource of the PUSCH repetition type A may be determined by indicating the number of repetitions (e.g., the number of repeated transmissions) through RRC signaling.

When the repeated transmission of the URLLC traffic is performed, it may not be appropriate to repeatedly transmit the URLLC traffic because a latency occurs. However, when a low MCS is used for transmission of the URLLC traffic, a latency for decoding may be reduced. When a low MCS is used, the number of resource elements (REs) for transmission of the URLLC traffic may increase, and accordingly, a base station (e.g., a decoder of the base station) may wait until all the REs are received. Accordingly, the latency for decoding the URLLC traffic may be reduced.

When a PUSCH is repeatedly transmitted using a high MCS, the base station may perform a decoding operation with only a few REs. The first successful decoding time may be faster than a case where a lower MCS is applied to a single transmission. Since an unnecessary latency occurs when the PUSCH repetition type A is used, a PUSCH repetition type B may be introduced to reduce the latency for the repeated transmission. When the PUSCH repetition type B is used, a PUSCH allocated on a mini-slot basis (e.g., PUSCH mapping type B) may be repeatedly transmitted. When DCI signaling (e.g., type 2 CG, dynamic grant) and/or RRC signaling (e.g., type 1 CG) is used, a combination of a reference time resource of one PUSCH instance and the number of repetitions may be indicated. Time resources of the PUSCH repetition type B may be determined based on the above-described combination. A technique for extending a coverage of the aforementioned signal and/or channel (e.g., PUSCH) may be required.

SUMMARY

Accordingly, exemplary embodiments of the present disclosure are directed to providing a method and an apparatus for extending coverage of a signal and/or channel in a communication system.

According to a first exemplary embodiment of the present disclosure, an operation method of a terminal in a communication system may comprise: receiving first random access (RA) configuration information and second RA configuration information from a base station; transmitting a Msg1 to the base station based on the second RA configuration information; receiving a Msg2, which is a response to the Msg1, from the base station; and repeatedly transmitting a Msg3 K times to the base station, wherein a first condition is satisfied, the Msg3 is not repeatedly transmitted in a first RA procedure according to the first RA configuration information, the second RA configuration information is used when the first condition is not satisfied, the Msg3 is repeatedly transmitted in a second RA procedure according to the second RA configuration information, and K is a natural number.

The operation method may further comprise, before the transmitting of the Msg1, transmitting information indicating whether the terminal supports repeated transmission of the Msg3 to the base station.

A first RA preamble indicated by the first RA configuration information may be distinguished from a second RA preamble indicated by the second RA configuration information, and the Msg1 may be generated based on the second RA preamble.

A first physical random access channel (PRACH) occasion indicated by the first RA configuration information may be the same as a second PRACH occasion indicated by the second RA configuration information, and the Msg1 according to the second RA configuration information may be distinguished from a Msg1 according to the first RA configuration information by a PRACH mask.

The first condition may be a case in which a measurement result of a signal received from the base station exceeds a threshold, and the threshold may be included in at least one of system information, the first RA configuration information, and the second RA configuration information.

The second RA configuration information may include information indicating K.

The number of start and length indicator values (SLIVs) included in a time domain resource assignment (TDRA) table referenced by an uplink (UL) grant included in the Msg2 may indicate K.

K may be indicated by an index included in a TDRA table referenced by a UL grant included in the Msg2.

A UL grant included in the Msg2 may include information indicating a TDRA table used for repeated transmission of the Msg3, and the TDRA table may include information indicating K.

K may be determined based on the number of valid slots in which repeated transmission of the Msg3 is possible.

The operation method may further comprise receiving downlink control information (DCI) including information indicating K from the base station, wherein the Msg3 may be repeatedly transmitted according to K indicated by the DCI.

According to a second exemplary embodiment of the present disclosure, an operation method of a base station in a communication system may comprise: generating first random access (RA) configuration information used when a first condition is satisfied; generating second RA configuration information used when the first condition is not satisfied; transmitting the first RA configuration information and the second RA configuration information to a terminal; receiving a Msg1 from the terminal based on the second RA configuration information; transmitting a Msg2, which is a response to the Msg1, to the terminal; and repeatedly receiving a Msg3 K times from the terminal, wherein the Msg3 is not repeatedly transmitted in a first RA procedure according to the first RA configuration information, the Msg3 is repeatedly transmitted in a second RA procedure according to the second RA configuration information, and K is a natural number.

The operation method may further comprise, before the receiving of the Msg1, receiving information indicating whether the terminal supports repeated transmission of the Msg3 from the terminal.

A first RA preamble indicated by the first RA configuration information may be distinguished from a second RA preamble indicated by the second RA configuration information, and the Msg1 may be generated based on the second RA preamble.

A first physical random access channel (PRACH) occasion indicated by the first RA configuration information may be the same as a second PRACH occasion indicated by the second RA configuration information, and the Msg1 according to the second RA configuration information may be distinguished from a Msg1 according to the first RA configuration information by a PRACH mask.

The first condition may be a case in which a measurement result of a signal received from the base station exceeds a threshold, and the threshold may be included in at least one of system information, the first RA configuration information, and the second RA configuration information.

The second RA configuration information may include information indicating K.

The number of start and length indicator values (SLIVs) included in a time domain resource assignment (TDRA) table referenced by an uplink (UL) grant included in the Msg2 may indicate K.

A UL grant included in the Msg2 may include information indicating a TDRA table used for repeated transmission of the Msg3, and the TDRA table may include information indicating K.

K may be determined based on the number of valid slots in which repeated transmission of the Msg3 is possible.

According to the present disclosure, a base station may inform a terminal of the number of Msg3 repetitions for a random access (RA) procedure. The terminal may identify the number of Msg3 repetitions based on the information received from the base station, and may repeatedly transmit a Msg3. When the Msg3 is repeatedly transmitted, a coverage of the Msg3 may be extended. Accordingly, the RA procedure between the base station and the terminal can be efficiently performed, and the performance of the communication system can be improved.

BRIEF DESCRIPTION OF DRAWINGS

FIG. 28 is a conceptual diagram illustrating a first exemplary embodiment of a MAC random access response (RAR) or fallback RAR.

DETAILED DESCRIPTION OF THE EMBODIMENTS

Figure 1:
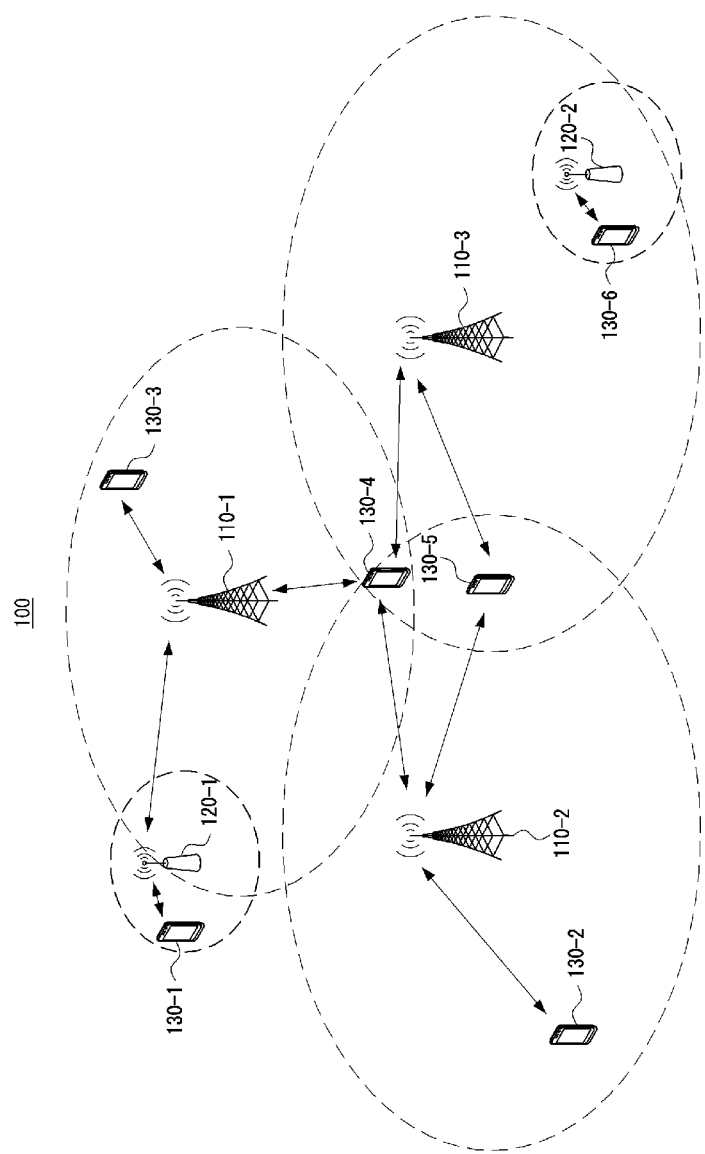
FIG. 1 is a conceptual diagram illustrating a first exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-TDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
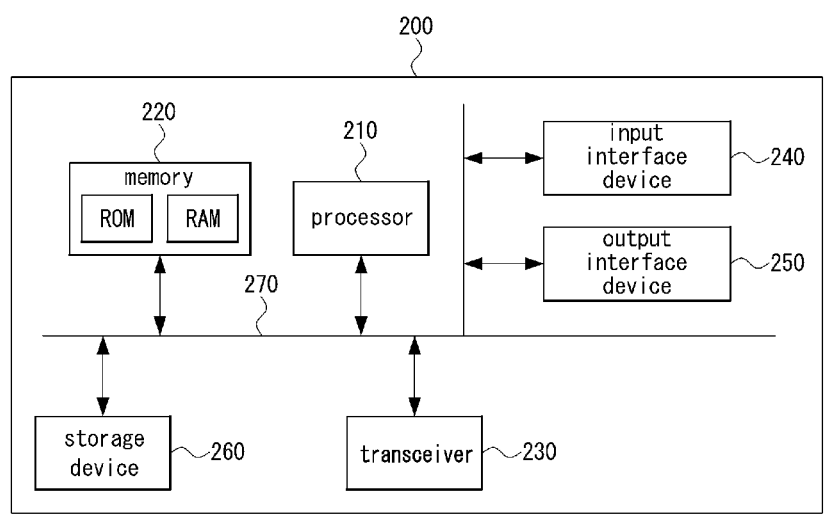
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each of the components included in the communication node 200 may not be connected to the processor 210 not through the common bus 270 but through an individual interface or an individual bus. For example, the processor 210 may be connected to at least one of the memory 220, the transceiver 230, the input interface device 240, the output interface device 250, and the storage device 260 through a dedicated interface(s).

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in the communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Chapter 2 Methods for Extending a Coverage of a Physical Uplink Shared Channel (PUSCH)

2.1 Methods for Enhancement in Spatial Domain

When a coverage of a PUSCH is not wide enough, it may be preferable to allocate resources so that a multiplexing gain for the PUSCH at a base station is improved. The multiplexing gain may be achieved by performing spatial multiplexing and/or pre-processing.

2.1.1 Codebook-Based Transmission Method

A set of precoding matrix indicators (PMIs) that a base station can indicate to a terminal may be restricted according to capability of the terminal (i.e., UE capability). For example, the base station may indicate (e.g., set) one or more among fullyAndPartialAndNonCoherent, partialAndNonCoherent, or nonCoherent to the terminal using higher layer signaling. The terminal may identify the information indicated by the higher layer signaling. When fullyAndPartialAndNonCoherent is indicated, the terminal may perform coherent transmission between all antenna ports. When partialAndNonCoherent is indicated, the terminal may not perform coherent transmission between antenna port pairs, but may perform coherent transmission between antenna ports belonging to an antenna port pair. When nonCoherent is indicated, the terminal may not perform coherent transmission for each antenna port. Accordingly, the base station may not allocate a specific PMI depending on capability of the terminal. That is, when the maximum rank that the terminal can support, the maximum number of antenna ports that the terminal can support, and/or UE capability are indicated by RRC signaling, transmitted precoding matrix indicator (TPMI) index(es) indicated to the terminal may be restricted to some of TPMI indexes defined in the technical specification.

For example, the maximum rank indicated to the terminal may be 1, and the number (e.g., the maximum number) of antenna ports indicated to the terminal may be 2. In this case, communication between the terminal and the base station may be performed based on Table 1 below. The TPMI (e.g., TPMI index) used by the terminal may be determined based on a value of a field included in uplink-downlink control information (UL-DCI). The UL-DCI may be a DCI including information element(s) for uplink communication. In exemplary embodiments, the TPMI may refer to a TPMI index.

TABLE 1

| Bit field mapped to index | codebookSubset = fullyAndPartialAndNonCoherent | Bit field mapped to index | codebookSubset = nonCoherent |
| --- | --- | --- | --- |
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

A value of the TPMI index may be indicated by Table 2 below. When fullyAndPartialAndNonCoherent is indicated by RRC signaling, the terminal may know in advance that the TPMI is selected from among TPMIs 0, 1, 2, 3, 4, and 5. When noncoherent is indicated by RRC signaling, the terminal may know in advance that the TPMI is selected from the TPMIs 0 and 1.

TABLE 2

| TPMI index | W (ordered from left to right in increasing order of TPMI index) |
| --- | --- |
| 0-5 | $\frac{1}{\sqrt{2}}\begin{bmatrix}1\\0\end{bmatrix} \quad \frac{1}{\sqrt{2}}\begin{bmatrix}0\\1\end{bmatrix} \quad \frac{1}{\sqrt{2}}\begin{bmatrix}1\\1\end{bmatrix} \quad \frac{1}{\sqrt{2}}\begin{bmatrix}1\\-1\end{bmatrix} \quad \frac{1}{\sqrt{2}}\begin{bmatrix}1\\j\end{bmatrix} \quad \frac{1}{\sqrt{2}}\begin{bmatrix}1\\-j\end{bmatrix} \quad - \quad -$ |

When a PUSCH (e.g., PUSCH resource) is allocated by a UL-DCI, the UL-DCI may include one TPMI. That is, the UL-DCI may indicate one TPMI to the terminal. When a PUSCH (e.g., PUSCH resource) is allocated by RRC signaling (or when a PUSCH is activated by a DCI), the RRC signaling may include one TPMI. That is, RRC signaling may indicate one TPMI to the terminal.

Method 2.1-1: A TPMI indicated by a base station may be applied to the first PUSCH instance belonging to a PUSCH occasion.

When two or more PUSCH instances are configured in a PUSCH occasion, two or more TPMIs may be implicitly indicated to the terminal. According to Method 2.1-1, since the TPMI indicated by the base station is applied to the first PUSCH instance, the terminal may derive a TPMI applied in a PUSCH instance after the first PUSCH instance.

The terminal may support only specific TPMIs according to its capability. Therefore, a set from which the TPMI is derived may be determined according to the capability of the terminal. The set from which the TPMI is derived may have the same number of antenna ports and layers as the TPMI indicated to the terminal. The terminal may sequentially select a TPMI from the above-described set, and may transmit a PUSCH instance using the selected TPMI.

Method 2.1-2: In a set of derived TPMIs, TPMI indexes may be sequentially applied to the PUSCH instances.

For example, the maximum rank indicated to the terminal may be 1, and the number (e.g., the maximum number) of antenna ports indicated to the terminal may be 2. The terminal may derive TPMIs from Table 1 and/or Table 2. When fullyAndPartialAndNonCoherent is indicated by RRC signaling, a set of TPMIs may include the TPMIs 0, 1, 2, 3, 4, and 5. When the TPMI index indicated to the terminal is 3, the TPMI 3 may be applied to the first PUSCH instance based on Method 2.1-1. In PUSCH instance(s) after the first PUSCH instance, the TPMIs 4, 5, 0, 1, 2, and the like may be sequentially applied based on Method 2.1-2. When noncoherent is indicated by RRC signaling, the set of TPMIs may include the TPMIs 0 and 1. When the TPMI index indicated to the terminal is 1, the TPMI 1 may be applied to the first PUSCH instance based on Method 2.1-1. In PUSCH instance(s) after the first PUSCH instance, the TPMIs 0, 1, 0, 1, and the like may be sequentially applied based on Method 2.1-2.

Method 2.1-3: A TPMI index indicated by a base station may be applied to all PUSCH instances. For example, the TPMI index indicated to a terminal may be equally applied to all PUSCH instances belonging to a PUSCH occasion.

Meanwhile, a method of applying TPMIs may be indicated to the terminal by RRC signaling. Based on one value indicated by RRC signaling, one TPMI indicated to the terminal may be applied to all PUSCH instances. Based on a different value indicated by RRC signaling, a different TPMI may be applied to each PUSCH instance. For example, one TPMI indicated to the terminal may be applied to the first PUSCH instance, and TPMIs according to a predefined order may be applied to PUSCH instance(s) after the first PUSCH instance.

2.2 Methods for Enhancement in Demodulation-Reference Signal (DM-RS)

A base station may estimate a channel by using a PUSCH DM-RS to decode a PUSCH. In order to widen a coverage of the PUSCH, it may be preferable for the base station to estimate the channel using all DM-RSs belonging to the PUSCH. When a terminal does not have mobility or when the terminal has little mobility, a change in a channel experienced by the base station may not be large. According to the technical specification, when PUSCH instances are different (or frequency hops are different in the same PUSCH instance), it may not be necessary for the terminal to guarantee a phase continuity. The base station may estimate a channel by using a DM-RS (e.g., PUSCH DM-RS) belonging to a frequency hop unit of the PUSCH instance.

When a PUSCH occasion is transmitted in a plurality of slots, the base station may improve a quality of channel estimation by using all DM-RSs. When an interval between PUSCH instances belonging to the PUSCH occasion is a slot or a mini-slot, it may be preferable to utilize both a DM-RS belonging to one PUSCH instance and DM-RSs belonging to adjacent PUSCH instances.

Method 2.2-1: By RRC signaling, a terminal may transmit DM-RS(s) so that the DM-RS(s) belonging to frequency hop(s) of PUSCH instance(s) using the same frequency resource among one or more PUSCH instances have a phase continuity or phase coherence.

The DM-RS may have a power continuity (or power coherence) as well as a phase continuity (or phase coherence). This is because, if the DM-RS does not have a power continuity, it may be difficult to have a phase continuity due to nonlinear characteristics of a power amplifier. The nonlinear characteristics may be caused by a change in an amplitude amplified in the power amplifier (e.g., the amplitude changing by more than a preset threshold). The power continuity may mean that the amplitude amplified in the power amplifier is kept constant.

In order to maintain independent phase/power continuity per slot or per nominal PUSCH instance, the meaning of the DM-RS antenna port needs to be extended. When DM-RS antenna ports are the same in two resource elements (REs), channels may be derived from each other.

In the absence of separate RRC signaling, even when DM-RS antenna ports for different PUSCH instances in the same slot or in different slots are the same, the terminal may generate PUSCH instances independent of each other. When separate RRC signaling is performed (e.g., when Method 2.2-1 is used), the terminal may maintain phase/power continuity in all or some PUSCH instances belonging to the PUSCH occasion.

For convenience of description, a value of the DM-RS transmitted by the terminal may be defined as $x[i] \in \mathbb{C}$, and a channel response thereof may be defined as $h \in \mathbb{C}$. In this case, a signal received by the base station may be defined as $y[i] = h \cdot x[i] + n[i] \in \mathbb{C}$. Here, $n \in \mathbb{C}$ may be a noise, and i may be an index of a PUSCH instance. When the terminal is located in an edge region and the channel response hardly changes for all PUSCH instances (e.g., i), a joint estimation operation may be applied. For j satisfying j≠i, phases and powers (e.g., amplitudes) in the DM-RSs may be the same for a joint estimation operation between a PUSCH instance j and a PUSCH instance i. Alternatively, when the phases and powers of the DM-RSs are different, the base station may know the values of the different phases and powers of the DM-RSs, and may perform a compensation operation based on the values. Otherwise, values of effective channels may be estimated differently. This may be expressed as $x[j]=x[i] \cdot m \cdot e^{\phi\sqrt{-1}}$. Therefore, the terminal may maintain $m=1$, $\phi=0$. Alternatively, the terminal may apply a value set between the terminal and the base station so that the base station can compensate for m, $\phi$. It may be preferable for the terminal to maintain the phase and amplitude so that a separate configuration between the terminal and the base station is not required.

$$y[i] = h \cdot x[i] + n[i] \qquad \text{[Equation 1]}$$
$$y[i] = h \cdot x[i] \cdot m \cdot e^{\phi\sqrt{-1}} + n[j] = h' \cdot x[i] + n[j],$$
$$\text{where } h' = h \cdot e^{\phi\sqrt{-1}}$$

When N frequency hops are used in a PUSCH occasion, K (nominal) PUSCH instances may be transmitted. In this case, for all PUSCH instances transmitted in a frequency hop n (n=1, 2, ..., N), DM-RSs may be generated to have a phase continuity. Here, the PUSCH instances share the frequency hop n, but may be transmitted apart from each other in time.

For example, a method of transmitting the DM-RS may be indicated to the terminal by RRC signaling. Based on one value indicated by RRC signaling, the DM-RSs for the respective frequency hops of the PUSCH instances belonging to the PUSCH occasion need not have a phase continuity. Based on another value indicated by RRC signaling, when the PUSCH instances belonging to the PUSCH occasion belong to the same frequency hop, DM-RSs for the same frequency hop may be generated to have a phase continuity.

Method 2.2-2: In order to generate (nominal) PUSCH instance(s) having the same phase/power continuity, a terminal may consider the corresponding PUSCH instance(s) as one extended PUSCH instance, and generate the extended PUSCH instance. Here, the extended PUSCH instance may include (nominal) PUSCH instance(s) corresponding to the entire PUSCH occasion or a part of the PUSCH occasion.

For example, when a PUSCH repetition type A is indicated, a case in which K nominal PUSCH instances are transmitted in K slots may be considered. In the K slots, according to the existing method, the terminal may generate nominal PUSCH instance(s) independently, and the base station may not utilize DM-RS(s) of the nominal PUSCH instance(s) for a joint estimation operation. When Method 2.2-2 is used, K nominal PUSCH instances may be considered as a virtual nominal PUSCH instance (e.g., extended PUSCH instance) into which they are concatenated in the time domain. The terminal may jointly perform DM-RS generation and mapping for the extended PUSCH instance. Here, the number of PUSCH instance(s) belonging to the extended PUSCH instance may be K or K or less. For example, the extended PUSCH instance(s) may be transmitted in consecutive slots.

Figure 3:
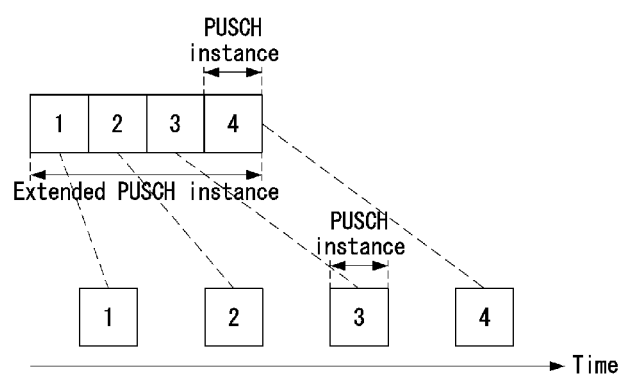
FIG. 3 is a conceptual diagram illustrating a first exemplary embodiment to which a PUSCH repetition type A is applied.

FIG. 3 is a conceptual diagram illustrating a first exemplary embodiment to which a PUSCH repetition type A is applied.

Referring to FIG. 3, PUSCH instance(s) may belong to a PUSCH occasion, the PUSCH instance(s) may be generated in an extended PUSCH instance, and then a PUSCH repetition type A may be applied. Four PUSCH instances constituting a PUSCH occasion may be generated to maintain a phase/power continuity. The terminal may consider four PUSCH instances as one extended PUSCH instance, and may configure the four PUSCH instances to have the same phase/power.

Method 2.2-3: In Method 2.2-2, a terminal may consider a front loaded DM-RS of the first PUSCH instance of an extended PUSCH instance as a front loaded DM-RS of the extended PUSCH instance. In addition, the terminal may consider an additional DM-RS of the first PUSCH instance and front loaded DM-RS(s) and additional DM-RS(s) of the remaining PUSCH instance(s) as additional DM-RS(s) of the extended PUSCH instance.

In addition, coded data (e.g., uplink-shared channel (UL-SCH) or uplink control information (UCI)) may be jointly applied to the extended PUSCH instance. Alternatively, the coded data may be applied separately (e.g., for each slot or nominal PUSCH instance). This operation may be interpreted as performing a rate matching operation based on the nominal PUSCH instance or the extended PUSCH instance.

Method 2.2-4: In Method 2.2-2, a terminal may derive a transport block (TB) size for an extended PUSCH instance from one reference PUSCH instance or reference PUSCH instance(s), and coded data or coded UCI (or, extended UCI) having a different redundancy version (RV) may be mapped to each PUSCH instance or PUSCH instance(s).

For example, for a PUSCH instance 1 shown in FIG. 3, mapping may be performed from coded data having an RV a in a circular buffer, and for a PUSCH instance 2 shown in FIG. 3, mapping may be performed from coded data having an RV b in the circular buffer. This operation may be regarded as applying Method 2.2-4. Accordingly, the terminal may perform the DM-RS generation operation based on the extended PUSCH instance, but may perform the data/UCI mapping operation based on the PUSCH instance.

Method 2.2-5: In Method 2.2-2, a terminal may derive a TB size for an extended PUSCH instance from one reference PUSCH instance or reference PUSCH instance(s), and coded data or coded UCI (or, extended UCI) having an RV associated with the first PUSCH instance of the extended PUSCH instance may be newly mapped.

For example, data for the extended PUSCH instance shown in FIG. 3 may be mapped independently of the nominal PUSCH instance. When the first nominal PUSCH instance starts from the RV a, data for the extended PUSCH instance may start from coded data having the RV a in the circular buffer. Correspondence for all REs belonging to the extended PUSCH instance may be established in the circular buffer. Data/UCI may be mapped independently of the nominal PUSCH instance. Accordingly, the terminal may perform not only a DM-RS generation operation but also a data/UCI mapping operation based on the extended PUSCH instance.

In order to process the extended PUSCH instance, a larger amount of memory may be required in the terminal. Here, the memory may be distinguished from the circular buffer. A rate matching operation may be performed in the circular buffer, and after the rate matching operation, symbols resulting from a modulation operation (e.g., quadrature amplitude modulation (QAM)/phase shift keying (PSK) symbols) may be mapped to time and frequency resources. In the step of the mapping between the symbols and the physical resources, the corresponding symbols may be stored in the memory of the terminal.

The terminal may process a TB/UCI based on the extended PUSCH instance, and a result of the processing may be stored in the memory. When the memory size of the terminal is limited, configuration of the extended PUSCH instance may be restricted according to the memory size.

Method 2.2-6: Configurable combination of an extended PUSCH instance may be restricted according to capability of a terminal.

The larger the size of the TB to be transmitted in the PUSCH occasion, the more the memory of the terminal may be required. The larger the number of nominal PUSCH instances belonging to the extended PUSCH instance, the more memory may be required. In addition, as the number of PUSCH repetitions and the number of additional DM-RSs increase, the number of DM-RS symbols jointly generated by the terminal may increase. Therefore, the base station may restrict the maximum number of nominal PUSCH instances belonging to the extended PUSCH instance in consideration of the capability of the terminal.

The terminal capability for the extended PUSCH instance may be reported to the base station through higher layer signaling. Considering the size of the TB that the terminal intends to transmit in the PUSCH occasion, the number of symbols in the nominal PUSCH instance, the number of symbols in the PUSCH occasion, and/or the number of DM-RS symbols, the base station may inform the maximum number of extended PUSCH instances to the terminal through higher layer signaling. Alternatively, the maximum number of extended PUSCH instances may be defined in the technical specification. When the maximum number of extended PUSCH instances is indicated in the technical specification, the number of nominal PUSCH instances constituting the extended PUSCH instance may be determined according to the above-described condition. When the maximum number of extended PUSCH instances is indicated by higher layer signaling, the maximum number of nominal PUSCH instances may be indicated to the terminal by a scheduling DCI, activating DCI and/or RRC signaling for allocating the PUSCH occasion.

Method 2.2-7: Nominal PUSCH instances belonging to a PUSCH occasion may belong to one or more extended PUSCH instances, and the extended PUSCH instance(s) may be arranged in ascending or descending order of the size of the extended PUSCH instance(s) (e.g., the number of nominal PUSCH instances).

When the terminal is indicated to repeatedly transmit the PUSCH K times, the nominal PUSCH instance may be repeated K times. When the capability of the terminal supports a joint DM-RS estimation operation, extended PUSCH instance(s) may be configured, and the extended PUSCH instance(s) may constitute a PUSCH occasion. According to Method 2.2-6, the capability of the terminal may be further subdivided. If the capability of the terminal is sufficient, one extended PUSCH instance may be configured. If the capability of the terminal is not sufficient, two or more extended PUSCH instances may be configured. The extended PUSCH instances may include $J_1$, $J_2$, $J_3$, . . . nominal PUSCH instances, respectively. According to Method 2.2-7, '$J_1 \leq J_2 \leq J_3 \leq$ . . . ' or '$J_1 \geq J_2 \geq J_3 \geq$ . . . ' may be defined.

For example, if the PUSCH instance is repeated 4 times, according to (the capability of the terminal, the size of the TB, and/or configuration of the additional DM-RS), (the number of symbols that the nominal PUSCH instance has), or (the total number of symbols that the PUSCH occasion has), four nominal PUSCH instances may maintain phase/power continuity. Alternatively, two nominal PUSCH instances may maintain phase/power continuity to constitute one extended PUSCH instance, and the above-described number of the extended PUSCH instances may be two.

For example, if the PUSCH instance is repeated 6 times, according to (the capability of the terminal, the size of the TB, and/or configuration of the additional DM-RS), (the number of symbols that the nominal PUSCH instance has), or (the total number of symbols that the PUSCH occasion has), six nominal PUSCH instances may maintain phase/power continuity. Alternatively, four nominal PUSCH instances may constitute one extended PUSCH instance to maintain phase/power continuity, and two nominal PUSCH instances may constitute one extended PUSCH instance.

2.2.1 Method of Applying Orthogonal Cover Code (OCC) to DM-RS of PUSCH Instance

Method 2.2-8: In transmission of a PUSCH occasion, OCCs may be applied to DM-RSs of PUSCH instances.

A collective channel estimation operation (e.g., joint estimation operation) may be performed by using all DM-RSs of some or all PUSCH instance(s) belonging to a PUSCH occasion. Here, a role of OCC may be to secure a gain of multiplexing with other terminals. DM-RSs of PUSCH instances transmitted by terminals may have OCCs, and the base station may perform joint estimation for the PUSCH occasion. It may be preferable for the terminal to transmit the PUSCH occasion to have phase continuity.

The OCC may be generated by a Walsh code or a Discrete Fourier Transform (DFT) code. For convenience of description, a codeword of the OCC may be delivered to the terminal as an OCC index. The codeword of the OCC may have as many coded symbols as the length of the OCC. When the OCC is generated by the Walsh code, the coded symbol may be expressed as (−1/+1) or (0/1). When the OCC is generated by the DFT code, the coded symbol may be expressed as a complex number constituting an n-th root of unity. Here, n may be the length of the OCC.

Method 2.2-9: When Method 2.2-8 is applied, the length of the OCC given to a terminal may correspond to the number of PUSCH instances (e.g., actual PUSCH instances) in a PUSCH occasion.

The coded symbols of the OCC may be applied to DM-RS symbols belonging to the actual PUSCH instance. When two actual PUSCH instances are configured, the length of the OCC may be m. In this case, a plurality of DM-RS symbols may belong to the j-th actual PUSCH instance. The j-th coded symbol of the OCC (j=1, 2, . . . , m) may be commonly multiplied.

Figure 4:
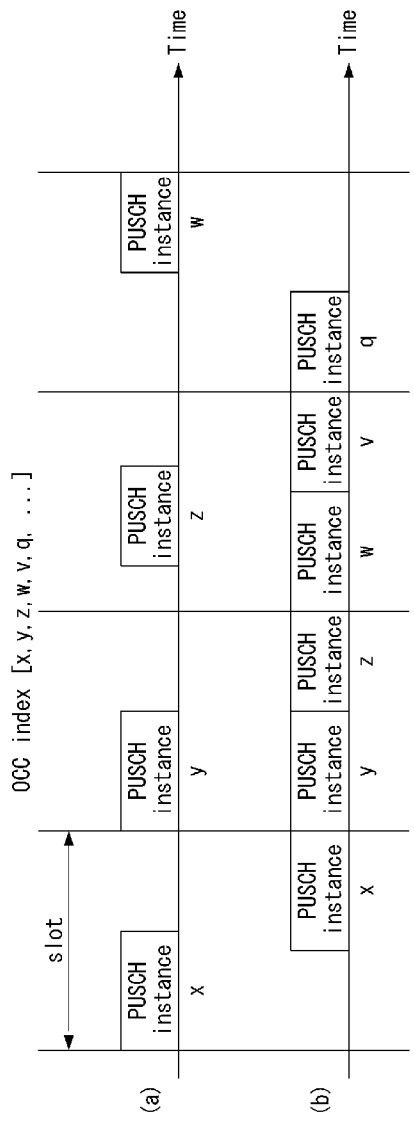
FIG. 4 is a conceptual diagram illustrating a first exemplary embodiment of a method of applying OCC on an actual PUSCH instance basis.

FIG. 4 is a conceptual diagram illustrating a first exemplary embodiment of a method of applying OCC on an actual PUSCH instance basis.

Referring to FIG. 4, an OCC may be applied to an actual PUSCH instance in a PUSCH occasion. Since the PUSCH instance is transmitted four times in a case (a) shown in FIG. 4, the length of the OCC may be 4. Since the PUSCH instance is transmitted six times in a case (b) of FIG. 4, the length of the OCC may be 6.

Method 2.2-9: When a PUCCH occasion is transmitted, the number of actual PUSCH instances may be an arbitrary natural number. When an OCC is generated by a Walsh code, it may be convenient for the length of the OCC to be defined as a power of two. Therefore, it may be preferable that the length of the OCC has a specific structure rather than an arbitrary natural number.

Method 2.2-10: When Method 2.2-8 is applied, the length of an OCC given to a terminal may correspond to the number of slots required for transmission of a PUSCH occasion.

According to a slot in which the PUSCH occasion is transmitted, the coded symbol of the OCC may be applied.

Even when a plurality of actual PUSCH instances are transmitted in one slot, the same coded symbols of the OCC may be applied.

Figure 5:
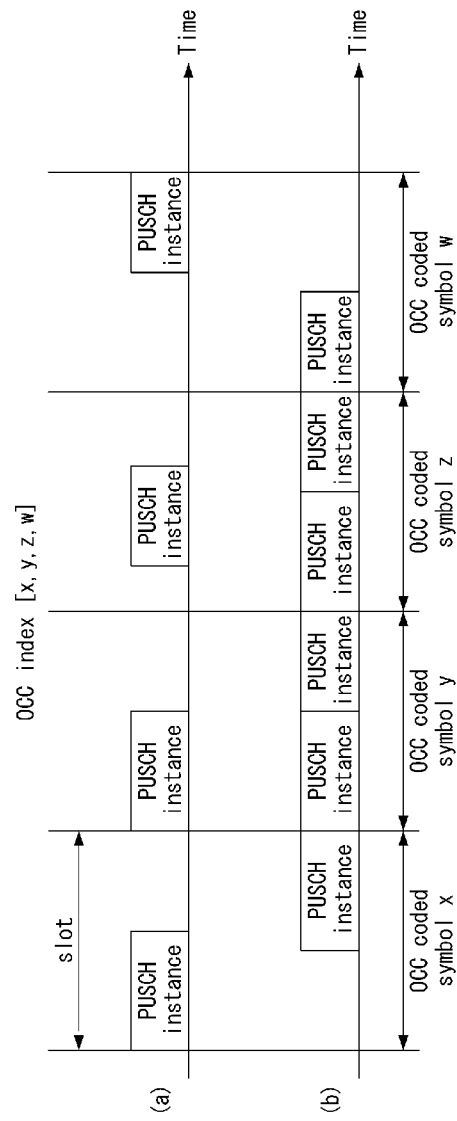
FIG. 5 is a conceptual diagram illustrating a first exemplary embodiment of a method of applying an OCC on a slot basis.

FIG. 5 is a conceptual diagram illustrating a first exemplary embodiment of a method of applying an OCC on a slot basis.

Referring to FIG. 5, the terminal may perform transmission based on Method 2.2-10. In a case (a) shown in FIG. 5, a predefined interval (e.g., a slot) may exist between PUSCH instances. In a case (b) shown in FIG. 5, there may not be an interval between PUSCH instances. Since the coded symbol of the OCC is applied to each slot, a DM-RS in the case (b) shown in FIG. 5 may be determined by applying the coded symbol of the same OCC to two or more PUSCH instances. Here, the length of the OCC may be 4. The length of the OCC may be defined as the number of slots in which the PUSCH occasion is transmitted. For example, when the PUSCH repetition type A is used, the number of repetitions may correspond to the length of the OCC. When the PUSCH repetition type B is used, the number of slots may be derived from the length of a time window. The number of slots may correspond to the length of the OCC.

2.2.2 Exemplary Embodiment of PUCCH: DM-RS

The above-described methods (e.g., exemplary embodiments) may be applied not only to PUSCH transmission but also to physical uplink control channel (PUCCH) transmission. According to a transmission method of a PUCCH occasion, a phase continuity (or phase coherence) and a power continuity (or power coherence) of a PUCCH DM-RS may be maintained.

For example, an extended PUSCH instance in a PUSCH occasion may be configured according to a TB size, but an extended PUCCH instance in a PUCCH occasion may be configured according to the amount of UCI and/or the number of symbols that the PUCCH instance has.

The capability of the terminal for an extended PUCCH instance may be reported to the base station by higher layer signaling. Considering the amount of UCI to be received from the terminal in a PUCCH occasion, the number of symbols of a PUCCH instance, the number of symbols of the PUCCH occasion, and/or the number of DM-RS symbols, the base station may inform the terminal of the maximum number of extended PUCCH instances through higher layer signaling. Alternatively, the maximum number of extended PUCCH instances may be indicated in the technical specification. When the maximum number of extended PUCCH instances is indicated in the technical specification, the number of PUCCH instances constituting the extended PUCCH instance may be determined according to the above-described condition. When the maximum number of extended PUCCH instances is indicated by higher layer signaling, the maximum number of PUCCH instances may be indicated to the terminal by a scheduling DCI, activating DCI, and/or RRC signaling that allocates the PUCCH occasion.

If the terminal is indicated to repeatedly transmit the PUCCH K times, the PUCCH instance may be repeated K times. If the capability of the terminal supports a joint DM-RS estimation operation, the PUCCH instance may be configured. The capability of the terminal may be further subdivided. If the capability of the terminal is sufficient, one extended PUCCH instance may be configured, and the extended PUCCH instance(s) may constitute a PUCCH occasion. If the capability of the terminal is not sufficient, two or more extended PUCCH instances may be configured. The extended PUCCH instances may include $J_1, J_2, J_3, \ldots$ PUCCH instances, respectively. '$J_1 \leq J_2 \leq J_3 \leq \ldots$' or '$J_1 \geq J_2 \geq J_3 \geq \ldots$' may be defined.

The terminal may transmit a PUSCH occasion. It may be indicated by the base station that the terminal transmits a PUCCH occasion. In this case, the multiplexing operation of the PUCCH and the PUSCH may be performed. If the PUCCH occasion includes one PUCCH instance and the PUCCH instance is not repeated, the PUSCH instance may overlap some symbols of the PUCCH in the time domain. In this case, in consideration of a processing time of the terminal, UCI may be multiplexed in the PUSCH instance, and the PUCCH instance may not be transmitted. That is, the UCI may be transmitted in the PUSCH instance instead of the PUCCH instance.

In some PUSCH instances belonging to the PUSCH occasion, the UCI as well as a TB may be transmitted. In this case, in order to support the joint DM-RS estimation operation, it may be preferable to maintain a transmit power and/or phase continuity regardless of the amount of the UCI in order to determine a transmit power of the extended PUSCH instance.

2.3 Methods for Enhancement in Time Domain

A base station may indicate the PUSCH repetition type A or the PUSCH repetition type B to the terminal through RRC signaling. The terminal may repeatedly transmit a PUSCH based on the PUSCH repetition type indicated by the base station. When the PUSCH repetition type A is used, the terminal may transmit one or more PUSCHs. A minimum interval between first symbols in adjacent PUSCH transmissions may be one slot. When the PUSCH repetition type B is used, the terminal may transmit two or more PUSCHs. A minimum interval between first symbols in adjacent PUSCH transmissions may be the number of symbols included in the PUSCH. The PUSCH repetition type A may be used to extend a coverage, and the terminal may perform repeated transmission according to the PUSCH repetition type A. The PUSCH repetition type B may be used to reduce an error rate and/or latency, and the terminal may perform repeated transmission according to the PUSCH repetition type B. For convenience of description, a 'PUSCH being transmitted once' may be referred to as a 'PUSCH instance', and one PUSCH occasion may consist of one or more PUSCH instances.

In a communication system supporting time division duplex (TDD), the number of UL symbols and/or FL symbols may be less than the number of symbols that a PUSCH instance has according to a slot pattern, configuration of a type0-PDCCH common search space set and control resource set (CORESET), and/or a pattern of synchronization signal/physical broadcast channel (SS/PBCH) block. When the PUSCH repetition type A is used, a PUSCH instance may not be transmitted, and a non-transmitted PUSCH instance may not be transmitted later. The number of PUSCH repetitions may not be readjusted, and the corresponding PUSCH instance may be considered as having been transmitted. When the PUSCH repetition type B is used, a PUSCH instance may be split into split PUSCH instances, and the split PUSCH instances may be transmitted. The split PUSCH instance may have a DM-RS.

When the repeated transmission according to the PUSCH repetition type A is performed in a communication system supporting TDD, the PUSCH instance may not be transmitted in some slots. The base station may perform dynamic scheduling for retransmission of the PUSCH instance that has not been transmitted. When there are many terminals intending to extend a coverage, many PDCCHs may be required. To solve this problem, an improved PUSCH repetition type A may be needed.

For convenience of description, the improved PUSCH repetition type may be referred to as a PUSCH repetition type C. The PUSCH repetition type C may be used for the purpose of extending a coverage. When the PUSCH repetition type C is used, a PUSCH instance may be transmitted on a slot basis. In order to reduce the amount of a PDCCH, the number of transmissions of the PUSCH instance may be guaranteed.

Method 2.3-1: When the PUSCH repetition type C is used, a PUSCH instance may be transmitted on a slot basis, and PUSCH instances may be transmitted in non-consecutive slots so that the number of PUSCH repetitions is guaranteed.

In a communication system supporting TDD, slot pattern information may be transmitted to the terminal through RRC signaling and/or a slot format indicator (SFI). A PUSCH occasion may be scheduled by using a UL grant or RRC signaling. A slot in which the first PUSCH instance of the PUSCH occasion is transmitted may be indicated by the UL grant or RRC signaling.

In order to satisfy the number of PUSCH repetitions (e.g., K) indicated by RRC signaling, the terminal may identify whether a PUSCH instance can be transmitted in a slot in which the first transmission starts or in slots subsequent after the corresponding slot. When UL symbols and/or flexible (FL) symbols are insufficient according to a slot pattern, the terminal may not be able to transmit the PUSCH instance. Except for slots in which PUSCH instances cannot be transmitted, K PUSCH instances may be transmitted in non-consecutive slots.

For example, a case in which four PUSCH instances are indicated to be repeatedly transmitted in a PUSCH occasion may be considered.

Figure 6:
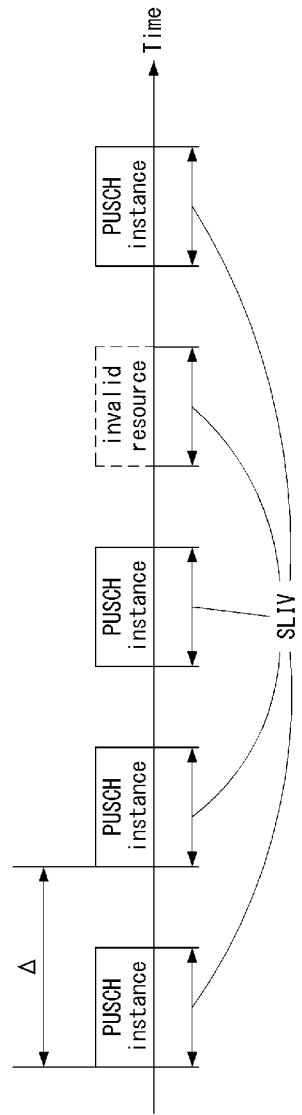
FIG. 6 is a conceptual diagram illustrating a first exemplary embodiment of a PUSCH transmission method according to a PUSCH repetition type C.

FIG. 6 is a conceptual diagram illustrating a first exemplary embodiment of a PUSCH transmission method according to a PUSCH repetition type C.

Referring to FIG. 6, a PUSCH instance may be transmitted four times in five slots. A time interval between the PUSCH instances may be Δ. Δ may be represented by one slot (e.g., 14 symbols or 12 symbols). Each of the PUSCH instances may have the same start and length indicator value (SLIV) in a corresponding slot. The fourth slot may be regarded as a time in which the SLIV is not valid (e.g., invalid resource). In this case, the fourth PUSCH instance may be transmitted in the fifth slot.

According to Method 2.3-1, the PUSCH instance transmitted in the slot may always have the same SLIV and mapping type. In this case, according to a slot pattern, many slots may be required to transmit the PUSCH instance K times. Therefore, it may be preferable for the PUSCH instances belonging to the PUSCH occasion to have two or more SLIVs and mapping types.

For convenience of description, the improved repeated PUSCH transmission may be referred to as a PUSCH repetition type D. The PUSCH repetition type D may indicate various time resources by a UL grant and/or RRC signaling Method 2.3-2: When the PUSCH repetition type D is used, a PUSCH instance may be transmitted on a slot basis, and a time domain resource assignment (TDRA) index applied to K consecutive slots may be indicated.

The PUSCH occasion may be scheduled by using a UL grant and/or RRC signaling. Here, the value of K may be set by RRC signaling. Alternatively, the value of K may be indicated by the number of SLIVs and/or mapping types included in the UL grant and/or RRC signaling. That is, the value of K may be dynamically indicated.

The UL grant and/or RRC signaling may indicate that the PUSCH instance is transmitted K times, and the TDRA index may indicate K SLIVs and/or mapping types. Alternatively, when SLIVs and/or mapping type fewer than K SLIVs and/or mapping types are indicated, it may be interpreted that K SLIVs and/or mapping types are indicated according to a predefined scheme. For example, when a PUSCH is to be transmitted eight times, if four SLIVs and/or mapping types are indicated, the same four SLIVs and/or mapping types may be applied again in order. Alternatively, if more than K SLIVs and/or mapping types are indicated, K SLIVs and/or mapping types from the first SLIV and/or mapping type may be applied.

For example, a case where transmission of four PUSCH instances in a PUSCH occasion is indicated may be considered.

Figure 7:
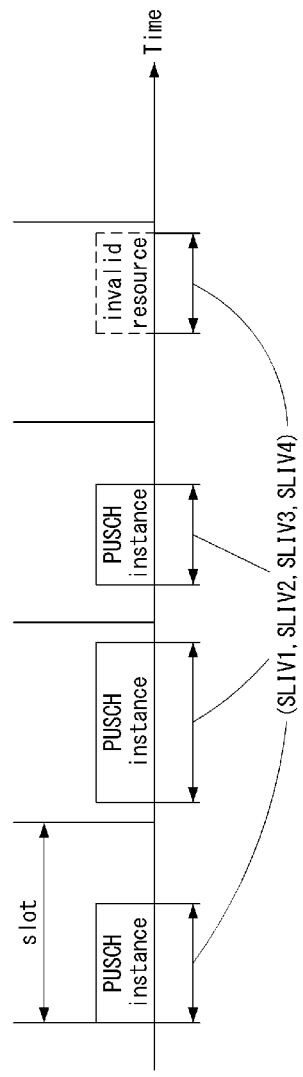
FIG. 7 is a conceptual diagram illustrating a first exemplary embodiment of a PUSCH transmission method according to a PUSCH repetition type D.

FIG. 7 is a conceptual diagram illustrating a first exemplary embodiment of a PUSCH transmission method according to a PUSCH repetition type D.

Referring to FIG. 7, a PUSCH instance may be transmitted four times in four slots. In a procedure of allocating a PUSCH occasion, (SLIV1, SLIV2, SLIV3, SLIV4) may be indicated to a terminal. Each of the corresponding SLIVs may be interpreted as an SLIV of each PUSCH instance. In the fourth slot, the SLIV4 may be regarded as belonging to an invalid time (e.g., invalid resource). Therefore, the fourth PUSCH instance may not be transmitted.

As another example, K SLIVs may be interpreted in order. The terminal may determine whether the first SLIV is applied. If the first SLIV cannot be applied, the terminal may determine whether to apply the second SLIV. The terminal may identify the applicable SLIV by repeating the above-described operation, and may map the PUSCH instance according to the applicable SLIV. Here, the 'applicable SLIV' may mean that transmission of a full PUSCH instance composed of valid symbols is possible. The terminal may select a minimum number of valid SLIV(s) in consideration of the order among the SLIVs (e.g., SLIV vectors) indicated to the terminal.

Figure 8:
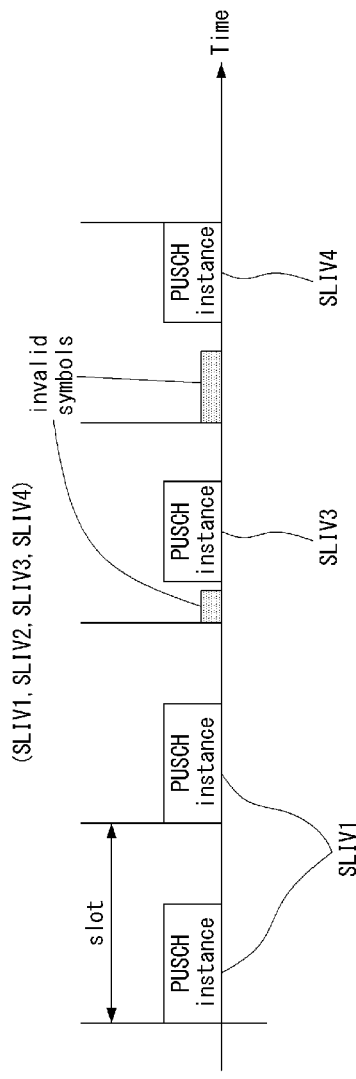
FIG. 8 is a conceptual diagram illustrating a second exemplary embodiment of a PUSCH transmission method according to a PUSCH repetition type D.

FIG. 8 is a conceptual diagram illustrating a second exemplary embodiment of a PUSCH transmission method according to a PUSCH repetition type D.

Referring to FIG. 8, a PUSCH instance may be transmitted three times in four slots. The SLIV1 may be applicable in the first slot and the second slot. Considering invalid symbols, the SLIV1 and SLIV2 may not be applied in the third slot. Therefore, the SLIV3 may be applied in the third slot. In the fourth slot, the SLIV1, SLIV2, and SLIV3 may not be applied. Therefore, the SLIV4 may be applied in the fourth slot.

Method 2.3-3: To comply with Method 2.3-1 and/or Method 2.3-2, a UL grant may include one new data indicator (NDI) and RV. Alternatively, when a plurality of NDIs and RVs are included in a UL grant to schedule two or more TBs, a combination of specific field(s) included in the UL grant may imply that one TB is scheduled to the terminal.

Method 2.3-4: According to Method 2.3-1 and/or Method 2.3-2, a value of K may be indicated by RRC signaling. In this case, even when a UL grant includes a plurality of NDIs and RVs, the terminal may transmit a PUSCH occasion using one NDI and RV among the plurality of NDIs and RVs.

When two or more PUSCH instances are transmitted in a PUSCH occasion, a different RV may be mapped to each PUSCH instance. The start value of RV may be indicated by a DCI or RRC signaling for allocating the PUSCH occasion, and different values of RVs may be determined based on one sequence indicated by RRC signaling among sequences defined in the technical specification. Alternatively, one of the above-described sequences may be defined in the technical specification, and in this case, the RRC signaling operation for indicating the different values of RVs may not be performed.

For convenience of description, the improved PUSCH repetition transmission may be referred to as a PUSCH repetition type E. When the PUSCH repetition type E is used, different time resources may be indicated by a UL grant and/or RRC signaling. The PUSCH repetition type E may be applied to a PUSCH occasion allocated to cross a slot boundary. When the PUSCH repetition type E is used, and the PUSCH occasion is transmitted in two or more slots, a start symbol to which the PUSCH instance may be mapped may be explicitly indicated for each slot.

Method 2.3-5: When the PUSCH repetition type E is used, a TDRA index applied in K consecutive slots may be indicated.

Transmission of PUSCH instances in K slots may be configured by a UL grant and/or RRC signaling, and a TDRA index may indicate K SLIVs and/or mapping types. Alternatively, if SLIV(s) and/or mapping type(s) fewer than K SLIVs and/or mapping types are indicated, it may be interpreted that K SLIVs and/or mapping types are indicated based on a predefined scheme.

Alternatively, K start symbol indexes (i.e., S), one length (i.e., L), and/or mapping type may be derived through a UL grant and/or RRC signaling. Here, the start symbol indexes (i.e., S) and the length (i.e., L) may be indicated by an SLIV. The terminal may identify the start symbol index (i.e., S), the length (i.e., L), and/or the mapping type based on the first SLIV. The terminal may identify the start symbol index (i.e., S) based on the second SLIV and the SLIV(s) after the second SLIV.

2.3.1 Enhancement of Methods for Interpreting a Time Window

For convenience of description, the improved repeated PUSCH transmission may be referred to as a PUSCH repetition type BB. The PUSCH repetition type BB may be similar to the PUSCH repetition type B. A method of interpreting a time window in the PUSCH repetition type B may be different from the method of interpreting a time window in the PUSCH repetition type B.

When the PUSCH repetition type BB is used, regardless of a slot format, invalid symbol(s), SSB, or type0-PDCCH CSS set, the length of the time window may be regarded as the length of the PUSCH instance and symbols as many as the number or repetitions. The index of the start symbol of the time window may be the index of the start symbol in which the PUSCH occasion is located. Thereafter, according to the slot format, invalid symbol(s), SSB, or type0-PDCCH CSS set, a symbol(s) in which the PUSCH occasion cannot be transmitted (e.g., invalid symbol(s)) and a symbol(s) in which the PUSCH occasion can be transmitted (e.g., valid symbol(s)) may be identified. The PUSCH occasion may be transmitted in valid symbol(s) among symbols within the time window.

The method for the base station to indicate the time window to the terminal may be maintained the same as that of the PUSCH repetition type B, and the method of interpreting the time window may be changed. A guaranteed number of symbols may be used in the PUSCH occasion transmitted by the terminal. Accordingly, the PUSCH occasion may be utilized in a wider coverage.

Method 2.3-6: When the PUSCH repetition type BB is used, a time window may be interpreted as follows. The time window may be interpreted as the number of symbols in which a PUSCH occasion can be transmitted. When the PUSCH occasion is transmitted, a DM-RS may be allocated for each actual PUSCH instance.

The enhanced time window may include only valid symbols. An actual PUSCH instance may be transmitted in invalid symbol(s) in the PUSCH occasion. In this case, the actual PUSCH instance may include a DM-RS.

Figure 9A:
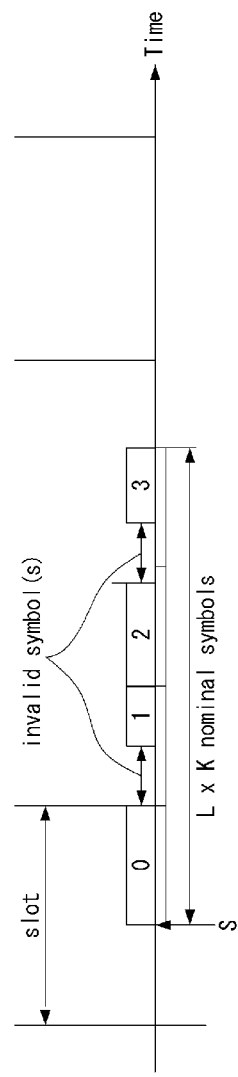
FIG. 9A is a conceptual diagram illustrating a first exemplary embodiment of a method for interpreting a time window when the PUSCH repetition type B is used.
Figure 9B:
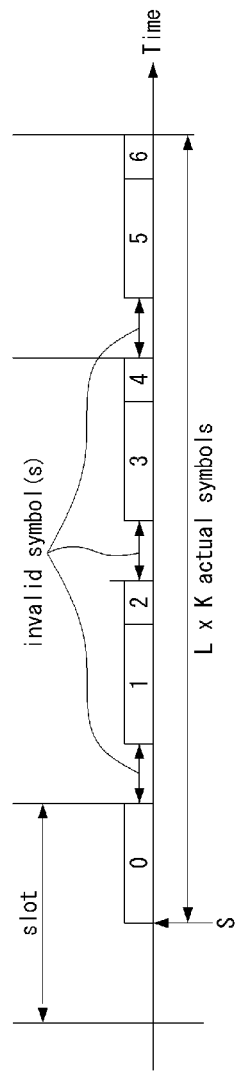
FIG. 9B is a conceptual diagram illustrating a first exemplary embodiment of a method for interpreting a time window when a PUSCH repetition type BB is used.

FIG. 9A is a conceptual diagram illustrating a first exemplary embodiment of a method for interpreting a time window when the PUSCH repetition type B is used, and FIG. 9B is a conceptual diagram illustrating a first exemplary embodiment of a method for interpreting a time window when a PUSCH repetition type BB is used.

Referring to FIG. 9A, a time window may be determined based on SLIV (e.g., S, L) and/or K, and valid symbol(s) may be selected after the time window is determined. Referring to FIG. 9B, valid symbol(s) may be selected first, and a time window may be determined based on SLIV (e.g., S, L) and/or K after the valid symbol(s) are selected.

Method 2.3-7: The first symbol (e.g., modulation symbol) of an actual PUSCH instance may be transmitted in a valid symbol located after invalid symbols. That is, the first symbol of the actual PUSCH instance may be located in a valid symbol.

When the PUSCH repetition type B is used, PUSCH transmission may be performed in valid symbols. In this case, the time window may be maintained as it is. Therefore, in the exemplary embodiment shown in FIG. 9A, a nominal PUSCH instance may be transmitted in a period 0, and an actual PUSCH instances may be transmitted in periods 1, 2, and 3.

On the other hand, when the PUSCH repetition type BB is used, a time window may be defined only in valid symbols. In this case, the number of symbols actually occupied by the PUSCH occasion may be greater than L×K. In the exemplary embodiment shown in FIG. 9B, a nominal PUSCH instance may be transmitted in a period 0. After the period 0, a nominal PUSCH instance may be transmitted again in a period 1 excluding invalid symbols. When valid symbols remain, an actual PUSCH instance may be transmitted in a period from the remaining valid symbols to a boundary of the slot. By repeating the above-described operations, the nominal PUSCH instance may be transmitted in periods 3, 4, 5, and 6.

A coded symbol of data (e.g., symbol into which coded bits are modulated) may be mapped to an actual PUSCH instance. In this case, a mapping operation in a circular buffer may start from a new RV. The RV of the n-th PUSCH instance and the RV of the (n+1)-th PUSCH instance may have the same value (e.g., 0). Alternatively, the RV of the n-th PUSCH instance may be different from the RV of the (n+1)-th PUSCH instance.

For example, in the period 0 shown in FIG. 9B, the PUSCH instance may correspond to the RV 0, and in the period 1, the PUSCH instance may correspond to the RV 1. By repeating the above-described operations, the PUSCH instances may correspond to the RVs. When only RV 0 is configured or when only RV 0 and RV 2 are configured, the same method as described above may be applied.

Method 2.3-8: A DM-RS may be mapped to each PUSCH instance.

The actual PUSCH instance may always have a DM-RS. This operation may help the base station to ensure a quality of channel estimation in a step of receiving data. For example, the base station may estimate a channel by performing a joint estimation operation, and may perform a reception operation of contiguous actual PUSCH instances based on the estimated channel. When a DM-RS is mapped to a PUSCH instance, there may be few symbols to which data is mapped in the corresponding PUSCH instance. In order to solve this problem, the following methods may be considered.

Method 2.3-9: A DM-RS may not be mapped to some PUSCH instances. When the number of symbols allocated for data among symbols of a PUSCH instance is small, an effective code rate may be greater than or equal to a predefined threshold. In this case, the DM-RS may be dropped, and data may be mapped to the PUSCH instance instead of the DM-RS.

In order to determine whether to allocate a DM-RS, the terminal may assume that a DM-RS is virtually allocated, and may calculate a code rate based on the above-mentioned assumption. When the calculated code rate is greater than or equal to a threshold defined in the technical specification (e.g., effective code rate=0.95), the terminal may not allocate a DM-RS to the PUSCH instance. After determining whether to allocate a DM-RS, the terminal may map coded symbols (e.g., modulation symbols) of the data to a resource grid.

2.4 Methods for Enhancement in Power Control

The same transmit power control (TPC) command may be applied to all PUSCH instance(s) belonging to a PUSCH occasion. Since the number of symbols of each PUSCH instance may vary, the PUSCH instances may not have the same transmit power.

The transmit power applied to the PUSCH instance may be calculated based on an equation defined in the technical specification. For example, the transmit power applied to the PUSCH instance may be calculated based on Equation 2 below.

$$P(i,j,q,l) \text{ [dBm]} = P_O(j) + 10 \cdot \log_{10}(2^\mu \cdot M_{RB}(i)) + \alpha(j) \cdot PL(q) + \Delta(i) + f(i,l) \quad \text{[Equation 2]}$$

P(i,j,q,l) may be applied to a PUSCH instance i. j may be a parameter set for calculating the power. q may be an index of a downlink-reference signal (DL-RS) or an index of an uplink-reference signal (UL-RS) used by the terminal to estimate a path loss. l may be an index of a set managing TPC commands.

$P_O(j)$ may be a variable that is a reference for the transmit power for the PUSCH instance. A value for the j-th power control parameter set may be indicated by RRC signaling. μ may be a variable for a subcarrier spacing used by the PUSCH instance. α(j) may be a variable related to a compensation magnitude of the path loss for the j-th parameter set. α(j) may be indicated by RRC signaling. PL(q) may be a magnitude of a DL path loss calculated based on q that indicates a reference RS. PL(q) may be a value measured and/or estimated by the terminal. f(i,l) may be an accumulated value of TPC commands for the l-th power control loop.

Here, the value of Δ(i) may be fixed to 0 according to a value indicated by RRC signaling. Alternatively, the value of Δ(i) may be calculated as a different value according to a value indicated by RRC signaling. When the PUSCH instance is transmitted through two or more MIMO layers, 'Δ(i)=0' may be indicated regardless of RRC signaling. When the PUSCH instance is transmitted through one MIMO layer, 'Δ(i)=0' may be indicated by RRC signaling. Alternatively, when the PUSCH instance is transmitted through one MIMO layer, 'Δ(i)=10·log$_{10}$({$2^{1.25 \cdot BPRE}$−1}·β)' may be indicated by RRC signaling. Here, bits per RE (BPRE) may be a variable related to the code rate. A BPRE when a TB is mapped to the PUSCH instance may be calculated differently from a BPRE when only aperiodic channel state information (CSI) is mapped to the PUSCH instance without a TB. When the PUSCH instance includes a $$TB, \text{'}BPRE = \frac{1}{N_{RE}} \cdot \sum_{r=0}^{C-1} K_r\text{'}$$

may be defined. When the PUSCH instance does not include a $$TB, \text{'}BPRE = \frac{Q \cdot R}{N_{RE}} \cdot \beta\text{'}$$

may be defined. Here, β may be a variable related to an offset of the code rate. β when a TB is mapped in the PUSCH instance may be calculated differently from β when only aperiodic CSI is mapped to the PUSCH instance without a TB.

When the PUSCH instance includes a TB, 'β=1' may be defined. When the PUSCH instance does not include a TB, β may be one value indicated by a UL grant or RRC signaling among values indicated by RRC signaling. C may mean the number of code blocks included in the PUSCH instance, and $K_r$ may mean the size (e.g., the number of bits) of the r-th code block. $N_{RE}$ may be a variable related to the number of REs of the PUSCH instance. '$N_{RE}$= $M_{RB}(i) \cdot \Sigma_{j=0}^{-1+N_{sym}(i)} N_{sc}(i,j)$' may be defined. $M_{RB}(i)$ may be the number of RBs to which the PUSCH instance is mapped. $N_{symb}(i)$ may be the number of symbols belonging to the PUSCH instance. $N_{sc}(i,j)$ may mean the number of remaining subcarriers excluding subcarriers to which a DM-RS and a phase tracking (PT)-RS are mapped among subcarriers of the symbol j to which the PUSCH instance is mapped. Q may mean a modulation order applied to the PUSCH instance. R may mean the code rate applied to the PUSCH instance.

The above-described parameters may be classified into open-loop control parameters and closed-loop control parameters. For example, the terminal may update PL (q) by measuring the path loss by itself. PL (q) may be the open-loop control parameter. For example, the terminal may update f(i,l) based on a received TPC command f(i,l) may be the closed-loop control parameter.

Method 2.4-1: A transmit power applied to a PUSCH instance may be derived according to the technical specification (e.g., Equation 2).

For example, a different bandwidth and/or a different number of symbols may be allocated to each PUSCH instance belonging to the PUSCH occasion. Based on Equation 2, each of the PUSCH instances may have a different power. The PUSCH instance may belong to a slot (or subframe) to which a new timing advance (TA), TPC command, or path loss is applied. In this case, the TA, TPC command, or path loss may be applied differently in adjacent PUSCH instances.

Method 2.4-2: A transmit power applied to a PUSCH instance may be derived from a reference PUSCH instance, and a PUSCH occasion may be transmitted by reusing the derived transmit power. For example, the transmit power of the PUSCH instance may be the same as a transmit power of the reference PUSCH instance.

For example, a transmit power applied to the first PUSCH instance belonging to the PUSCH occasion may be equally applied to the remaining PUSCH instance(s). As another example, a transmit power applied to the longest PUSCH instance belonging to the PUSCH occasion may be equally applied to the remaining PUSCH instance(s). The terminal may allocate the same transmit power to symbols belonging to the PUSCH instance based on the above-described method.

As another method, since the number $N_{symb}(i)$ of symbols of the PUSCH instance may vary, the terminal may unify only the variable for the number of symbols. For example, the terminal may expect the same Δ(i) to be used.

Method 2.4-3: With respect to a transmit power applied to a PUSCH instance, a terminal may assume that 'Δ(i)=0' is indicated.

For example, with respect to a continuous transmission method in a PUSCH occasion (e.g., FIGS. 6, 7, and 8), Method 2.4-2 may be applied. In addition, it is preferable that the terminal does not update both the open-loop control parameters and the closed-loop control parameters for all PUSCH instances belonging to the PUSCH occasion. This will be explained in Method 2.4-4 below.

Method 2.4-4: For a transmit power applied to a PUSCH instance, a terminal may not update PL(q) and f(i,l).

2.4.1 where UL occasions (e.g., PUSCH occasion and/or PUCCH occasion) overlap in some slots (e.g., mini-slots)

Transmit powers of PUSCH instances constituting a PUSCH occasion need to be maintained the same or similar. When the terminal transmits two or more PUSCH occasions to the base station, power control in the two or more PUSCH occasions may be different from each other. In this case, it may be difficult to maintain coherence.

The same problem may occur in PUCCH occasions. The terminal may transmit a PUCCH occasion while transmitting a PUSCH occasion. In exemplary embodiments, a UL occasion may mean a PUSCH occasion and/or a PUCCH occasion, and a UL instance may mean a PUSCH instance and/or a PUCCH instance. UL instances may have a predefined interval (e.g., slot).

A transmit power of a UL occasion may be derived based on the method(s) proposed in the section 2.4 and/or a section 3.3 to be described below. In order to maintain coherence while transmitting a UL occasion, it may be preferable for the same transmit power to be used. In order to maintain coherence while transmitting a UL occasion, it may be preferable for the transmit power to remain within a predefined error. Therefore, in the UL occasion, the transmit power may be determined based on one UL instance (e.g., reference UL instance), and the transmit power of the remaining UL instance(s) may be the same as or similar to the transmit power determined based on the reference UL instance.

A period in which the terminal can maintain coherence (hereinafter, referred to as a 'coherence period') may be determined according to capability of the terminal. The base station may inform the terminal of information on the coherence period by using RRC signaling. The coherence period may be configured in units of symbols. Although a frequency aspect of the coherence period is emphasized in Method 2.5-2, which will be described later, the coherence period may also be utilized in terms of power. Here, the coherence period may be longer than a time for which the UL occasion is transmitted. Alternatively, the coherence period may be less than or equal to the time for which the UL occasion is transmitted.

Figure 10:
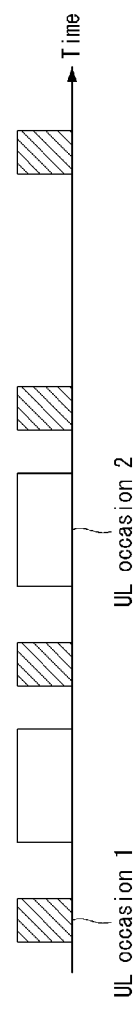
FIG. 10 is a conceptual diagram illustrating a first exemplary embodiment of a method for a terminal to transmit two or more UL occasions.

FIG. 10 is a conceptual diagram illustrating a first exemplary embodiment of a method for a terminal to transmit two or more UL occasions.

Referring to FIG. 10, a terminal may transmit a UL occasion 1 and a UL occasion 2. The terminal may transmit the UL occasion 2 before completion of transmission of the UL occasion 1. In this case, a transmit power (e.g., P1 and P2) allocated to a UL occasion i (i=1, 2) and a coherence (e.g., phase continuity or power coherence) thereof may be determined based on UL instances belonging to the UL occasion i, slot pattern and/or capability of the terminal. Each of a transmit power and coherence applied to a UL instance belonging to the UL occasion 1 may be different from each of a transmit power and coherence applied to a UL instance belonging to the UL occasion 2. Therefore, it may be difficult for the terminal to maintain coherence. However, when the same power is allocated to the UL occasion 1 and the UL occasion 2, coherence may be maintained in the UL occasion 1 and the UL occasion 2.

Since the base station allocates a UL occasion to the terminal, the base station may be implemented so that the above-described situation does not occur for a PUSCH occasion allocated by a dynamic grant or a PUCCH occasion for transmitting a HARQ-ACK for a PDSCH. When a configured grant (CG) PUSCH is present in a UL occasion, or when a PUCCH occasion in which a HARQ-ACK for a semi-persistence scheduling (SPS) PDSCH is transmitted is involved, an additional specification may be required in order for the terminal to maintain coherence.

Method 2.4-5: If a UL occasion 2 is transmitted before completion of transmission of a UL occasion 1, coherence for the UL occasion 1 and the UL occasion 2 may not be assumed.

When a transmit power is changed from P1 to P2, coherence may not be maintained. In this case, it may be preferable for the base station to schedule transmission of the UL occasion 2 after completion of transmission of the UL occasion 1. Method 2.4-5 may be easily applied to a UL occasion by a dynamic grant.

It may be difficult to apply Method 2.4-5 to a UL occasion by a configured grant (CG). The reason is that when it is determined that data does not exist in the terminal (e.g., when a MAC layer does not deliver a TB to a PHY layer), the PUSCH transmission operation may not be performed. Therefore, it may be preferable to maintain coherence for the UL occasion 1 by applying Method 2.4-5 or Method 2.4-6 below.

Method 2.4-6: A new UL occasion 2 may not be transmitted before completion of transmission of a UL occasion 1.

The terminal may assume that a UL occasion 2 is not scheduled before transmission of a UL occasion 1 is completed. Alternatively, the terminal may receive scheduling information and/or configuration information for a UL occasion 2, but may not transmit the UL occasion 2 before transmission of a UL occasion 1 is completed. For example, the terminal may not transmit a configured PUSCH occasion. The terminal may not transmit a PUCCH occasion including a scheduling request.

UL occasions with different priorities may be treated as an exception in Method 2.4-6. The different priorities may be a priority of eMBB traffic and a priority of URLLC traffic. In the same traffic, a priority of UCI and a priority of data may be considered.

Method 2.4-7: UL occasions with the same priority may be scheduled to a terminal. In this case, the terminal may transmit UL occasions having the same priority. In a transmission procedure of a UL occasion 2 with a high priority, new transmission may be allowed. Coherence of the UL occasion 2 may be maintained, but coherence of a UL occasion 1 may not be maintained.

The terminal may identify that a UL occasion 1 and a UL occasion 2 have different priorities. For example, a priority index of eMBB traffic and a priority index of URLLC traffic may indicate different priorities. The UL occasion 1 may be a PUSCH with a priority 0, a PUCCH with a priority 0, a PUCCH on which a semi-persistent (SP) CSI or periodic CSI is transmitted, and/or a PUCCH on which a SP CSI or periodic CSI is transmitted. The UL occasion 2 may be a PUSCH having a priority 1 and/or a PUCCH having a priority 1. The UL occasion 1 may be a PUCCH with a priority 0. In this case, coherence of the PUCCH may not be maintained due to the UL occasion 2.

For example, when the priority index of the eMBB traffic is the same as the priority index of the URLLC traffic, a priority of UCI type may be considered. The priorities may be defined to have an order of 'HARQ-ACK>scheduling request>CSI part 1>CSI part 2'. A priority of data may be lower than the priority of the CSI part 2. Alternatively, the priority of data may be considered to be the same as the priority of CSI part 1. Here, when the priorities are the same, only a property of the first transmitted UL occasion may be maintained. After a UL occasion is transmitted, a UL occasion having the same priority may not be transmitted.

The coherence of the UL occasion 2 may not be maintained according to the transmit power. For example, when P1 is different from P2, the coherence of the UL occasion 2 may not be maintained. To solve this problem, the transmit power of the UL occasion 2 may be adjusted. The transmit power of the UL occasion 2 may be adjusted so that the coherence of UL occasion 1 is maintained.

Method 2.4-8: A transmit power of a UL occasion 2 may be applied differently between a period in which a UL occasion 1 is transmitted (e.g., period in which coherence of the UL occasion 1 is maintained) and a period in which the UL occasion 1 is not transmitted (e.g., period in which coherence of the UL occasion 1 is not maintained).

P1 may be applied to an instance of the UL occasion 2 belonging to the transmission period of the UL occasion 1. P2 may be applied in the remaining instance(s) of the UL occasion 2 not belonging to the transmission period of the UL occasion 1.

Figure 11:
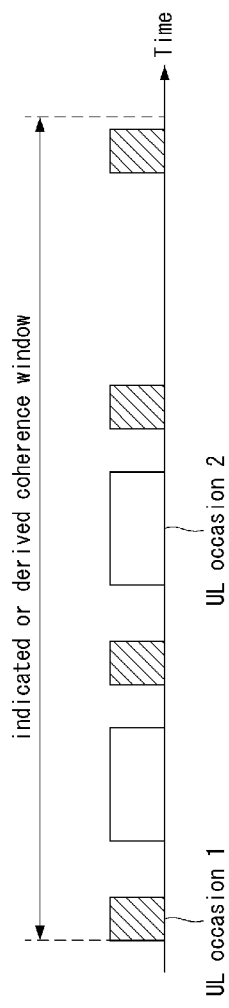
FIG. 11 is a conceptual diagram illustrating a first exemplary embodiment in which a coherence window is applied based on a UL occasion 1 in a transmission procedure of two or more UL occasions.
Figure 12:
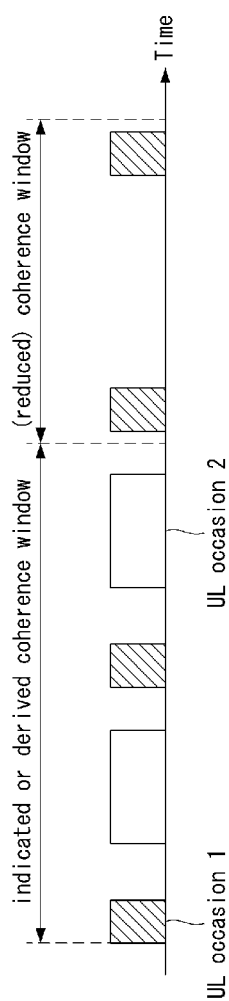
FIG. 12 is a conceptual diagram illustrating a second exemplary embodiment in which a coherence window is applied based on a UL occasion 1 in a transmission procedure of two or more UL occasions.

FIG. 11 is a conceptual diagram illustrating a first exemplary embodiment in which a coherence window is applied based on a UL occasion 1 in a transmission procedure of two or more UL occasions, and FIG. 12 is a conceptual diagram illustrating a second exemplary embodiment in which a coherence window is applied based on a UL occasion 1 in a transmission procedure of two or more UL occasions.

Referring to FIGS. 11 and 12, it may be indicated that P2 is allocated to an instance belonging to a UL occasion 2. According to Method 2.4-8, a power that the terminal actually allocates to an instance may be P1 or P2. Method 2.4-8 may be applied to a coherence window of a UL occasion 1 instead of a transmission period of the UL occasion 1.

In order to maintain coherence for the UL occasion 1, the base station may perform the indication using RRC signaling and/or a scheduling grant (e.g., dynamic grant or configured grant). If Method 2.4-8 is applied, the terminal may start transmission of the UL occasion 2, and the UL occasion 2 may be transmitted in the coherence window of the UL occasion 1. The above-described operation may be illustrated in FIG. 11. By adjusting the transmit power of the UL occasion 2 from P2 to P1, transmission belonging to the coherence window of the UL occasion 1 may be performed. Thereafter, the terminal may transmit a UL instance so that the coherence of the UL occasion 2 is maintained.

Meanwhile, the terminal may maintain the coherence even when P1 and P2 are different from each other. In this case, although P2 is allocated as the transmit power of the UL occasion 2 in the exemplary embodiment shown in FIG. 11, the coherence window of the UL occasion 1 may be applied.

If a period of maintaining coherence (e.g., coherence window) is longer than a transmission time of a UL occasion, coherence of the UL occasion may be maintained, and exceptional situations (e.g., the above-described slot pattern, slot pattern to be described later, whether to transmit another UL occasion, etc.) may be additionally considered. On the other hand, when a coherence window W is shorter than a transmission time T of a UL occasion, the terminal may repeatedly apply the coherence window. T may be shortened by applying the coherence window for the remaining UL occasion(s) after arrangement of W (e.g., an integer multiple of W). For example, T may be less than or equal to W. The terminal may apply a form in which the length of the coherence window is gradually shortened.

Method 2.4-9: If a coherence window is shorter than a transmission time of a UL occasion, the coherence window having the maximum length may be repeatedly applied, and the last coherence window may have a short length.

Generalizing the above-described operation, the coherence window may be applied such that sufficient coherence is extended for a UL occasion scheduled first among UL occasions.

Method 2.4-10: For UL occasions having the same priority, a UL occasion (e.g., UL occasion 1) may be started first in the time domain, and the remaining UL occasion(s) may follow the UL occasion 1.

For example, in the exemplary embodiment shown in FIG. 12, it may be assumed that the terminal has ability to maintain coherence in two slots. In this case, the coherence window may be derived (or configured) as a time (or symbols) corresponding to two slots or two or less slots. When the terminal needs to transmit the UL occasion 1 during four slots, the terminal may apply a coherence window every two slots. Here, a coherence window preferential for the UL occasion 1 may be applied.

In the exemplary embodiment shown in FIG. 12, the UL occasion 2 may be transmitted twice, and the UL occasion 2 may completely belong to the coherence window in which the UL occasion 1 is transmitted. Alternatively, the UL occasion 2 may not completely belong to the coherence window in which the UL occasion 1 is transmitted. The UL occasion 2 may be divided into an instance(s) belonging to the coherence window and an instance(s) not belonging to the coherence window.

A transmission start time of the UL occasion 2 may be after a transmission start time of the UL occasion 1, and the coherence window for the UL occasion 2 may not be newly applied. Alternatively, the coherence window for the UL occasion 2 may be applied after transmission of the UL occasion 1 is terminated.

Conversely, the terminal may also apply the period of maintaining coherence in a form that it gradually becomes longer. When the UL occasion 2 is allocated, the terminal may start a new coherence maintenance period for the UL occasion 2 so that the coherence of the UL occasion 2 is maintained. Based on this operation, it may be interpreted that important UCI and/or data are transmitted in the last UL occasion allocated by scheduling of the base station.

Method 2.4-11: For UL occasions with the same priority, a UL occasion (e.g., UL occasion 2) may be started later in the time domain, and the remaining UL occasion(s) may follow the UL occasion 2.

Figure 13:
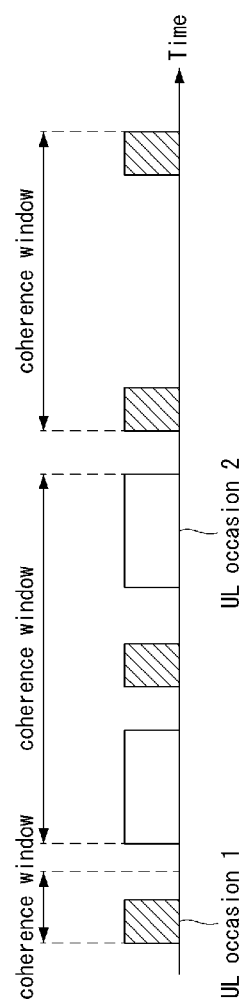
FIG. 13 is a conceptual diagram illustrating a third exemplary embodiment in which a coherence window is applied based on a UL occasion 1 in a transmission procedure of two or more UL occasions.

FIG. 13 is a conceptual diagram illustrating a third exemplary embodiment in which a coherence window is applied based on a UL occasion 1 in a transmission procedure of two or more UL occasions.

Referring to FIG. 13, a coherence window of a UL occasion 1 may be interpreted as being divided. The UL occasion 1 may include four instances, and a UL occasion 2 may be transmitted later in the time domain.

In order for a coherence window for the UL occasion 2 to have a higher priority, the coherence window for the UL occasion 1 may be divided into a coherence window to which the first instance belongs and a coherence window to which the third and fourth instances belong.

2.5 Methods for Enhancement in the Frequency Domain

When a PUSCH is indicated to be repeatedly transmitted K times, and it is not indicated to perform a frequency hopping, a frequency resource in a time window in which a PUSCH occasion is transmitted may maintain the same set of physical resource blocks (PRBs). Alternatively, when it is indicated to perform frequency hopping, the frequency resource may have two or more PRB sets. The PRB set may refer to frequency domain resource assignment (FDRA) or RB assignment indicated (or configured) by a DCI and/or RRC signaling for allocating the PUSCH occasion.

In order to perform frequency hopping, the base station may transmit information (e.g., configuration information) indicating activation or deactivation of frequency hopping to the terminal using RRC signaling. When frequency hopping is activated, whether to perform the frequency hopping may be indicated by a DCI and/or RRC signaling for allocating the PUSCH occasion.

When the frequency hopping for the PUSCH occasion transmission is performed, the base station receiving the PUSCH occasion may obtain a frequency multiplexing gain. The frequency hopping scheme may be classified into a frequency hopping scheme within a slot (hereinafter, referred to as a 'first frequency hopping scheme') and a frequency hopping scheme at a slot boundary (hereinafter referred to as a 'second frequency hopping scheme').

When the first frequency hopping scheme is used, frequency hopping for a PUSCH instance may be performed, and the PUSCH instance may be repeated. A frequency hop of each PUSCH instance may consist of half the symbols constituting the corresponding PUSCH instance (or 'a maximum integer number of symbol(s) not exceeding than half of the symbols' or 'a minimum integer number of symbols not less than half of the symbols').

When the second frequency hopping scheme is used, frequency hopping for a PUSCH instance may not be performed, and frequency hopping may be performed at a boundary between the PUSCH instances.

In order to perform joint channel estimation in the base station receiving the PUSCH occasion, phase coherence and/or power coherence for PUSCH instances may be maintained. In order to support this operation, a new frequency hopping scheme may be needed. When a PUSCH is indicated to be repeatedly transmitted K times, frequency hopping may not be performed in as many PUSCH instances as possible, so that the base station can perform joint channel estimation. By performing frequency hopping, the base station may obtain a frequency multiplexing gain.

Method 2.5-1: The first K/2 (or 'a maximum integer number not greater than K/2' or 'a minimum integer number not less than K/2') PUSCH instances may constitute a first frequency hop, and the remaining PUSCH instances may constitute a second frequency hop.

According to whether an index of a slot to which the first PUSCH instance belongs is an odd number or an even number, the first frequency hop may be determined as a starting PRB derived from a FDRA of the PUSCH or a PRB to which a hopping offset is applied. The second frequency hop may be determined as a starting PRB not used by the first frequency hop or a PRB to which a hopping offset is applied. For convenience of description, drawings to be described later show that the first frequency hop is determined based on the starting PRB, but the first frequency hop may be determined as the PRB to which a hopping offset is additionally applied.

The maximum number of PUSCH instances, the maximum length of the time window, or the maximum number of symbols capable of maintaining power coherence and/or phase coherence may be determined according to capability of the terminal. In this case, Method 2.5-1 may be improved. For example, the predefined number in Method 2.5-1 may be replaced with K/2. The following exemplary embodiments will be described based on K/2, but in the exemplary embodiments below, a predefined number other than K/2 may be used.

Method 2.5-2: A predefined number may be determined (or indicated, set) by capability of the terminal or RRC signaling, and the terminal may derive the number of PUSCH instances belonging to the same frequency hop based on the predefined number.

In a communication system supporting frequency division duplex (FDD), a PUSCH occasion may be transmitted in consecutive slots. When the PUSCH occasion is repeatedly transmitted K times, the PUSCH occasion may be transmitted in K consecutive slots. In a communication system supporting TDD, the PUSCH occasion may be transmitted in non-consecutive slots according to a slot pattern. Exemplary embodiments with respect to interpretation of a time window in which the PUSCH occasion may be transmitted and transmission of the PUSCH instance may be shown in FIGS. 6, 7, and/or 8. When some symbols are invalid, PUSCH instances may not be transmitted in consecutive time resources. The reason is that invalid symbols (e.g., DL symbols, FL symbols, SS/PBCH block, type0-PDCCH CSS set, invalid symbol pattern) are located between the PUSCH instances.

In this case, the terminal may not be able to maintain phase coherence and power coherence. Therefore, in order to apply Method 2.5-1 to TDD, improvement of Method 2.5-1 may be required.

Method 2.5-3: Frequency hopping may be performed at a boundary between an invalid symbol and a valid symbol belonging to a PUSCH occasion.

If there is no invalid symbol, frequency hopping may not be performed in the PUSCH occasion. In order to solve this problem, the maximum number of adjacent PUSCH instances belonging to the same frequency hop may be limited.

Method 2.5-4: In Method 2.5-3, the number of adjacent PUSCH instances belonging to the same frequency hop may not be greater than a predefined number.

The predefined number may be determined in a procedure of allocating the PUSCH occasion. For example, the predefined number may be set to K/2 (or, a minimum integer not less than K/2 or a maximum integer not greater than K/2).

When the PUSCH occasion is transmitted according to the above-described method (e.g., PUSCH repetition type A/B/C/D/BB), PUSCH instances that cannot be transmitted due to invalid symbols may be omitted in counting the number of repetitions. Alternatively, the number of PUSCH instances may be guaranteed to K.

2.5.1 Exemplary Embodiments

Figure 14A:
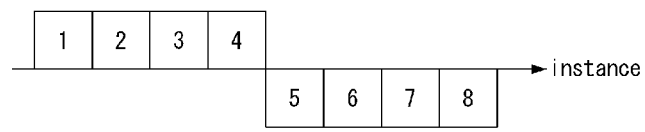
FIG. 14A is a conceptual diagram illustrating a first exemplary embodiment of a method for applying frequency hopping to a PUSCH occasion.
Figure 14B:
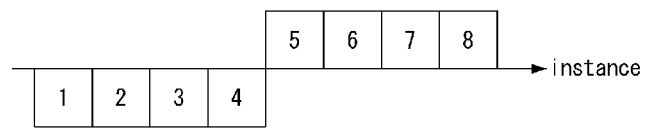
FIG. 14B is a conceptual diagram illustrating a second exemplary embodiment of a method for applying frequency hopping to a PUSCH occasion.

FIG. 14A is a conceptual diagram illustrating a first exemplary embodiment of a method for applying frequency hopping to a PUSCH occasion, and FIG. 14B is a conceptual diagram illustrating a second exemplary embodiment of a method for applying frequency hopping to a PUSCH occasion.

Referring to FIGS. 14A and 14B, 'K=8' may be indicated for a PUSCH occasion. A terminal may maintain phase coherence and/or power coherence in four (=K/2) consecutive PUSCH instances (i.e. Method 2.5-1). Alternatively, the base station may indicate (or set) four to the terminal through RRC signaling. In this case, the terminal may maintain phase coherence and/or power coherence for a time corresponding to four PUSCH instances (Method 2.5-2). Alternatively, the terminal may maintain phase coherence and/or power coherence for a time corresponding to four or less PUSCH instances according to its capability (Method 2.5-2).

The PUSCH occasion may consist of only valid symbols. In the exemplary embodiment shown in FIG. 14A, a frequency hop to which the first PUSCH instance belongs may be a first hop, and the first PUSCH instance may be transmitted in a frequency hop determined as a starting PRB. In the exemplary embodiment shown in FIG. 14B, a frequency hop to which the first PUSCH instance belongs may be a second hop, and the first PUSCH instance may be transmitted in a frequency hop determined based on a starting PRB and a hopping offset.

When the PUSCH instance is not dropped due to an invalid symbol, Method 2.5-1 or Method 2.5-2 may be applied. In this case, four PUSCH instances may belong to the same frequency hop. The frequency hopping may be performed at a boundary between the fourth PUSCH instance and the fifth PUSCH instance.

When some PUSCH instances are dropped or deferred, Method 2.5-3 and/or Method 2.5-4 may be applied. In FIGS. 15 and 16, which will be described later, the second and third PUSCH instances may be dropped or deferred due to invalid symbols. In FIGS. 17 and 18, which will be described later, the second, third, and fifth PUSCH instances may be dropped or deferred due to invalid symbols.

Figure 15A:
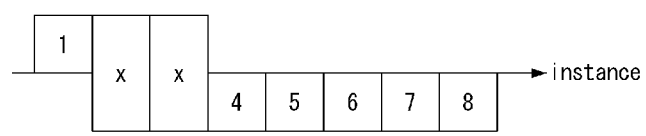
FIG. 15A is a conceptual diagram illustrating a first exemplary embodiment of a method of applying frequency hopping to a PUSCH occasion in which a PUSCH instance is dropped by considering invalid symbols.
Figure 15B:
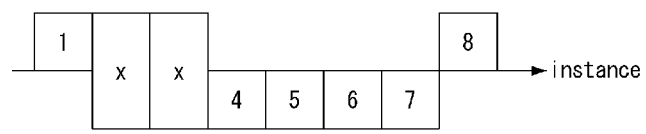
FIG. 15B is a conceptual diagram illustrating a second exemplary embodiment of a method of applying frequency hopping to a PUSCH occasion in which a PUSCH instance is dropped by considering invalid symbols.

FIG. 15A is a conceptual diagram illustrating a first exemplary embodiment of a method of applying frequency hopping to a PUSCH occasion in which a PUSCH instance is dropped by considering invalid symbols, and FIG. 15B is a conceptual diagram illustrating a second exemplary embodiment of a method of applying frequency hopping to a PUSCH occasion in which a PUSCH instance is dropped by considering invalid symbols.

Referring to FIG. 15A, Method 2.5-3 may be applied. The second and third PUSCH instances may be dropped, and the remaining PUSCH instance(s) may belong to different frequency hops. Frequency hopping may be performed at a boundary between an invalid symbol and a valid symbol. The fourth, fifth, sixth, seventh, and eighth PUSCH instances may belong to the same frequency hop. The terminal may maintain phase coherence and/or power coherence in the fourth, fifth, sixth, seventh, and eighth PUSCH instances.

Referring to FIG. 15B, Method 2.5-4 may be applied, and frequency hopping may be performed at a boundary between an invalid symbol and a valid symbol. In this case, the number of consecutive PUSCH instances may be limited to four. The terminal may maintain phase coherence and/or power coherence in the fourth, fifth, sixth, and seventh PUSCH instances.

Figure 16A:
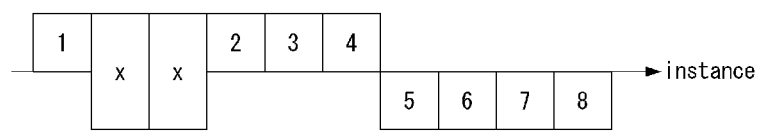
FIG. 16A is a conceptual diagram illustrating a first exemplary embodiment of a method of applying frequency hopping to a PUSCH occasion in which a PUSCH instance is deferred by considering invalid symbols.
Figure 16B:
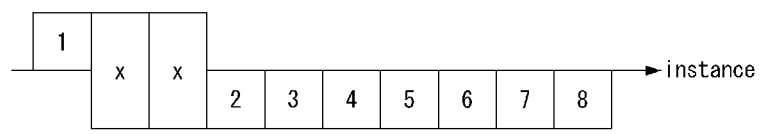
FIG. 16B is a conceptual diagram illustrating a second exemplary embodiment of a method of applying frequency hopping to a PUSCH occasion in which a PUSCH instance is deferred by considering invalid symbols.
Figure 16C:
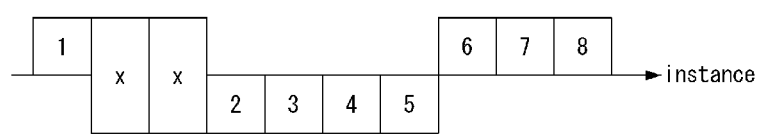
FIG. 16C is a conceptual diagram illustrating a third exemplary embodiment of a method of applying frequency hopping to a PUSCH occasion in which a PUSCH instance is deferred by considering invalid symbols.
Figure 17:
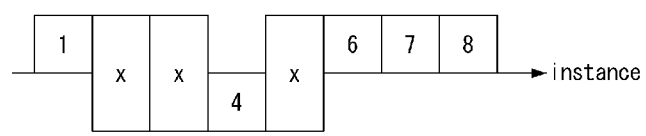
FIG. 17 is a conceptual diagram illustrating a third exemplary embodiment of a method of applying frequency hopping to a PUSCH occasion in which a PUSCH instance is dropped by considering invalid symbols.

FIG. 16A is a conceptual diagram illustrating a first exemplary embodiment of a method of applying frequency hopping to a PUSCH occasion in which a PUSCH instance is deferred by considering invalid symbols, FIG. 16B is a conceptual diagram illustrating a second exemplary embodiment of a method of applying frequency hopping to a PUSCH occasion in which a PUSCH instance is deferred by considering invalid symbols, and FIG. 16C is a conceptual diagram illustrating a third exemplary embodiment of a method of applying frequency hopping to a PUSCH occasion in which a PUSCH instance is deferred by considering invalid symbols.

Referring to FIG. 16A, a boundary of frequency hopping may be determined based on the maximum number of PUSCH instances. Two PUSCH instances may be deferred. Even when four PUSCH instances are non-consecutively arranged, the four PUSCH instances may belong to the same frequency hop. In this case, the terminal may maintain phase coherence and/or power coherence of the PUSCH instances consecutive in the time domain among PUSCH instances belonging to the same frequency hop. Here, the consecutive PUSCH instances may be the second, third, and fourth PUSCH instances or the fifth, sixth, seventh, and eight PUSCH instances.

Referring to FIG. 16B, frequency hopping may be performed at a boundary between an invalid symbol and a valid symbol, and Method 2.5-3 may be applied. In this case, two PUSCH instances may be deferred, and the remaining PUSCH instances may belong to different frequency hops based on the deferred PUSCH instances. The terminal may maintain phase coherence and/or power coherence in the fourth, fifth, sixth, seventh, and eighth PUSCH instances.

Referring to FIG. 16C, frequency hopping may be performed at a boundary between an invalid symbol and a valid symbol, and the maximum number of consecutive PUSCH instances may be indicated. Method 2.5-4 may be applied, and four or less PUSCH instances may belong to the same frequency hop. The terminal may maintain phase coherence and/or power coherence in the second, third, fourth, and fifth PUSCH instances. The terminal may maintain phase coherence and/or power coherence in the sixth, seventh, and eighth PUSCH instances.

FIG. 17 is a conceptual diagram illustrating a third exemplary embodiment of a method of applying frequency hopping to a PUSCH occasion in which a PUSCH instance is dropped by considering invalid symbols.

Referring to FIG. 17, Method 2.5-3 may be applied. The second, third, and fifth PUSCH instances may be dropped, and the remaining PUSCH instances may belong to different frequency hops. The sixth, seventh, and eighth PUSCH instances may belong to the same frequency hop. The terminal may maintain phase coherence and/or power coherence in the sixth, seventh, and eighth PUSCH instances.

Alternatively, Method 2.5-4 may be applied in the exemplary embodiment shown in FIG. 17. In this case, the number of consecutive PUSCH instances may be three. That is, the number of consecutive PUSCH instances may be smaller than the maximum number. Frequency hopping when Method 2.5-4 is applied may be the same as the frequency hopping when Method 2.5-3 is applied.

Figure 18A:
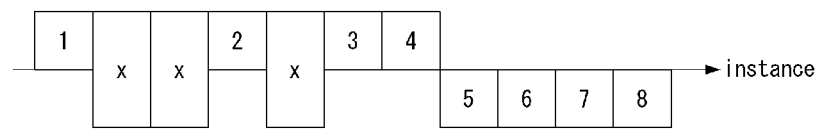
FIG. 18A is a conceptual diagram illustrating a fourth exemplary embodiment of a method of applying frequency hopping to a PUSCH occasion in which a PUSCH instance is deferred by considering invalid symbols.
Figure 18B:
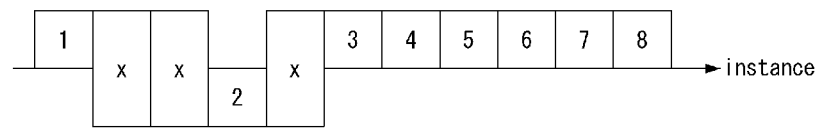
FIG. 18B is a conceptual diagram illustrating a fifth exemplary embodiment of a method of applying frequency hopping to a PUSCH occasion in which a PUSCH instance is deferred by considering invalid symbols.
Figure 18C:
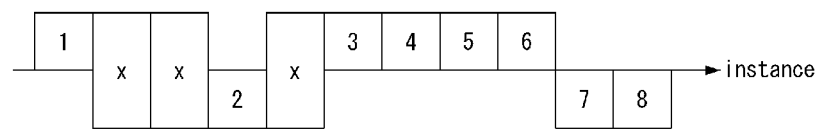
FIG. 18C is a conceptual diagram illustrating a sixth exemplary embodiment of a method of applying frequency hopping to a PUSCH occasion in which a PUSCH instance is deferred by considering invalid symbols.

FIG. 18A is a conceptual diagram illustrating a fourth exemplary embodiment of a method of applying frequency hopping to a PUSCH occasion in which a PUSCH instance is deferred by considering invalid symbols, FIG. 18B is a conceptual diagram illustrating a fifth exemplary embodiment of a method of applying frequency hopping to a PUSCH occasion in which a PUSCH instance is deferred by considering invalid symbols, and FIG. 18C is a conceptual diagram illustrating a sixth exemplary embodiment of a method of applying frequency hopping to a PUSCH occasion in which a PUSCH instance is deferred by considering invalid symbols.

Referring to FIG. 18A, a boundary of frequency hopping may be determined based on the maximum number of PUSCH instances. Three PUSCH instances may be deferred, and four PUSCH instances may be arranged non-consecutively. Four non-consecutive PUSCH instances may belong to the same frequency hop. In this case, the terminal may maintain phase coherence and/or power coherence of the PUSCH instances consecutive in the time domain among PUSCH instances belonging to the same frequency hop. Here, the consecutive PUSCH instances may be the third and fourth PUSCH instances or the fifth, sixth, seventh, and eighth PUSCH instances.

Referring to FIG. 18B, frequency hopping may be performed at a boundary between an invalid symbol and a valid symbol, and Method 2.5-3 may be applied. In this case, three PUSCH instances may be deferred, and the remaining PUSCH instances may belong to different frequency hops based on the deferred PUSCH instances. The terminal may maintain phase coherence and/or power coherence in the third, fourth, fifth, sixth, seventh, and eighth PUSCH instances.

Referring to FIG. 18C, frequency hopping may be performed at a boundary between an invalid symbol and a valid symbol, and the maximum number of consecutive PUSCH instances may be indicated. Method 2.5-4 may be applied, and fourth or less PUSCH instances may belong to the same frequency hop. The terminal may maintain phase coherence and/or power coherence in the third, fourth, fifth, and sixth PUSCH instances. The terminal may maintain phase coherence and/or power coherence in the seventh and eighth PUSCH instances.

2.6 Sub-PRB Based Transmission Method

In order to extend a UL coverage, a terminal may use a high transmit power. When the transmit power of the terminal increases, interference that the terminal exerts on other base stations may increase. The terminal may use the same transmit power and a narrow bandwidth (e.g., a small number of PRBs). In this case, since an energy per RE (EPRE) is high, a block error rate (BLER) at the base station may be decreased. Even when one or more PRBs are used, a PUSCH may not be transmitted in all subcarriers, and the PUSCH may be allocated to some subcarriers. The PUSCH may not be allocated to the remaining subcarrier(s). The terminal may increase the EPRE by allocating the transmit power only to the subcarriers used. In this case, the BLER at the base station may be further decreased.

When some subcarriers are used for PUSCH transmission in a plurality of PRBs, the base station may use a DM-RS in a wide band. Therefore, the base station may accurately estimate a channel using the wide-band DM-RS. The terminal may increase the EPRE only in some subcarriers. In this case, the BLER at the base station may be further decreased.

2.6.1 Method for DM-RS Allocation

A PUSCH DM-RS may be configured according to two schemes. When a DM-RS configuration 1 is used, a PUSCH DM-RS may be mapped at intervals of two subcarriers in the same symbol. When a DM-RS configuration 2 is used, a PUSCH DM-RS may be mapped at intervals of six subcarriers in the same symbol. The base station may indicate the DM-RS configuration 1 or the DM-RS configuration 2 to the terminal by using RRC signaling. The terminal may know which code division multiplexing (CDM) group is applied based on a scheduling DCI. Accordingly, the terminal may determine mapping of the PUSCH DM-RS.

Method 2.6-1: When a PUSCH is allocated in units of sub-PRBs, the base station may indicate a DM-RS configuration 1 or a DM-RS configuration 2 to the terminal by using RRC signaling.

Since a method in which a DM-RS is mapped may vary according to a DM-RS configuration, a channel may be estimated from subcarriers to which the DM-RS belonging to an allocated bandwidth is mapped. In addition, by applying an interpolation method, a channel for subcarriers to which the DM-RS is not mapped may be estimated.

Method 2.6-2: When a PUSCH is allocated in units of sub-PRBs, a DM-RS configuration 1 or a DM-RS configuration 2 defined in the technical specification may be used.

For example, only the DM-RS configuration 1 may be used. The base station may allocate a sub-PRB-based PUSCH only when the DM-RS configuration 1 is indicated to the terminal. In this case, the PUSCH may be allocated only to the subcarrier to which the DM-RS is mapped. In this case, it is not necessary to perform interpolation for the subcarriers to which the DM-RS is not mapped.

2.6.2 Methods for Data Allocation

Data (e.g., TB, UCI, or SCI) may be mapped in units of sub-PRBs. In this case, in order to reduce a peak to average power rate (PAPR), it may be preferable to perform a pre-processing procedure to obtain a single carrier property. For example, if a discrete Fourier transform (DFT) pre-processing is applied together with an inverse fast Fourier transform (IFFT), a single carrier property may be obtained.

Method 2.6-3: For subcarriers belonging to an allocated bandwidth, data may be mapped to equally spaced subcarriers, and the data may not be mapped to the remaining subcarriers.

For example, for transmission to which transform pre-coding is applied, subcarriers to which the data is mapped may not be consecutively arranged. That is, the subcarriers to which the data is mapped may always be arranged at equal intervals. The application of Method 2.6-3 may be extended. For example, when the size of a TB is large, a small number of subcarriers may be adjacent, and the adjacent subcarriers may be arranged at equal intervals. That is, with respect to subcarriers belonging to the allocated bandwidth, two or more subcarriers may be adjacent, the adjacent subcarriers may be arranged at equal intervals, the data may be mapped to the corresponding subcarriers, and the data may not be mapped on the remaining subcarriers. In this case, even when transform precoding is applied, multi-carrier property may be obtained. Therefore, the method(s) below may be applied.

Method 2.6-4: For subcarriers belonging to an allocated bandwidth, data may be mapped only to consecutive subcarriers within a PRB, and the data may not be mapped to the remaining subcarriers.

For example, the terminal may apply Method 2.6-3 or Method 2.6-4 according to a waveform for transmitting a PUSCH.

Meanwhile, subcarriers to which data is mapped and subcarriers to which a DM-RS is mapped may be allocated in the same PRB. The DM-RS and the data may be indicated independently of each other. Alternatively, the DM-RS and data may be indicated to have the same value (e.g., the same subcarriers). In this case, the performance of the channel estimation may be improved.

Method 2.6-5: When a CDM group of a DM-RS is indicated, this may be applied to a data mapping operation as well.

The terminal may map data only to subcarriers to which a CDM group of a DM-RS is mapped. Therefore, according to Method 2.6-5, the base station may estimate a channel based on a received DM-RS, and then may not apply interpolation to estimate a channel for the subcarriers to which the data is mapped. However, if the data is mapped only to the subcarriers indicated by the CDM group of the DM-RS, scheduling restriction may be large. Therefore, a method not limited to the above-described mapping method may be applied.

Method 2.6-6: A scheduling DCI (or scheduling RRC signaling message) may indicate subcarriers to which data is mapped, and subcarriers associated with a CDM group of a DM-RS may be indicated differently from the subcarriers to which the data is mapped.

A scheduling DCI (or, scheduling RRC signaling message) may indicate subcarrier sets that the data has. The subcarrier set(s) may be arranged at equal intervals. A small number of subcarriers belonging to the subcarrier set(s) may be contiguous, and the contiguous subcarriers may be arranged at equal intervals. When the subcarriers (e.g., contiguous subcarriers) are arranged at equal intervals, the base station may indicate (e.g., set) an offset of the subcarriers (e.g., only an offset of the subcarriers) to the terminal. If subcarriers are contiguously arranged and n contiguous subcarriers are again arranged at equal intervals, the base station may indicate (e.g., set) an index for a subcarrier set to the terminal. Here, n may be a natural number.

Meanwhile, in order to support the sub-PRB based PUSCH transmission, the base station may allocate a TB of a different size. When the number of subcarriers occupied by a sub-PRB is reflected, the TB size may be reduced. For example, when the terminal transmits a PUSCH using half of subcarriers, a value of a scaling factor may be ½, and the scaling factor may be reflected in the equation for deriving the TB size.

2.6.3 Exemplary Embodiment

A frequency hopping pattern may be applied within a PRB.

2.6.4 Exemplary Embodiment

Exemplary embodiments of a sub-PRB based PUSCH indicated to the terminal will be shown in FIGS. 19, 20, and 21. FIGS. 19, 20, and 21 may illustrate a method in which data is mapped to subcarriers for a PUSCH to which one or more PRBs are allocated. Here, a DM-RS (e.g., DM-RS configuration 1, DM-RS configuration 2, or CDM group)

may be allocated regardless of the data, and it may be indicated that the data and DM-RS are mapped to the same subcarriers.

Figure 19A:
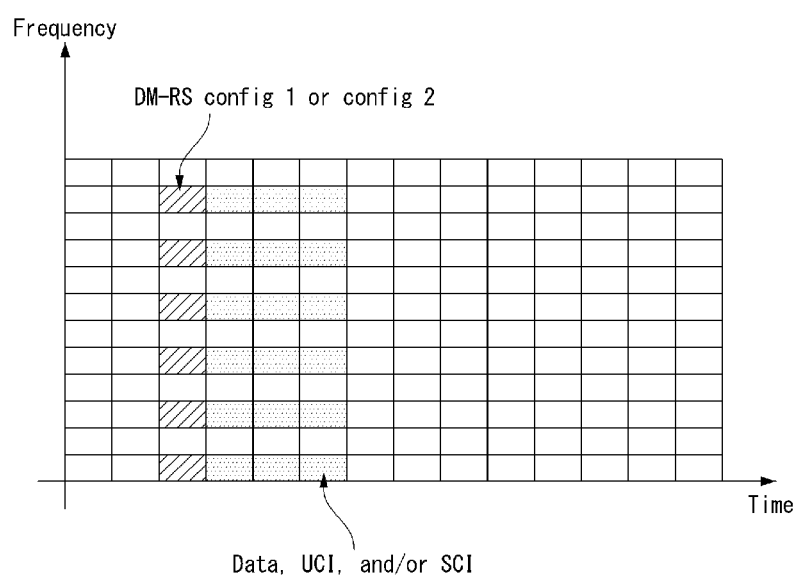
FIG. 19A is a conceptual diagram illustrating a first exemplary embodiment of an interleaved frequency division multiple access (IFDMA) mapping method for a sub-PRB-based PUSCH.
Figure 19B:
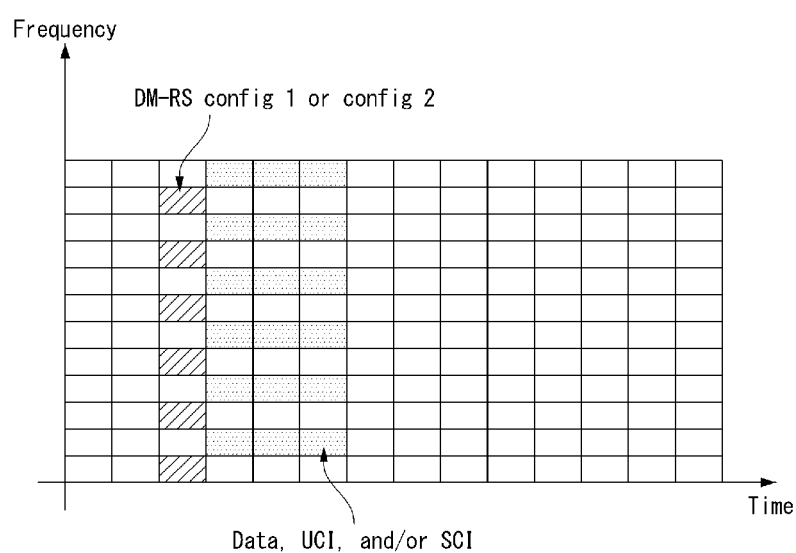
FIG. 19B is a conceptual diagram illustrating a second exemplary embodiment of an IFDMA mapping method for a sub-PRB-based PUSCH.

FIG. 19A is a conceptual diagram illustrating a first exemplary embodiment of an interleaved frequency division multiple access (IFDMA) mapping method for a sub-PRB-based PUSCH, and FIG. 19B is a conceptual diagram illustrating a second exemplary embodiment of an IFDMA mapping method for a sub-PRB-based PUSCH.

Referring to FIG. 19A, half of subcarriers in an allocated band may be used, and a subcarrier shift may be zero.

Referring to FIG. 19B, half of the subcarriers in an allocated band may be used, and a subcarrier shift may be 1. The value of the subcarrier shift in the exemplary embodiment shown in FIG. 19A may be different from the value of the subcarrier shift in the exemplary embodiment shown in FIG. 19B. The subcarrier shift may be indicated to the terminal by a scheduling DCI and/or RRC signaling.

Figure 20A:
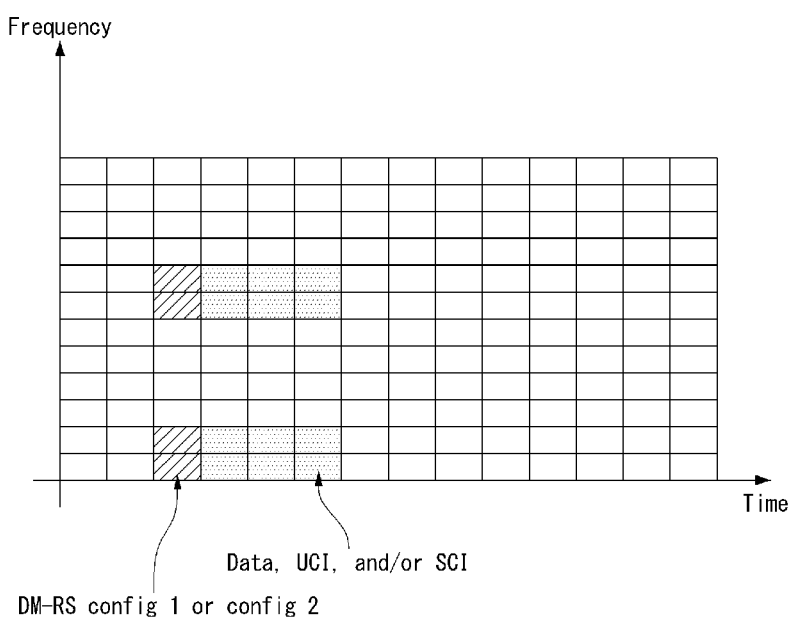
FIG. 20A is a conceptual diagram illustrating a first exemplary embodiment of a hybrid method of IFDMA mapping and localized mapping for a sub-PRB-based PUSCH.
Figure 20B:
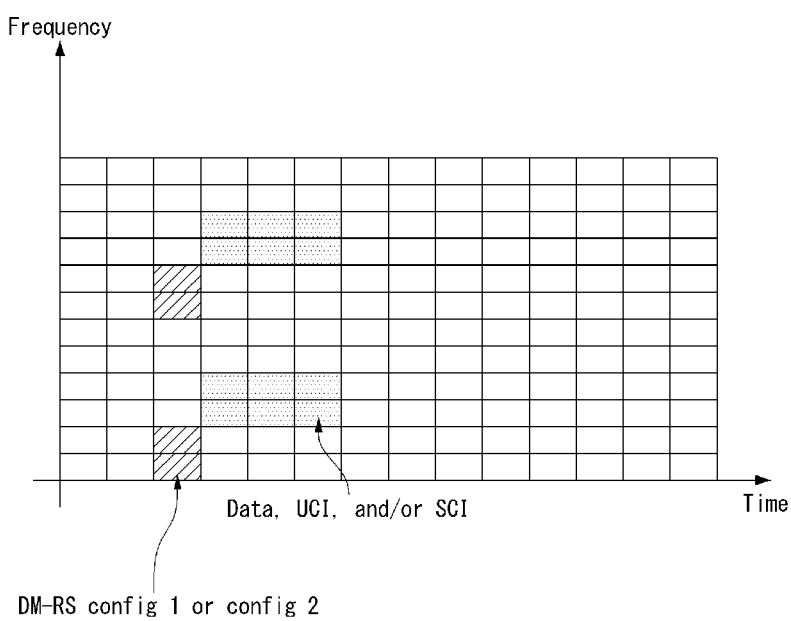
FIG. 20B is a conceptual diagram illustrating a second exemplary embodiment of a hybrid method of IFDMA mapping and localized mapping for a sub-PRB-based PUSCH.
Figure 20C:
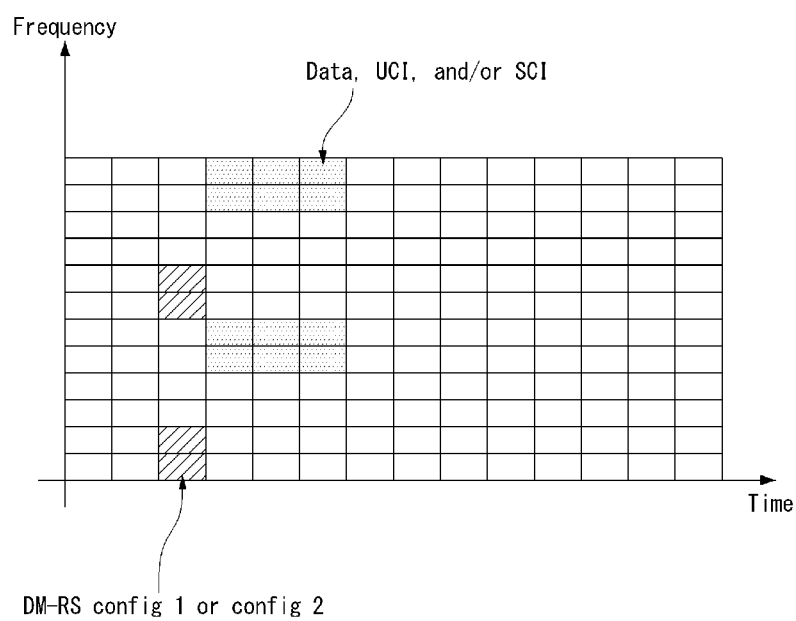
FIG. 20C is a conceptual diagram illustrating a third exemplary embodiment of a hybrid method of IFDMA mapping and localized mapping for a sub-PRB-based PUSCH.

FIG. 20A is a conceptual diagram illustrating a first exemplary embodiment of a hybrid method of IFDMA mapping and localized mapping for a sub-PRB-based PUSCH, FIG. 20B is a conceptual diagram illustrating a second exemplary embodiment of a hybrid method of IFDMA mapping and localized mapping for a sub-PRB-based PUSCH, and FIG. 20C is a conceptual diagram illustrating a third exemplary embodiment of a hybrid method of IFDMA mapping and localized mapping for a sub-PRB-based PUSCH.

Referring to FIGS. 20A, 20B, and 20C, some subcarriers in an allocated band may be utilized, and two contiguous subcarriers may be arranged at regular intervals. The subcarrier shift may be 0 in the exemplary embodiment shown in FIG. 20A, the subcarrier shift may be 1 in the embodiment shown in FIG. 20B, and the subcarrier shift may be 2 in the exemplary embodiment shown in FIG. 20C. That is, in the exemplary embodiments, different subcarrier shifts may be set. The subcarrier shift may be indicated to the terminal by a scheduling DCI and/or RRC signaling.

Figure 21A:
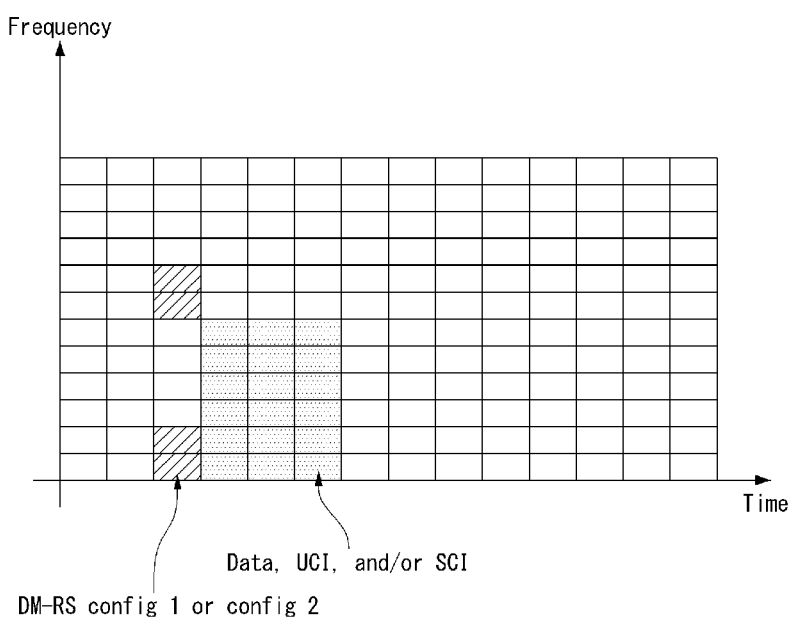
FIG. 21A is a conceptual diagram illustrating a first exemplary embodiment of a localized mapping method for a sub-PRB-based PUSCH.
Figure 21B:
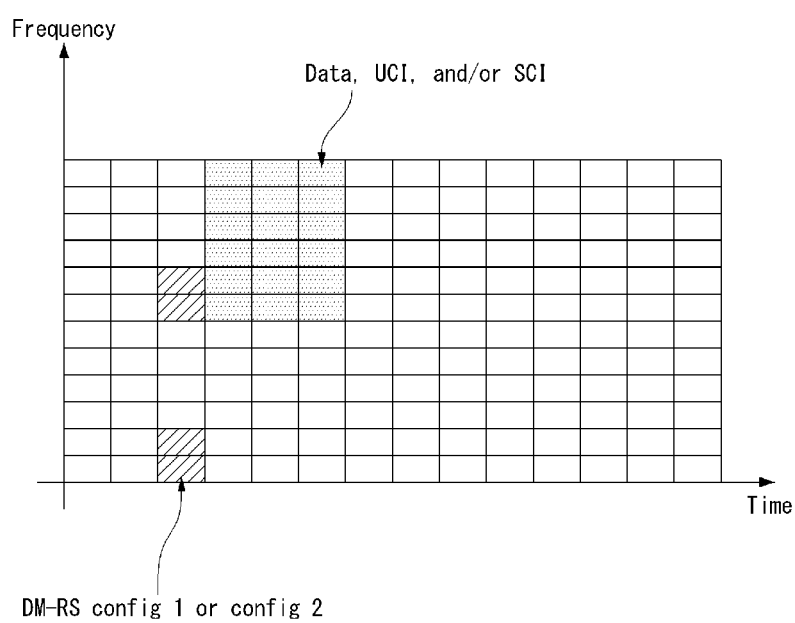
FIG. 21B is a conceptual diagram illustrating a second exemplary embodiment of a localized mapping method for a sub-PRB-based PUSCH.

FIG. 21A is a conceptual diagram illustrating a first exemplary embodiment of a localized mapping method for a sub-PRB-based PUSCH, and FIG. 21B is a conceptual diagram illustrating a second exemplary embodiment of a localized mapping method for a sub-PRB-based PUSCH.

Referring to FIGS. 21A and 21B, some subcarriers in an allocated band may be utilized. For example, six contiguous subcarriers may be utilized. The subcarrier shift may be 0 in the exemplary embodiment shown in FIG. 21A, and the subcarrier shift may be 1 in the exemplary embodiment shown in FIG. 21B. That is, in the exemplary embodiments, different subcarrier shifts may be set. The subcarrier shift may be indicated to the terminal by a scheduling DCI and/or RRC signaling.

Chapter 3 Methods for Extending a Coverage of PUCCH

A terminal located in an edge region of a cell may transmit a PUCCH (e.g., PUCCH format 1, 2, 3, or 4). In this case, a base station may estimate a UL channel based on a received DM-RS, and may demodulate the PUCCH based on a result of estimating the UL channel. The base station may identify a PUCCH format 1 based on a spreading code. The base station may identify a PUCCH format 2, 3, or 4 based on a Reed Muller code or a polar code. In this case, performance achieved by the base station may be defined as a BLER, ACK-to-NACK probability, NACK-to-ACK probability, and/or DTX-to-ACK probability.

The terminal located in an edge region of the cell may transmit a PUCCH. In this case, performance at the base station may be greatly affected by an estimation performance of a UL channel using a DM-RS. If an estimation error of the UL channel is large, the base station may not detect UCI. Therefore, when the PUCCH is repeatedly transmitted, a method for the base station to utilize all of PUCCH DM-RSs has been discussed in Chapter 2. The application method for a PUSCH DM-RS may be easily extended, and the extended method may also be applied to a PUCCH DM-RS.

As another method, when the PUCCH format 0 is used, a method in which spread UCI configures a UCCH without a separate DM-RS may be considered. In this case, the base station may not need to estimate the UL channel. Accordingly, the base station may detect the UCI by using a spreading code without estimating the UL channel. This method may be extended, and a new PUCCH format without DM-RS may be considered based on the extended method.

3.1 DM-RS-Less PUCCH

A DM-RS-less PUCCH may be used when the size of UCI is smaller than a preset size. The UCI size (e.g., preset size) for applying a DM-RS-less PUCCH may be defined in the technical specification. Alternatively, the base station may inform the terminal of the UCI size for applying a DM-RS-less PUCCH using RRC signaling. For example, the preset size may be 3 bits, 11 bits, or 16 bits or less.

When the UCI size is 3 bits or more, the terminal may generate a codeword by performing an encoding operation on an information word (e.g., information bits) of the UCI, generate modulation symbols (e.g., QPSK symbols) by performing a modulation operation on the codeword, and map the modulation symbols to REs.

According to the number of REs of the DM-RS-less PUCCH, an effective code rate of the codeword may be determined. For example, the information word may be k bits, and the code word may be n bits. Each of k and n may be a natural number. The base station may inform the terminal of the number (e.g., N) of REs of the DM-RS-less PUCCH. N may be a natural number. If the number of REs of the DM-RS-less PUCCH is N, N QPSK symbols may be required, and code blocks may be expressed by 2N bits.

When the number of code blocks is M, each (e.g., one codeword) of the M code blocks may be represented by 2N/M bits. To support this operation, cyclic extension may be applied. When the information word is k bits, a mapping relationship between an index corresponding to the k bits and the information word may be one to one. Each of the indexes may correspond to each spreading code. Accordingly, one index may correspond to one RE mapping. The spreading code may be a set of QPSK sequences (e.g., one-dimensional sequences) defined for each symbol. Alternatively, the spreading code may be a set of QPSK sequences mapped to a 2D resource grid defined in time and frequency.

Figure 22:
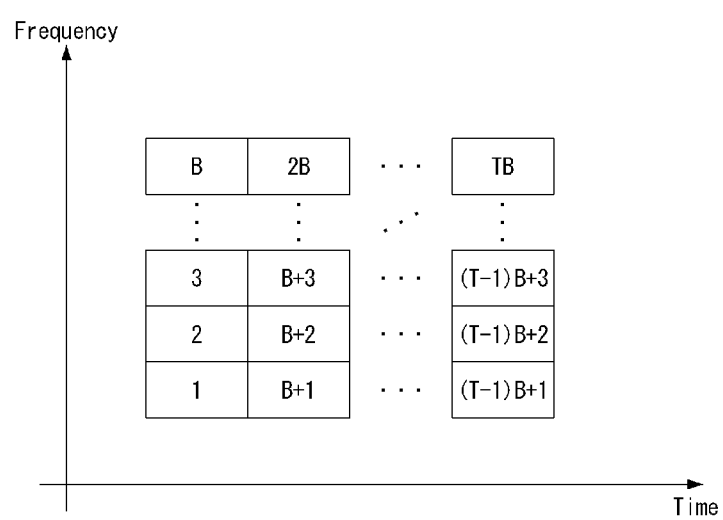
FIG. 22 is a conceptual diagram illustrating a first exemplary embodiment of a frequency-first RE mapping method.

FIG. 22 is a conceptual diagram illustrating a first exemplary embodiment of a frequency-first RE mapping method.

Referring to FIG. 22, a PUCCH (e.g., PUCCH resource) may be composed of T symbols and B subcarriers. That is, the PUCCH may be mapped to B×T REs. A frequency hopping operation may be configured by higher layer signaling. Alternatively, the exemplary embodiment shown in FIG. 22 may be regarded as RE mapping in a logical domain.

The base station may indicate (e.g., configure) one PUCCH resource to the terminal. The terminal may know that B×T REs are used for PUCCH transmission. The terminal may convert the information word (e.g., k-bit information word) into the codeword (e.g., n-bit codeword) by using a linear code defined in the technical specification.

In this case, a nominal code rate may be k/n. In order to utilize the entire PUCCH resource, the terminal may map code blocks of 2×B×T bits. When the codeword is expressed as $c_0, c_1, \ldots, c_{n-1}$, the extended codeword may be expressed by $c_0, c_1, \ldots, c_{n-1}, c_0, c_1, \ldots$, and the like. When there are M code blocks, the codeword may be extended to 2×B×T/M bits. Each code block may be modulated, and the modulated code blocks may be mapped to a resource grid in the order of the code blocks.

The bandwidth of the DM-RS-less PUCCH may be a specific combination. For example, the specific combination may be the number of PRBs that is a multiple of 2, 3, or 5. The value of B in FIG. 22 may be a value obtained by converting the bandwidth into the number of subcarriers.

The number of symbols of the DM-RS-less PUCCH may be restricted to one or two. Alternatively, the number of symbols of the DM-RS-less PUCCH may be restricted to four or more. Alternatively, there may be no restriction on the number of symbols of the DM-RS-less PUCCH. The number of symbols in the PUCCH may be derived from a PUCCH resource index.

3.1.1 Methods for Reflecting a Slot Format

A DM-RS-less PUCCH may be transmitted in a communication system supporting TDD. According to the amount of traffic in the communication system supporting TDD, a slot format may be indicated by a ratio of DL traffic and UL traffic. The slot format may be classified into a semi-static slot format and a dynamic slot format. The base station may indicate to the terminal a slot pattern having a preset period using RRC signaling. In this case, a slot may be classified into a DL slot, a UL slot, and a special slot. The special slot may be composed of a DL symbol(s), a FL symbol(s), and a UL symbol(s). When an FL symbol is indicated by RRC signaling, a terminal receiving a DCI format 2_0 may identify information (e.g., SFI) indicating the FL symbol as a DL symbol, FL symbol, or UL symbol.

Method 3.1-1: A DM-RS-less PUCCH may be transmitted in all of indicated time resources or some of the indicated time resources.

According to a slot format, the terminal may transmit a PUCCH not only in a UL symbol but also in an FL symbol. For example, the DM-RS-less PUCCH may include a HARQ-ACK for a PDSCH allocated by a DL-DCI. In this case, the terminal may transmit the PUCCH even in an FL symbol.

Figure 23A:
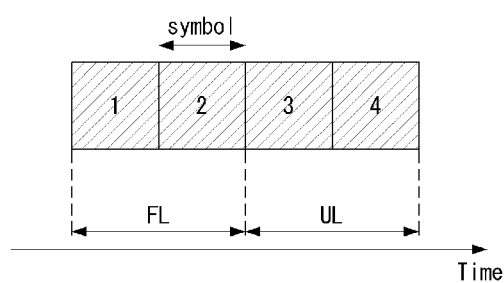
FIG. 23A is a conceptual diagram illustrating a first exemplary embodiment of a symbol mapping method based on an SFI.
Figure 23B:
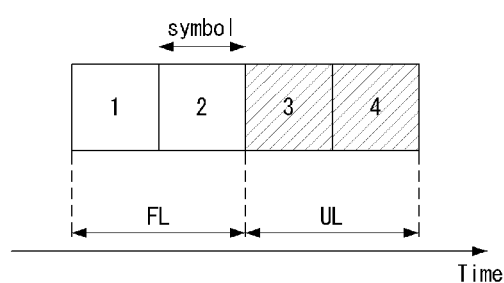
FIG. 23B is a conceptual diagram illustrating a second exemplary embodiment of a symbol mapping method based on an SFI.

FIG. 23A is a conceptual diagram illustrating a first exemplary embodiment of a symbol mapping method based on an SFI, and FIG. 23B is a conceptual diagram illustrating a second exemplary embodiment of a symbol mapping method based on an SFI.

Referring to FIG. 23A, a PUCCH may be transmitted in an FL symbol(s) and a UL symbol(s). A PUCCH consisting of four symbols may be transmitted.

Referring to FIG. 23B, the terminal may transmit a PUCCH only in a UL symbol(s). For example, the DM-RS-less PUCCH may include a HARQ-ACK for a PDSCH allocated by RRC signaling (or, PDSCH activated by a DCI). In this case, the terminal may transmit the PUCCH only in a UL symbol(s). The DM-RS-less PUCCH may be transmitted only in a valid symbol(s) (e.g., UL symbol(s)). That is, the PUCCH may be transmitted only in the UL symbol(s). Only two symbols in the PUCCH composed of four symbols may be transmitted.

When the PUCCH is transmitted only in some symbols, code block(s) of the UCI may be mapped regardless of the slot format. Alternatively, the code block(s) of the UCI may be mapped according to the slot format. The difference between Method 3.1-2 and Method 3.1-3 below may be in whether the slot format is applied in the mapping procedure of the code block(s) of the UCI.

Method 3.1-2: When Method 3.1-1 is applied, code block(s) of UCI may be mapped regardless of a slot format, and a PUCCH may be transmitted only in valid symbols.

The terminal may perform a symbol-based puncturing operation in order to transmit a PUCCH (e.g., DM-RS-less PUCCH) only in valid symbol(s) (e.g., UL symbol(s)). Since the PUCCH transmission is performed regardless of the slot format, implementation of the terminal may be simplified.

Method 3.1-3: Code block(s) of UCI, to which Method 3.1-1 is applied, may be mapped only to valid symbols according to a slot format. A PUCCH may be transmitted only in valid symbols.

The terminal may follow a slot format indicated by RRC signaling and/or a DCI format 2_0. In this case, the terminal may not be able to transmit a PUCCH in some symbols. Some symbols may be excluded from the mapping of the code block(s) of UCI. The terminal may perform a rate matching operation for mapping the code block(s) of UCI only to valid symbols. The terminal may first reflect RRC signaling and/or a DCI indicating the slot format, and then map the code block(s) of UCI.

According to the proposed method, only some symbols of the PUCCH may be transmitted, but a transmit power may be determined based on the assumption that all symbols constituting the PUCCH are transmitted.

3.1.2 Repetitive Transmission Method

When a terminal is located in an edge region of a cell, a base station may allocate a maximum power to a PUCCH, and may apply a minimum code rate to the PUCCH. In order to lower an error rate of the PUCCH, the base station may indicate to the terminal to repeatedly transmit the PUCCH.

The repeated transmission of the PUCCH may be indicated to the terminal by RRC signaling or by a combination of RRC signaling and a DCI. Accordingly, the terminal may repeatedly transmit the PUCCH. The PUCCH may be repeatedly transmitted using time resources and frequency resources in a slot or a sub-slot. The repeated transmission of the PUCCH may mean transmitting the PUCCH using the same PUCCH resource in consecutive slots or consecutive sub-slots. The number of PUCCH repetitions may be indicated to the terminal by RRC signaling or by a combination of RRC signaling and a DCI. For convenience of description, when the PUCCH is repeatedly transmitted, all PUCCHs may be referred to as a PUCCH occasion, and each PUCCH may be referred to as a PUCCH instance.

When a slot format is configured to the terminal, the number of transmissions of the PUCCH instance may be reduced. Alternatively, the number of transmissions of the PUCCH instance may be guaranteed. For example, in a system supporting FDD, according to a slot format indicated to the terminal, a PUCCH instance may not be transmitted in any slot (or sub-slot). Even in this case, the PUCCH instance may be regarded as having been transmitted. That is, the number of actual transmissions of the PUCCH instance may be reduced. For another example, in a communication system supporting TDD, according to a slot format indicated to the terminal, a PUCCH instance may not be transmitted in any slot (or sub-slot). In this case, the corresponding PUCCH instance may be transmitted in a next slot (or, sub-slot). That is, the number of transmissions of the PUSCH instance may be guaranteed.

Figure 24A:
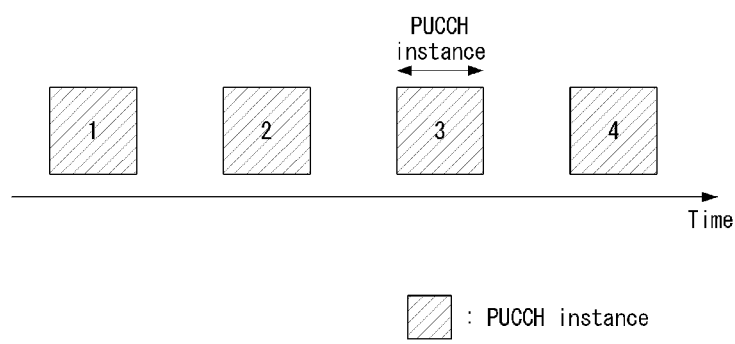
FIG. 24A is a conceptual diagram illustrating a first exemplary embodiment of a RE mapping method based on an SFI when a PUCCH is repeatedly transmitted.
Figure 24B:
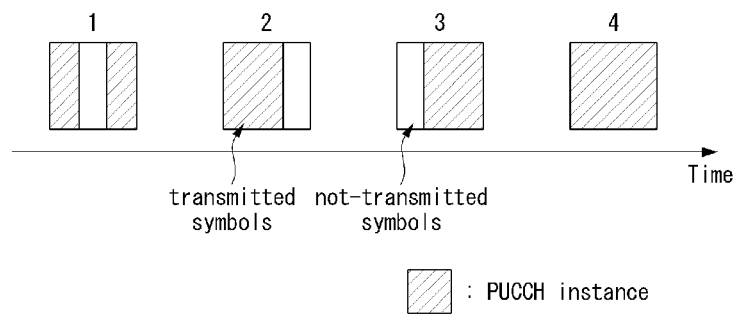
FIG. 24B is a conceptual diagram illustrating a second exemplary embodiment of a RE mapping method based on an SFI when a PUCCH is repeatedly transmitted.
Figure 24C:
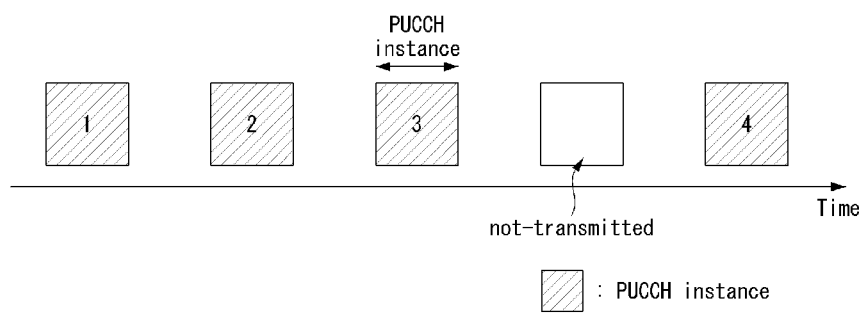
FIG. 24C is a conceptual diagram illustrating a third exemplary embodiment of a RE mapping method based on an SFI when a PUCCH is repeatedly transmitted.

FIG. 24A is a conceptual diagram illustrating a first exemplary embodiment of a RE mapping method based on an SFI when a PUCCH is repeatedly transmitted, FIG. 24B is a conceptual diagram illustrating a second exemplary embodiment of a RE mapping method based on an SFI when a PUCCH is repeatedly transmitted, and FIG. 24C is a conceptual diagram illustrating a third exemplary embodiment of a RE mapping method based on an SFI when a PUCCH is repeatedly transmitted.

Referring to FIGS. 24A, 24B, and 24C, the terminal may transmit a PUCCH occasion. According to a slot format, the transmission method of PUCCH instances may be classified in detail. In the exemplary embodiment shown in FIG. 24A, when a PUCCH instance is transmitted in all symbols (e.g., all symbols in consecutive slots (or sub-slots)) according to the slot format, the terminal may transmit the PUCCH instance four times by using four slots (or four sub-slots).

On the other hand, when a PUCCH instance is transmitted in some symbols according to the slot format, the method shown in FIG. 24B may be used.

In the exemplary embodiment shown in FIG. 24B, a PUCCH instance may be transmitted only in valid symbols. In order to transmit the PUCCH instance four times, four consecutive slots (e.g., sub-slots) may be considered. Some symbols among symbols belonging to the PUCCH instance may not be valid. That is, some symbols may be invalid symbols. In this case, the invalid symbols may not be used for transmission. If all symbols in the PUCCH instance are not valid, the corresponding PUCCH instance may not be transmitted.

In the exemplary embodiment shown in FIG. 24C, the number of transmissions of the PUSCH instance may be guaranteed. In order to transmit the PUCCH instance four times, five slots (e.g., sub-slots) may be used. The PUCCH occasion (e.g., PUCCH instances) may be transmitted in four non-consecutive slots (e.g., sub-slots). The PUCCH instance may be transmitted using all symbols.

A method of mapping the code block(s) of UCI to the PUCCH instance may be applied to each PUCCH instance. Alternatively, the method of mapping the code block(s) of UCI to the PUCCH instance may be applied in the PUCCH occasion.

Method 3.1-4: Code block(s) of UCI may be mapped identically for each PUCCH instance.

A PUCCH instance may always be mapped identically. For example, if a PUCCH instance is composed of L coded bits, in the exemplary embodiments shown in FIGS. 24B and 24C, code block(s) of UCI for the first PUCCH instance, $c_0, c_1, \ldots,$ and $c_{L-1}$ may be mapped according to a predefined order, and a modulation operation may be performed on the code block(s). The above-described mapping operation and modulation operation may be equally applied to the second PUCCH instance, the third PUCCH instance, and the fourth PUCCH instance. Thereafter, in the exemplary embodiment shown in FIG. 24B, a slot format may be considered. Invalid symbols in the PUCCH instance may be punctured. That is, the invalid symbols may not be transmitted. According to the proposed Method 3.1-4, the terminal may generate all PUCCH instances identically. Therefore, implementation of the terminal may be simplified.

Method 3.1-5: Code block(s) of UCI may be mapped in a PUCCH occasion. Accordingly, code blocks of consecutive UCIs may be mapped to adjacent PUCCH instances.

The PUCCH instances may be consecutive, and the code block(s) of UCI may be mapped on a PUCCH occasion basis. In the exemplary embodiment shown in FIG. 24B, the PUCCH instance may be transmitted only in some symbols according to the slot format. In this case, transmission symbols may be considered to be consecutively arranged. The code block(s) of UCI, $c_0, c_1, \ldots, c_{L-1}, c_0, c_1, \ldots,$ and the like may be mapped according to a preconfigured order, and a modulation operation may be performed on the code block(s). The above-described method may also be applied to symbols belonging to other PUCCH instances. The above-described method may be easily applied to the exemplary embodiment shown in FIG. 24C.

3.2 Methods for Enhancement in Frequency Domain

A PUSCH (e.g., PUSCH occasion) may be indicated to be transmitted K times. In this case, when frequency hopping is indicated not to be performed, a frequency resource of the PUCCH occasion may maintain the same PRB set within a time window in which the PUCCH occasion is transmitted. Alternatively, when frequency hopping is indicated to be performed, the frequency resource of the PUCCH occasion may include two or more PRB sets within the time window in which the PUCCH occasion is transmitted. The PRB set may refer to RB assignment indicated by a DCI for allocating the PUCCH occasion or RB assignment derived from a PRI and/or a CCE index indicated (or set) by RRC signaling.

In order to perform frequency hopping, the terminal may receive an RRC signaling message including information indicating activation or deactivation of the frequency hopping from the base station. If frequency hopping is activated, a DCI or RRC signaling message for allocating the PUCCH occasion may indicate whether frequency hopping is performed.

The terminal may transmit the PUCCH occasion by performing frequency hopping. In this case, a frequency multiplexing gain may be obtained by the base station. A frequency hopping scheme may be classified into a frequency hopping scheme within a slot (hereinafter, referred to as a 'first frequency hopping scheme') and a frequency hopping scheme at a slot boundary (hereinafter referred to as a 'second frequency hopping scheme').

When the first frequency hopping scheme is used, frequency hopping for the PUCCH instance may be performed, and the PUCCH instance may be repeated. Each of frequency hops may consist of half the of symbols constituting the PUCCH instance (or 'a maximum integer number of symbol(s) not greater than half of the symbols' or 'a minimum integer number of symbol(s) not less than half of the symbols').

When the second frequency hopping scheme is used, frequency hopping for the PUCCH instance may not be performed, and frequency hopping may be performed at a boundary between the PUCCH instances.

In order to perform joint channel estimation in the base station receiving the PUCCH occasion, phase coherence and/or power coherence for the PUCCH instances may be maintained. In order to support this operation, a new frequency hopping scheme may be needed. When the PUCCH instance is indicated to be repeatedly transmitted K times, frequency hopping may not be performed in as many PUCCH instances as possible, so that the base station can perform joint channel estimation. By performing the frequency hopping, the base station may obtain a frequency multiplexing gain.

Method 3.2-1: The first K/2 (or 'maximum integer number not greater than K/2' or 'minimum integer number not less than K/2') PUCCH instances may constitute a first frequency hop, and the remaining PUCCH instance(s) may constitute a second frequency hop.

Here, a PRB of the first frequency hop may be determined according to an index (e.g., odd or even number) of a slot to which the first PUCCH instance belongs. For example, the PRB of the first frequency hop may be determined as a starting PRB or the second PRB of the PUCCH. A PRB of the second frequency hop may be determined as a PRB (e.g., a starting PBR or the second PRB) not used by the first frequency hop.

The maximum number of PUCCH instances, the maximum length of the time window, and/or the maximum number of symbols for which power coherence and/or phase coherence are maintained may be determined according to capability of the terminal. In this case, Method 3.2-1 may be improved. In the improved Method 3.2-1, a predefined number may replace K/2. The exemplary embodiments below will be described based on K/2, but various values (e.g., predefined number) as well as K/2 may be applied to the exemplary embodiments below.

Method 3.2-2: a predefined number may be determined (or indicated or set) by capability of a terminal or RRC signaling. The number of PUCCH instances belonging to the same frequency hop may be derived.

In a communication system supporting FDD, a PUCCH occasion may be transmitted in consecutive slots. When the PUCCH occasion is repeatedly transmitted K times, the PUCCH occasion may be transmitted in K consecutive slots. In a communication system supporting TDD, a PUCCH occasion may be transmitted in non-consecutive slots according to a slot pattern. Exemplary embodiments for interpretation of a time window in which the PUCCH occasion can be transmitted and transmission of the PUCCH instance may be illustrated in FIG. 24. If some symbols are invalid, PUCCH instances may not be transmitted in consecutive time resources. The reason is that invalid symbols (e.g., DL symbol, FL symbol, SS/PBCH block, type0-PDCCH CSS set, invalid symbol pattern) may be located between the PUCCH instances.

In this case, the terminal may not be able to maintain phase coherence and power coherence. Therefore, in order to apply Method 3.2-1 to a communication system supporting TDD, improvement of Method 3.2-1 may be required.

Method 3.2-3: At least frequency hopping may be performed at a boundary between an invalid symbol and a valid symbol belonging to a PUCCH occasion.

When there is no invalid symbol, frequency hopping may not be performed in the PUCCH occasion. In order to solve this problem, the maximum number of adjacent PUCCH instances belonging to the same frequency hop may be restricted.

Method 3.2-4: In Method 3.2-3, the number of adjacent PUCCH instances belonging to the same frequency hop may not be greater than a predefined number.

The predefined number may be determined in the procedure of allocating the PUCCH occasion. For example, the predetermined number may be determined as K/2 (or a minimum integer not less than K/2 or a maximum integer not greater than K/2).

In the transmission procedure of the PUCCH occasion, the number of PUCCH instances that cannot be transmitted due to invalid symbols may be guaranteed to K.

3.2.1 Exemplary Embodiment

For a PUCCH occasion, K=8 may be indicated. The terminal may maintain phase coherence and/or power coherence in four (=K/2) consecutive PUCCH instances (Method 3.2-1). The base station may indicate (or set) four to the terminal using RRC signaling. In this case, the terminal may maintain phase coherence and/or power coherence for a time corresponding to four PUSCH instances (Method 3.2-2). The terminal may maintain phase coherence and/or power coherence for a time corresponding to four or less PUCCH instances according to capability of the terminal (Method 3.2-2).

Figure 25A:
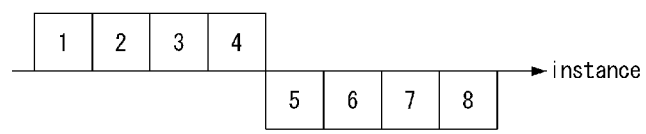
FIG. 25A is a conceptual diagram illustrating a first exemplary embodiment of a frequency hopping method for a PUCCH occasion.
Figure 25B:
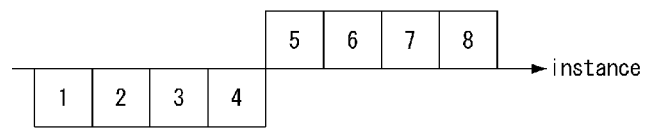
FIG. 25B is a conceptual diagram illustrating a second exemplary embodiment of a frequency hopping method for a PUCCH occasion.

FIG. 25A is a conceptual diagram illustrating a first exemplary embodiment of a frequency hopping method for a PUCCH occasion, and FIG. 25B is a conceptual diagram illustrating a second exemplary embodiment of a frequency hopping method for a PUCCH occasion.

Referring to FIG. 25A, a PUCCH occasion may consist of only valid symbols, and a frequency hop to which the first PUCCH instance belongs may be the first hop. The first PUCCH instance may be transmitted in a frequency hop determined based on a starting PRB.

Referring to FIG. 25B, a PUCCH occasion may consist of only valid symbols, and a frequency hop to which the first PUCCH instance belongs may be the second hop. The first PUCCH instance may be transmitted in a frequency hop determined based on a starting PRB and a hopping offset.

When a PUCCH instance is not dropped due to an invalid symbol, if Method 3.2-1 or Method 3.2-2 is applied, four PUCCH instances may belong to the same frequency hop. Frequency hopping may be performed at a boundary between the fourth PUCCH instance and the fifth PUCCH instance.

When some PUCCH instances are deferred, Methods 3.2-3 and 3.2-4 may be applied. An exemplary embodiment in which the second and third PUCCH instances are deferred due to invalid symbols will be shown in FIG. 26. An exemplary embodiment in which the second, third, and fifth PUSCH instances are deferred due to invalid symbols will be shown in FIG. 27.

Figure 26A:
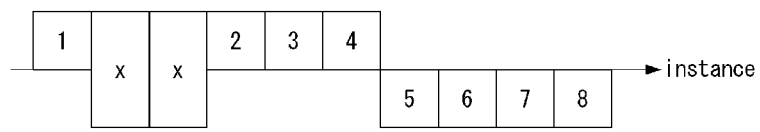
FIG. 26A is a conceptual diagram illustrating a first exemplary embodiment of a frequency hopping method of a PUCCH occasion in which a PUCCH instance is deferred by considering invalid symbols.
Figure 26B:
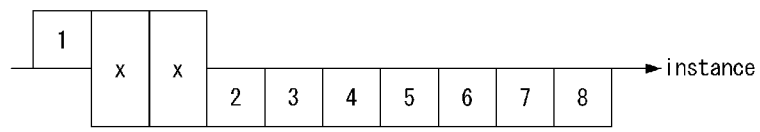
FIG. 26B is a conceptual diagram illustrating a second exemplary embodiment of a frequency hopping method of a PUCCH occasion in which a PUCCH instance is deferred by considering invalid symbols.
Figure 26C:
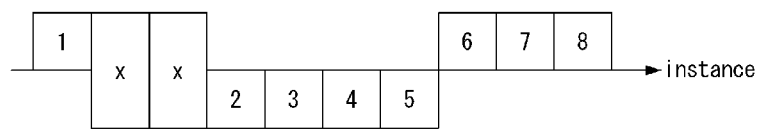
FIG. 26C is a conceptual diagram illustrating a third exemplary embodiment of a frequency hopping method of a PUCCH occasion in which a PUCCH instance is deferred by considering invalid symbols.

FIG. 26A is a conceptual diagram illustrating a first exemplary embodiment of a frequency hopping method of a PUCCH occasion in which a PUCCH instance is deferred by considering invalid symbols, FIG. 26B is a conceptual diagram illustrating a second exemplary embodiment of a frequency hopping method of a PUCCH occasion in which a PUCCH instance is deferred by considering invalid symbols, and FIG. 26C is a conceptual diagram illustrating a third exemplary embodiment of a frequency hopping method of a PUCCH occasion in which a PUCCH instance is deferred by considering invalid symbols.

Referring to FIG. 26A, a boundary of frequency hopping may be determined based on the maximum number of PUCCH instances. Two PUCCH instances may be deferred, and four non-consecutive PUCCH instances may belong to the same frequency hop. In this case, the PUCCH instances consecutive in the time domain among the PUCCH instances belonging to the same frequency hop may maintain phase coherence and/or power coherence. Here, phase coherence and/or power coherence may be maintained in the second, third, and fourth PUCCH instances, and phase coherence and/or power coherence may be maintained in the fifth, sixth, seventh, and eighth PUCCH instances.

Referring to FIG. 26B, frequency hopping may be performed at a boundary between an invalid symbol and a valid symbol. When Method 3.2-3 is applied, two PUCCH instances may be deferred, and the remaining PUCCH instances may belong to different frequency hops based on the deferred PUCCH instances. Phase coherence and/or power coherence may be maintained in the fourth, fifth, sixth, seventh, and eighth PUCCH instances.

Referring to FIG. 26C, frequency hopping may be performed at a boundary between an invalid symbol and a valid symbol, and the maximum number of consecutive PUCCH instances may be set. When Method 3.2-4 is applied, four or less PUCCH instances may belong to the same frequency hop. The terminal may maintain phase coherence and/or power coherence in the second, third, fourth, and fifth PUCCH instances. In addition, the terminal may maintain phase coherence and/or power coherence in the sixth, seventh, and eighth PUCCH instances.

Figure 27A:
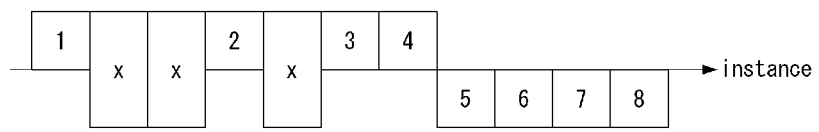
FIG. 27A is a conceptual diagram illustrating a fourth exemplary embodiment of a frequency hopping method of a PUCCH occasion in which a PUCCH instance is deferred by considering invalid symbols.
Figure 27B:
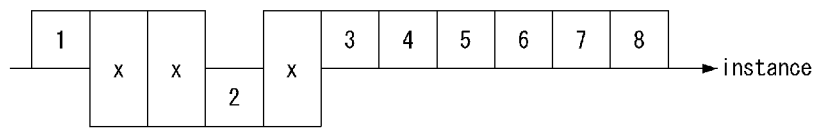
FIG. 27B is a conceptual diagram illustrating a fifth exemplary embodiment of a frequency hopping method of a PUCCH occasion in which a PUCCH instance is deferred by considering invalid symbols.
Figure 27C:
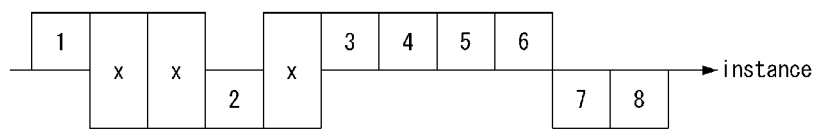
FIG. 27C is a conceptual diagram illustrating a sixth exemplary embodiment of a frequency hopping method of a PUCCH occasion in which a PUCCH instance is deferred by considering invalid symbols.

FIG. 27A is a conceptual diagram illustrating a fourth exemplary embodiment of a frequency hopping method of a PUCCH occasion in which a PUCCH instance is deferred by considering invalid symbols, FIG. 27B is a conceptual diagram illustrating a fifth exemplary embodiment of a frequency hopping method of a PUCCH occasion in which a PUCCH instance is deferred by considering invalid symbols, and FIG. 27C is a conceptual diagram illustrating a sixth exemplary embodiment of a frequency hopping method of a PUCCH occasion in which a PUCCH instance is deferred by considering invalid symbols.

Referring to FIG. 27A, a boundary of frequency hopping may be determined based on the maximum number of PUCCH instances. Three PUCCH instances may be deferred, and four non-consecutive PUCCH instances may belong to the same frequency hop. In this case, phase coherence and/or power coherence for consecutive PUCCH instances in the time domain among PUCCH instances belonging to the same frequency hop may be maintained. Here, phase coherence and/or power coherence may be maintained in the third and fourth PUCCH instances, and phase coherence and/or power coherence may be maintained in the fifth, sixth, seventh, and eighth PUCCH instances.

Referring to FIG. 27B, frequency hopping may be performed at a boundary between an invalid symbol and a valid symbol. When Method 3.2-3 is applied, three PUCCH instances may be deferred, and the remaining PUCCH instances may belong to different frequency hops based on the deferred PUCCH instances. Phase coherence and/or power coherence may be maintained in the third, fourth, fifth, sixth, seventh, and eighth PUCCH instances.

Referring to FIG. 27C, frequency hopping may be performed at a boundary between an invalid symbol and a valid symbol, and the maximum number of consecutive PUCCH instances may be set. When Method 3.2-4 is applied, four or less PUCCH instances may belong to the same frequency hop. The terminal may maintain phase coherence and/or power coherence in the third, fourth, fifth, and sixth PUCCH instances. In addition, the terminal may maintain phase coherence and/or power coherence in the seventh and eighth PUCCH instances.

3.3 Methods for Enhancement of Power Control

In order to extend a coverage of a PUCCH, repeated transmission of a PUCCH occasion may be indicated to the terminal. The terminal may receive an RRC signaling message including information indicating a repetition transmission method (e.g., repetition type) from the base station. For convenience of description, similarly to the exemplary embodiment of the PUSCH occasion, the repeated transmission method of the PUCCH occasion may be classified into a PUCCH repetition type A and a PUCCH repetition type B.

When the PUCCH repetition type A is used, the terminal may transmit a PUCCH more than once. The minimum interval between the first symbol in the first PUCCH transmission and the first symbol in the second PUCCH transmission may be one slot or one sub-slot. The first PUCCH transmission and the second PUCCH transmission may be adjacent PUCCH transmissions. When the PUCCH repetition type B is used, the terminal may transmit a PUCCH two or more times. The minimum interval between the first symbol in the first PUCCH transmission and the first symbol in the second PUCCH transmission may be symbols of the PUCCH. The first PUCCH transmission and the second PUCCH transmission may be adjacent PUCCH transmissions. The PUCCH repetition type A may be used to extend the coverage of the PUCCH. The PUCCH repetition type B may be used to reduce an error rate and/or latency of the PUCCH.

For convenience of description, a PUCCH being transmitted once may be referred to as a 'PUCCH instance', and one or more PUCCH instances may constitute one PUCCH occasion.

Alternatively, a PUCCH occasion may be transmitted based on a PUCCH repetition types C, D, or BB. Each of the PUCCH repetition types C, D, and BB may correspond to the above-described PUSCH repetition types C, D, and BB.

The same TPC command may be applied to all PUCCH instance(s) belonging to the PUCCH occasion. Since the number of symbols in each of the PUCCH instances may be different, the PUCCH instances may not have the same transmit power.

The transmit power applied to the PUCCH instance may be calculated based on an equation presented in the technical specification. For example, according to the new radio (NR) technical specification, the transmit power may be calculated based on Equation 3 below.

$$P(i,u,q,l) \text{ [dBm]} = P_O(u) + 10 \cdot \log_{10}(2^\mu \cdot M_{RB}(i)) + PL(q) + \Delta_F(i) + \Delta(i) + g(i,l) \quad \text{[Equation 3]}$$

Here, P(i,u,q,l) may be applied to a PUCCH instance i. u may represent a set of parameter(s) for calculating the transmit power. q may indicate an index of a DL-RS or UL-RS used by the terminal to estimate a path loss. l may be an index of a set managing TPC commands.

$P_O(u)$ may be a reference variable of the transmit power for the PUCCH instance. When the reference RS (e.g., reference variable) is u, a value corresponding to u may be indicated (e.g., set) by RRC signaling. μ may be a variable for a subcarrier spacing used by the PUCCH instance. PL(q) may be the amount of the DL path loss calculated based on q that indicates a reference RS. PL(q) may be estimated by the terminal. g(i,l) may be an accumulated value of TPC commands for the l-th power control loop.

$\Delta_F(i)$ may be set by RRC signaling. $\Delta_F(i)$ may be set differently for each PUCCH format. Also, Δ(i) may have a different value for each PUCCH format. When a PUCCH format 0 or PUCCH format 1 is used, $\Delta_F(i)$ or Δ(i) may be determined by a function of the number of bits of UCI and the number of symbols of the PUCCH. When a PUCCH format 2, PUCCH format 3, or PUCCH format 4 is used, $\Delta_F(i)$ or Δ(i) may be determined by a function according to the amount of UCI. This function may be vary depending on the encoding method applied to the UCI.

$M_{RB}(i)$ may be the number of RBs to which the PUCCH instance is mapped. The parameter may be classified into an open-loop control parameter and a closed-loop control parameter. For example, the terminal may measure the path loss by itself, and may update PL(q) based on a result of the measurement. The above-described parameters may be an open loop control parameter. For example, the terminal may receive a TPC command and may update g(i,l) based on the received TPC command. The above-described parameters may be a closed-loop control parameter.

Method 3.3-1: A transmit power applied to a PUCCH instance may be derived according to the technical specification.

A PUCCH instance may belong to a slot (or subframe) to which a new TA, a new TPC command, or a new path loss is applied. In this case, the TA, TPC command, or path loss may be applied differently to adjacent PUCCH instances.

Method 3.3-2: A transmit power applied to a PUCCH instance may be derived from a reference PUCCH instance, and a PUCCH occasion may be transmitted by reusing the derived transmit power.

For example, a transmit power applied to the first PUCCH instance belonging to a PUCCH occasion may be equally applied to the remaining PUCCH instance(s). In addition, for all PUCCH instances belonging to the PUCCH occasion, it may be preferable for the terminal not to update both open-loop control parameters and closed-loop control parameters. This operation will be described below.

Method 3.3-3: For a transmit power applied to a PUCCH instance, the terminal may not update PL(q) and/or g(i,l).

Chapter 4 Methods for Extending a Coverage of Signals in an Initial Access Procedure 4.1 PUSCH Used in an Initial Access Procedure A UL coverage may be interpreted as an outage probability of a PUSCH. A PUSCH in an initial access procedure may refer to a message 3 PUSCH (e.g., Msg3) or a message A PUSCH (e.g., MsgA). In order to extend a UL coverage, a base station may indicate to a terminal that a high transmit power is allocated to the PUSCH. Alternatively, in order to extend a UL coverage, the number of PUSCH transmissions (e.g., time resources) may be increased. When a PUSCH transmit power of a terminal located at an edge of a UL coverage is increased, interference caused by the PUSCH transmission to other base stations may increase. Therefore, instead of increasing a transmit power, it may be preferable to transmit a PUSCH for a long time.

Method 4.1-1: A RACH procedure performed by a terminal (e.g., terminal located in an edge region) and/or parameters required for the RACH procedure may be indicated using a system information block (SIB) and/or a dedicated control message. The RACH procedure performed by the terminal located in an edge region (e.g., terminal having a low reception quality) and/or parameters required for the RACH procedure may be distinguished from the RACH procedure performed by a terminal not located in an edge region (e.g., terminal having a high reception quality) and/or parameters required for the RACH procedure For example, a random access (RA) procedure (e.g., RACH procedure, PRACH procedure) may be classified into a first RA procedure and a second RA procedure. In the first RA procedure, repeated transmission of a message (e.g., Msg1, Msg2, Msg3, Msg4, MsgA, and/or MsgB) in the first RA procedure may not be performed, and in the second RA procedure, repeated transmission of the message (e.g., Msg1, Msg2, Msg3, Msg4, MsgA, and/or MsgB) may performed. The base station may transmit an SIB and/or dedicated control message including configuration information of the first RA procedure and configuration information of the second RA procedure. The configuration information of the first RA procedure (e.g., parameters required for the first RA procedure) may be referred to as first RA configuration information, and the configuration information of the second RA procedure (e.g., parameters required for the second RA procedure) may be referred to as second RA configuration information. The terminal may receive the first RA configuration information and the second RA configuration information from the base station. When a predefined condition is satisfied, the terminal may perform the first RA procedure based on the first RA configuration information. When the predefined condition is not satisfied, the terminal may perform the second RA procedure based on the second RA configuration information. In the second RA procedure, the terminal may repeatedly transmit a PUSCH (e.g., Msg3 or MsgA).

Here, the predefined condition may be a case in which a measurement result (e.g., received signal strength, reception quality) of a signal received from the base station exceeds a threshold. For example, the terminal may perform a measurement operation on a synchronization signal and/or a reference signal received from the base station. When a result of the measurement operation exceeds the threshold (e.g., when the predefined condition is satisfied), the terminal may perform the first RA procedure using the first RA configuration information. In this case, the terminal may determine that it is not located in an edge region. When the result of the measurement operation is less than or equal to the threshold (e.g., when the predefined condition is not satisfied), the terminal may perform the second RA procedure using the second RA configuration information. In this case, the terminal may determine that it is located in an edge region.

The second RA configuration information (e.g., RACH configuration and/or RACH-related parameters) used when the result of the measurement operation (e.g., reference signal received power (RSRP) of SS/PBCH block, a relative position of the terminal (e.g., estimated value of the position), a relative position of the base station (e.g., estimated value of the position)) is less than or equal to the threshold may be configured independently of the first RA configuration information (e.g., RACH configuration and/or RACH-related parameters) used when the above-described result of measurement operation exceeds the threshold. That is, the RA procedure (e.g., the second RA procedure) performed when the result of the measurement operation is less than or equal to the threshold may be distinguished from the RA procedure (e.g., the first RA procedure) performed when the result of the measurement operation exceeds the threshold.

The RA configuration information (e.g., the first RA configuration information and/or the second RA configuration information) may include the threshold that is a comparison criterion for the measurement result of the terminal. The terminal may determine whether it is located in an edge region by using the threshold. When the result of the measurement operation performed in the terminal is less than or equal to the threshold, the terminal may determine that it is located in a boundary region. In this case, the terminal may perform a new RA procedure (e.g., random access procedure, initial access procedure). The new RA procedure may be the second RA procedure using the second RA configuration information.

In the new RA procedure, a specific PRACH occasion, use of a specific PRACH preamble index, repeated transmission of a PRACH preamble (e.g., Msg1), use of an appropriate PRACH preamble format, repeated transmission of Msg2, repeated transmission of Msg3, repeated transmission of Msg4, repeated transmission of MsgA, and/or repeated transmission of MsgB may be supported. Information indicating whether the terminal supports repeated transmission of Msg1, repeated transmission of Msg2, repeated transmission of Msg3, repeated transmission of Msg4, repeated transmission of MsgA, and/or repeated transmission of MsgB may be transmitted from the terminal to the base station in the initial access procedure or in a separate procedure after the initial access procedure.

When the result of the measurement operation performed by the terminal exceeds the threshold, the terminal may determine that it is not located in an edge region. In this case, the terminal may perform the conventional RA procedure. The conventional RA procedure may be the first RA procedure using the first RA configuration information. In the conventional RA procedure, repeated transmission of Msg1, repeated transmission of Msg2, repeated transmission of Msg3, repeated transmission of Msg4, repeated transmission of MsgA, and/or repeated transmission of MsgB may not be supported.

The RA configuration information may include parameters for transmission of a PRACH preamble. For example, the RA configuration information may include a PRACH mask and/or an allowable PRACH preamble index (e.g., a set of PRACH preamble indexes).

The RA configuration information may include resource mapping information between PRACH (e.g., Msg1 or MsgA) and PUSCH (e.g., Msg3 or MsgB). For example, a slot offset between a transmission slot of the PRACH and a transmission slot of the PUSCH may be included in the RA configuration information. The terminal may derive the first slot in which the PUSCH is transmitted using the slot offset.

The RA configuration information may include information on repeated transmission of the PUSCH. The information on the repeated transmission of the PUSCH may be independent of the resource mapping information between the PRACH and the PUSCH. In this case, the information on the repeated transmission of the PUSCH may include time resource information (e.g., time resource location, information indicating a time resource of the first PUSCH (e.g., offset)), the number of repetitions, and/or MCS.

The base station may determine whether the terminal is located in an edge region based on a PRACH preamble format, a PRACH mask, and/or a resource (e.g., PRACH occasion) used in the RA procedure. That is, the base station may determine whether the result of the measurement operation in the terminal is less than or equal to the threshold. For example, a PRACH preamble for the first RA procedure may be distinguished from a PRACH preamble for the second RA procedure, and a PRACH mask for the first RA procedure may be distinguished from a PRACH mask for the second RA procedure. A PRACH occasion for the first RA procedure may be distinguished from a PRACH occasion for the second RA procedure.

Alternatively, the PRACH preamble for the first RA procedure may be distinguished from the PRACH preamble for the second RA procedure, and the PRACH mask for the first RA procedure may be distinguished from the PRACH mask for the second RA procedure. Even in this case, the PRACH occasion for the first RA procedure may not be distinguished from the PRACH occasion for the second RA procedure. The first RA procedure and the second RA procedure may share the same PRACH occasion. That is, the PRACH occasion for the first RA procedure and the PRACH occasion for the second RA procedure may be a shared PRACH occasion. When the PRACH occasion for the first RA procedure and the PRACH occasion for the second RA procedure are configured as a shared PRACH occasion, the first RA procedure (e.g., the PRACH preamble for the first RA procedure) may be distinguished from the second RA procedure (e.g., the PRACH preamble for the second RA procedure) by a PRACH mask (or PRACH sub-mask).

Here, a PRACH mask may be subdivided into PRACH sub-mask(s). That is, PRACH sub-masks may be introduced. One PRACH sub-mask may be used for the first RA procedure, and another PRACH sub-mask may be used for the second RA procedure.

When the terminal is located in an edge region (e.g., when the result of the measurement operation in the terminal is less than or equal to the threshold), the base station may transmit a MAC UL grant for allocating a PUSCH (e.g., PUSCH resource) to the terminal through a PDSCH. The MAC UL grant may be referred to as a UL grant.

FIG. 28 is a conceptual diagram illustrating a first exemplary embodiment of a MAC random access response (RAR) or fallback RAR.

Referring to FIG. 28, a MAC RAR or fallback RAR may include a timing advance (TA) command, a UL grant (e.g., MAC UL grant), and a temporary cell (TC)-radio network temporary identifier (RNTI). The MAC UL grant may include one or more fields defined in Table 3 below.

TABLE 3

| RAR grant field | Number of bits |
| --- | --- |
| Frequency hopping flag | 1 |
| PUSCH frequency resource allocation | 14: operation without shared spectrum channel access<br>12: operation with shared spectrum channel access |
| PUSCH time resource allocation | 4 |
| TPC command for PUSCH | 3 |
| CSI request | 1 |
| ChannelAccess-CPext | 0: operation without shared spectrum channel access<br>2: operation with shared spectrum channel access |

When an RRC connection is not configured between the terminal and the base station, the base station may inform the terminal of the number of PUSCH repetitions by using another method instead of RRC signaling. For example, in a step of allocating the PUSCH (e.g., PUSCH resource), the base station may transmit a MAC RAR (or fallback RAR) including information indicating the number of PUSCH repetitions to the terminal.

Method 4.1-2: Information indicating the number of PUSCH repetitions (e.g., Msg3 or MsgA) may be included in a MAC RAR or fallback RAR. For example, information indicating the number of PUSCH repetitions may be included in a UL grant field (or another field) of the MAC RAR (or fallback RAR).

In the initial access procedure, a PUSCH may be scheduled by a PDSCH (e.g., MAC UL grant). One or more bits included in the MAC UL grant may indicate the number K of PUSCH repetitions. The terminal may repeatedly transmit the PUSCH by using the same time resource in each of K consecutive slots. The same time resource in each of the K consecutive slots may be indicated by a start and length indicator value (SLIV). That is, the same SLIV may be applied to the K consecutive slots. Alternatively, the terminal may repeatedly transmit the PUSCH K times using the minimum slots in which the PUSCH can be transmitted. In this case, the PUSCH may be repeatedly transmitted using the same time resource in each of the slots.

The MAC UL grant may be expressed by many bits to include a field indicating the number of PUSCH repetitions. Reserved bit(s) in the MAC RAR (or fallback RAR) may be used to indicate the number of PUSCH repetitions. The reserved bit(s) indicating the number of PUSCH repetitions may be included in the MAC UL grant. Alternatively, the reserved bit(s) of the MAC RAR (or fallback RAR) may indicate that repeated transmission of the PUSCH is performed or that the PUSCH is transmitted once (e.g., that repeated transmission of the PUSCH is not performed). In this case, the number of PUSCH repetitions may be indicated to the terminal by the MAC UL grant. The index indicated by the base station may implicitly indicate the number of PUSCH repetitions. In this case, the terminal may identify the number of PUSCH repetitions based on the index indicated by the base station. The MAC RAR (or fallback RAR) may include a field that explicitly indicates the number of PUSCH repetitions.

Alternatively, in the step of allocating the PUSCH (e.g., PUSCH resource), the MAC RAR (or fallback RAR) may implicitly indicate to the terminal the number of PUSCH repetitions.

Method 4.1-3: A TDRA default table A referenced by a MAC UL grant may be extended. The extended TDRA default table A may be referred to as a TDRA default table B. The TDRA default table B may indicate PUSCH time resources corresponding to the number of PUSCH repetitions. That is, information included in the TDRA default table B may indicate the number of PUSCH repetitions.

For example, the TDRA default table B may include (e.g., indicate) one or more of the SLIV(s), PUSCH mapping type(s), and index including two or more K2's. The number of SLIVs included in the TDRA default table B may be interpreted as the number of PUSCH repetitions. The number of PUSCH mapping types included in the TDRA default table B may be interpreted as the number of PUSCH repetitions.

As another example, the TDRA default table B may include one or more of SLIV(s), PUSCH mapping type(s), K2 (e.g., index including two or more K2's), and the number of PUSCH repetitions.

Method 4.1-4: In Method 4.1-3, a MAC RAR (or fallback RAR) may include a bit(s) indicating use (or selection) of the TDRA default table A or the TDRA default table B. The size of the corresponding bit(s) may be one.

The terminal may identify a TDRA default table (e.g., TDRA default table A or TDRA default table B) referenced for PUSCH transmission based on the information (e.g., additional 1 bit) included in the MAC RAR (or fallback RAR) received from the base station.

The information included in the MAC UL grant of the MAC RAR (or fallback RAR) may indicate the TDRA default table used for repeated transmission of the PUSCH. In this case, the terminal may refer to the TDRA default table indicated by the information included in the MAC UL grant for repeated transmission of the PUSCH. The TDRA default table may include information indicating the number of repetitions of Msg3 or MsgA.

The base station may indicate (e.g., configure) the TDRA table or TDRA list for interpreting the TDRA of the PUSCH to the terminal using system information. For example, if an SIB1 not including pusch-configCommon is received from the base station, the terminal may determine that the TDRA default table A is used, and may derive the TDRA of the PUSCH from the TDRA default table A. Alternatively, when an SIB1 including pusch-configCommon is received from the base station, the terminal may identify the TDRA of the PUSCH by referring to the TDRA table (or TDRA list) indicated by pusch-configCommon. The TDRA index included in the RAR UL grant may be associated with a different table according to the SIB1.

Method 4.1-5: A TDRA list included (or indicated) in pusch-configCommon may include information indicating the number of PUSCH repetitions. One TDRA index may indicate one or more of a PUSCH mapping type, SLIV, K2, and number of PUSCH repetitions.

The TDRA list included in pucch-configCommon may be utilized by a DCI of other scenarios as well as the RAR UL grant. For example, even when a DCI format 0_0 (e.g., cyclic redundancy check (CRC) of the DCI format 0_0) is scrambled with C-RNTI, MCS-C-RNTI, CS-RNTI, or TC-RNTI, the TDRA list referenced by the terminal may include the TDRA index indicating repeated transmission of the PUSCH (e.g., the number of PUSCH repetitions). The TDRA table referenced by the TDRA index included in the DCI (e.g., DCI format 0_0) may include information indicating the number of PUSCH repetitions (e.g., Msg3 or MsgA). These methods will be described in detail in the exemplary embodiments below.

When the PUSCH is repeatedly transmitted, the size (e.g., TB size) of the PUSCH (e.g., PUSCH message) may be derived by using an MCS, time resource, and/or frequency resource indicated by the MAC RAR (or fallback RAR). Alternatively, the size of the PUSCH may be indicated (e.g., configured) to the terminal by higher layer signaling.

Meanwhile, a message type (e.g., Messagetype) of a common control channel (CCCH) (e.g., CCCH1) included in the PUSCH may be configured. For example, the message type of the CCCH may be classified into rrcSetupRequest, rrcResumeRequest, rrcReestablishmentRequest, rrcSystemInfoRequest, and the like. The message type of the CCCH1 may be classified into rrcResumeRequest1 and the like. When one message type is indicated, a cause, which is a field value specifying the message type, may be determined. For example, when rrcSetupRequest is indicated as the message type of the CCCH, EstablishmentCause which is a purpose of rrcSetupRequest may be indicated. When rrcResumeRequest is indicated as the message type of the CCCH, ResumeCause which is a purpose of rrcResumeRequest may be indicated. When rrcReestablishmentRequest is indicated as the message type of the CCCH, ReestablishmentCause which is a purpose of rrcReestablishmentRequest may be indicated. When rrcResumeRequest1 is indicated as the message type of the CCCH1, ResumeCause which is a purpose of rrcResumeRequest1 may be indicated.

Here, EstablishmentCause may have a value of one of emergency, highPriorityAccess, mt-Access, mo-Signalling, mo-Data, mo-VoiceCall, mo-VideoCall, mo-SMS, mps-PriorityAccess, and mcs-PriorityAccess. ResumeCause may have a value of one of emergency, highPriorityAccess, mt-Access, mo-Signalling, mo-Data, mo-VoiceCall, mo-VideoCall, mo-SMS, ma-Update, mps-PriorityAccess, and mcs-PriorityAccess. ReestablishmentCause may have a value of one of reconfigurationFailure, handoverFailure, and otherFailure.

Method 4.1-6: When a PUSCH is repeatedly transmitted, causes of a CCCH (e.g., CCCH1) included in the PUSCH may be restricted, and one value among the restricted causes may be indicated to the terminal.

When limited to a specific service, a PUSCH may be repeatedly transmitted. For example, when a terminal located in an edge region performs an initial access procedure, rrcSetupRequest, rrcResumeRequest, ReestablishmentCause, or rrcResumeRequest1 may be indicated as a message type of a CCCH or CCCH1. Here, a cause may be indicated as one of all or part of values defined in the technical specification. When a terminal performs an initial access procedure to support voice over internet protocol (VoIP), a cause appropriate for the initial access procedure for VoIP may be indicated. For example, for the initial access procedure for VoIP, the cause may be selected from all or part of mo-Signalling, mo-Data, mo-VoiceCall, mo-VideoCall, and mo-SMS.

Alternatively, in Method 4.1-6, the cause may be indicated among some of existing causes, but a new cause restrictedly applied to repeated transmission of PUSCH may be introduced.

4.1.1 PUSCH Allocated by a Fallback DCI

After an RRC connection configuration between a terminal and a base station is completed, the terminal may transmit a PUSCH (e.g., Msg3) allocated by a fallback DCI (e.g., DCI format 0_0). Based on the technical specification, a time resource of the PUSCH may be determined based on a TDRA identified according to a search space in which the scheduling DCI is transmitted. Based on Tables 4 and 5 below, the terminal may obtain a TDRA list through a default A (e.g., TDRA default table A) or a default B (e.g., TDRA default table B). Tables 4 and 5 may show a DCI format 0_0 in a UE-specific search space and a PDSCH TDRA for a common search space. Alternatively, the terminal may use a TDRA list included in pusch-ConfigCommon or pusch-Config.

TABLE 4

| RNTI | PDCCH search space | pusch-ConfigCommon includes pusch-TimeDomain-AllocationList | pusch-Config includes pusch-TimeDomain-AllocationList | PUSCH time domain resource allocation to apply |
|---|---|---|---|---|
| PUSCH scheduled by MAC RAR as described in clause 8.2 of [6, TS 38.213] or MAC fallback RAR as described in clause X.Y of [6, 38.213] or for MsgA PUSCH transmission | | No | — | Default A |
| | | Yes | | pusch-TimeDomain-AllocationList provided in pusch-Config-Common |
| C-RNTI, MCS-C-RNTI, TC-RNTI, CS-RNTI | Any common search space associated with CORESET 0 | No | — | Default A |
| | | Yes | | pusch-TimeDomain-AllocationList provided in pusch-Config-Common |

Here, a TB may include at least the Msg3. The above-described method may be applied when a DCI format 0_0 scrambled with TC-RNTI is used. Alternatively, the above-described method may be applied also when a DCI format 0_0 scrambled with C-RNTI, MCS-C-RNTI, or CS-RNTI is used. When considering Msg3, an RRC connection between the terminal and the base station may not necessarily be configured.

Method 4.1-7: A TDRA index in a TDRA list included in pusch-ConfigCommon may explicitly indicate the number of PUSCH repetitions. For example, the TDRA index may include information explicitly indicating the number of PUSCH repetitions.

If some TDRA indexes in the TDRA list indicated by pusch-Config indicate the number of PUSCH repetitions, a scheduling DCI may be transmitted in an arbitrary common search space or UE-specific search space not associated with the CORESET 0. In this case, the above-described TDRA list may be applied. Accordingly, the base station may indicate to the terminal to repeatedly transmit the PUSCH by using an appropriate TDRA index.

In addition to the above cases, if the TDRA list is not indicated to the terminal by RRC signaling (e.g., pusch-ConfigCommon or pusch-Config), the terminal may apply a TDRA index according to the TDRA default table A or TDRA default table B. According to Method 4.1-7, when the PUSCH is allocated by the MAC RAR or MAC fallback RAR or when the scheduling DCI is transmitted in an arbitrary common search space or UE-specific search space associated with (or not associated with) the CORESET 0, the above-described operation may be performed.

For example, the TDRA list may include one or more of SLIV(s), PUSCH mapping type(s), and index including two or more K2's. The number of SLIVs and/or PUSCH mapping types included in the TDRA list may be interpreted as the number of PUSCH repetitions.

For example, the TDRA list may include the SLIV, PUSCH mapping type, K2, and/or the number of PUSCH repetitions.

4.2 PDSCH Allocated by an Initial Access Procedure and a Fallback DCI

When an RRC connection is not configured between a terminal and a base station, where an RRC connection is deactivated, or when an RRC connection is reconfigured, a PDSCH may be scheduled by a DCI format 1_0. In this case, in order to extend a coverage of the PDSCH, the base station may repeatedly transmit the PDSCH. That is, the terminal may repeatedly receive the PDSCH.

Method 4.2-1: A DCI format 1_0 may indicate repeated reception of a PDSCH.

A field (e.g., additional field) that explicitly indicates the number of PDSCH repetitions may be included in the DCI format 1_0. Alternatively, the number of PDSCH repetitions may be implicitly derived from a TDRA index for allocating

TABLE 5

| RNTI | PDCCH search space | pusch-ConfigCommon includes pusch-TimeDomain-AllocationList | pusch-Config includes pusch-TimeDomainAllocation-List | PUSCH time domain resource allocation to apply |
|---|---|---|---|---|
| C-RNTI, MCS-C-RNTI, TC-RNTI, CS-RNTI, SP-CSI-RNTI | Any common search space not associated with CORESET 0, DCI format 0_0 in UE specific search space | No | No | Default A |
| | | Yes | No | pusch-TimeDomainAllocation-List provided in pusch-ConfigCommon |
| | | No/Yes | Yes | pusch-TimeDomainAllocation-List provided in pusch-Config | the PDSCH. For example, the TDRA index of the PDSCH allocated by the DCI format 1_0 may refer to a TDRA table including a plurality of elements. Based on Tables 6 to 8 below, the TDRA table referenced by the terminal may be determined according to a multiplexing pattern of SS/PBCH block and CORESET and/or whether PDSCH-ConfigCommon and PDSCH-Config are configured. Tables 6 to 8 may show the PDSCH TDRA for the DCI format 1_0.

TABLE 6

| RNTI | PDCCH search space | SS/PBCH block and CORESET multiplexing pattern | PDSCH-ConfigCommon includes pdsch-TimeDomain-AllocationList | PDSCH-Config includes pdsch-TimeDomain-AllocationList | PDSCH time domain resource allocation to apply |
|---|---|---|---|---|---|
| SI-RNTI | Type0 common | 1 | — | — | Default A for normal CP |
| | | 2 | — | — | Default B |
| | | 3 | — | — | Default C |
| SI-RNTI | Type0A common | 1 | No | — | Default A |
| | | 2 | No | — | Default B |
| | | 3 | No | — | Default C |
| | | 1, 2, 3 | Yes | — | pdsch-TimeDomain-AllocationList provided in PDSCH-ConfigCommon |
| RA-RNTI, MSGB-RNTI, TC-RNTI | Type1 common | 1, 2, 3 | No | — | Default A |
| | | 1, 2, 3 | Yes | — | pdsch-TimeDomain-AllocationList provided in PDSCH-ConfigCommon |

TABLE 7

| RNTI | PDCCH search space | SS/PBCH block and CORESET multiplexing pattern | PDSCH-ConfigCommon includes pdsch-TimeDomain-AllocationList | PDSCH-Config includes pdsch-TimeDomain-AllocationList | PDSCH time domain resource allocation to apply |
|---|---|---|---|---|---|
| P-RNTI | Type2 common | 1 | No | — | Default A |
| | | 2 | No | — | Default B |
| | | 3 | No | — | Default C |
| | | 1, 2, 3 | Yes | — | pdsch-TimeDomain-AllocationList provided in PDSCH-ConfigCommon |
| C-RNTI, MCS-C-RNTI, CS-RNTI | Any common search space associated with CORESET 0 | 1, 2, 3 | No | — | Default A |
| | | 1, 2, 3 | Yes | — | pdsch-TimeDomain-AllocationList provided in PDSCH-ConfigCommon |

TABLE 8

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH time domain resource allocation to apply |
|---|---|---|---|---|---|
| C-RNTI, MCS-C-RNTI, CS-RNTI | Any common search space not associated with CORESET 0 UE specific search space | 1, 2, 3 | No | No | Default A |
| | | 1, 2, 3 | Yes | No | pdsch-TimeDomainAllocationList provided in PDSCH-ConfigCommon |
| | | 1, 2, 3 | No/Yes | Yes | pdsch-TimeDomainAllocationList provided in PDSCH-Config |

Method 4.2-2: In Method 4.2-1, some TDRA indexes of the TDRA default tables A, B, and/or C may be extended, and the extended TDRA index may include (e.g., indicate) the number of receptions of a PDSCH (e.g., the number of PDSCH repetitions).

In the TDRA default table, the TDRA index may indicate (e.g., include) an index (i.e., dmrs-TypeeA-Position) of the first symbol of a PDSCH DM-RS resource, a PDSCH mapping type, K0, S, and L. When Method 4.2-2 is applied, the TDRA index may additionally include (e.g., indicate) the number of PDSCH repetitions.

When the terminal repeatedly receives the PDSCH, a time resource for receiving the PDSCH may be two or more slots. When the number of PDSCH repetitions is K in a communication system supporting FDD, the terminal may receive the PDSCH in K consecutive slots. The same DM-RS starting symbol, mapping type (e.g., PDSCH mapping type), S, and L may be applied in each of the slots. K0 indicated by a DCI format 1_0 may indicate the first slot in which the PDSCH is received.

For convenience of description, a PDSCH occasion may consist of one or more PDSCH instances, and mapping of one PDSCH instance (e.g., PDSCH instance belonging to the same PDSCH occasion) may be the same within a slot.

Method 4.2-3: When some symbols of a PDSCH instance overlap with an SS/PBCH block and/or type0-PDCCH CSS set, the terminal may not receive the corresponding PDSCH instance.

In a communication system supporting TDD, a terminal may identify whether a PDSCH instance is received in consideration of a slot pattern. That is, it may be necessary to interpret a time window in which the PDSCH occasion is received at the terminal. The time window may vary depending on a search space set in which a DCI format 1_0 is received and/or whether a slot pattern is configured to the terminal. Alternatively, the time window may be independent of a search space set and/or slot pattern.

Method 4.2-4: In order to derive a valid PDSCH instance in Method 4.2-3, the terminal may use a common slot pattern (e.g., tdd-UL-DL-ConfigurationCommon) obtained from system information and a TDRA index. For example, the valid PDSCH instance may be determined based on the common slot pattern and/or the TDRA index.

Method 4.2-5: In order to derive a valid PDSCH instance in Method 4.2-3, the terminal may use a UE-specific slot pattern (e.g., tdd-UL-DL-ConfigurationDedicated) and a TDRA index. For example, the valid PDSCH instance may be determined based on the UE-specific slot pattern and/or the TDRA index.

In Methods 4.2-4 and 4.2-5, the terminal may assume that a PDSCH instance is received only in symbols configured as DL symbols. The terminal may assume that a PDSCH instance is not received in symbols configured as FL symbols or UL symbols.

In a method of counting the number of PDSCH repetitions, if a PDSCH instance is not received, the terminal may regard the PDSCH instance as being included in the counting of the number of PDSCH repetition. Alternatively, if a PDSCH instance is not received, the terminal may not regard the PDSCH instance as being included in the counting of the number of PDSCH repetitions. If the not-received PDSCH instance is regarded as being included in the counting of the number of PDSCH repetitions, a time window for the PDSCH occasion received by the terminal may be indicated by (only) a DCI format 1_0. When the number of receptions of the PDSCH instance is the same as a value indicated in the DCI format 1_0, the time window for the PDSCH occasion received by the terminal may be determined in consideration of not only the DCI format 1_0 but also the slot pattern.

4.3 PUCCH Used in an Initial Access Procedure

A base station may indicate (e.g., configure) a PUCCH resource set to a terminal using RRC signaling. In this case, one or more PUCCH resource sets may be indicated, and each of the PUCCH resource sets may include one or more PUCCH resources. The terminal may select a PUCCH resource set according to the number of UCI bits, and may select one PUCCH resource belonging to the selected PUCCH resource set. In this case, the base station may indicate a PUCCH resource index to the terminal using a specific field of DCI and/or RRC signaling.

When it is required to extend a UL coverage of the terminal, the number of PUCCH repetitions may be indicated by RRC signaling of the base station. In this case, the terminal may repeatedly transmit a PUCCH indicated by one PUCCH resource index.

When an RRC connection between the terminal and the base station is not configured, when an RRC connection therebetween is reconfigured, or when an RRC connection therebetween is configured, but information exchange therebetween is not sufficiently performed (e.g., when capability signaling is not performed), the terminal may not use the above-described PUCCH resource set. In this case, a separate PUCCH resource set may be provided to the terminal. For example, a PUCCH resource set defined in Table 9 below may be used. Table 9 may show PUCCH resource sets before dedicated PUCCH resource configuration.

TABLE 9

| Index | PUCCH format | First symbol | Number of symbols | PRB offset $RB_{BWP}^{offset}$ | Set of first CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

Based on Table 9, a PUCCH format 0 or 1 may be used, a bandwidth may be limited to one PRB, and at most 14 symbols may be used. In order to extend a UL coverage, the terminal may allocate a large transmit power. Alternatively, in order to extend a UL coverage, the terminal may transmit a PUCCH for a long time. For example, the terminal may repeatedly transmit the PUCCH. When the terminal is located in an edge region of the UL coverage and the transmit power of the terminal is increased, interference to other base stations by a signal/channel transmitted from the terminal may increase. Therefore, it may be preferable for the terminal to transmit the PUCCH for a long time rather than increasing the transmit power of the terminal.

According to Method 4.1-1, a procedure and/or parameter(s) applied to a RA procedure may be indicated by an SIB, and the procedure and/or parameter(s) may be indicated differently for the terminal located in an edge region. For example, first RA configuration information for a terminal not located in an edge region may be configured independently of second RA configuration information for a terminal located in an edge region. The number of PUCCH repetitions may be implicitly indicated by an SIB. The terminal may perform a measurement operation on a DL-RS (e.g., SS/PBCH block), and an RA procedure (e.g., first RA procedure or second RA procedure) different according to a result of comparison between a measured result (e.g., RSRP) and a threshold may be performed.

For example, the SIB may include information indicating the number of repetitions of a HARQ-ACK for a PDSCH (e.g., the number of repeated transmissions). Since the SIB includes information for a terminal not located in an edge region, information indicating the number of HARQ-ACK repetitions may be transmitted in another step of the RA procedure.

Method 4.3-1: A PDSCH (e.g., MAC RAR or fallback RAR) may include information indicating the number of PUCCH repetitions.

The MAC RAR (or fallback RAR) may include information indicating the number of repetitions of the HARQ-ACK for the PDSCH as well as a MAC UL grant.

The MAC RAR (or a fallback RAR) may be configured as shown in FIG. 28. One or more bits included in the MAC RAR (or fallback RAR) may indicate the number of repetitions of the HARQ-ACK for the PDSCH.

The MAC RAR (or fallback RAR) may indicate repeated transmission of the PUSCH. In this case, the MAC RAR (or fallback RAR) may include both the information indicating the number of PUSCH repetitions and information indicating the number of repetitions of the HARQ-ACK for the PDSCH.

Method 4.3-2: In Method 4.3-1, the number of repetitions of a PUSCH may be (re)used as the number of repetitions of a PUCCH for the PDSCH.

When the number of repetitions is indicated, the number of repetitions may be applied to both transmission of the PUSCH and transmission of the HARQ-ACK for the PDSCH. According to Method 4.3-2, the amount of bits additionally included in the MAC RAR (or fallback RAR) may be reduced.

Method 4.3-3: A PDSCH may include information indicating the number of repetitions.

A MAC protocol data unit (PDU) may include information corresponding to contention resolution and information on the number of repetitions (e.g., information on the number of repetitions of the HARQ-ACK for the PDSCH). In this case, there may be a problem in backward compatibility of the terminal.

Method 4.3-4: A scheduling DCI for allocating a PDSCH may include information indicating the number of repetitions.

The scheduling DCI may include one field indicating the number of repetitions of the HARQ-ACK for the PDSCH. For example, the PDSCH may be allocated by a DCI format 0_0 based on TC-RNTI. In this case, the scheduling DCI may further include information indicating the number of HARQ-ACK repetitions, and the base station may transmit the corresponding scheduling DCI to the terminal. To support this operation, when a DCI format 0_0 is scrambled by TC-RNTI, a reserved bit(s) may be additionally utilized. For example, a downlink assignment index (DAI) field may be reused. In this case, a value indicated by the DAI field may be interpreted as the number of repetitions of the HARQ-ACK.

Method 4.3-5: A PUCCH resource set (e.g., information of the PUCCH resource set) may include information indicating the number of HARQ-ACK repetitions.

When the terminal does not utilize the PUCCH resource set indicated by RRC signaling, the terminal may utilize a PUCCH resource set defined in the technical specification (e.g., PUCCH resource set defined in Table 9). In this case, repeated transmission of the HARQ-ACK for the PDSCH may not be indicated. The reason is that a format 0 or format 1 for the HARQ-ACK can be transmitted in (only) one slot in the PUCCH. According to Method 4.3-5, a time resource may be expressed as being extended in the PUCCH resource set defined in the technical specification. For example, the information of the PUCCH resource set may include information transmitted in two or more slots. For example, in Table 9, information indicating the number of HARQ-ACK repetitions may be additionally included.

Method 4.3-6: PUCCH resource information may include information indicating the number of HARQ-ACK repetitions.

For example, an index indicating a PUCCH resource belonging to the PUCCH resource set defined in Table 9 may include the number of HARQ-ACK repetitions. According to Method 4.3-6, the number of PUCCH repetitions (e.g., the number of HARQ-ACK repetitions) may be derived differently even in the same PUCCH resource set.

Alternatively, the number of PUCCH repetitions may also be indicated together with a slot (e.g., a sub-slot) in which the PUCCH is transmitted.

Method 4.3-7: An offset of a slot (e.g., sub-slot) in which a PUCCH is transmitted and the number of PUCCH repetitions may be indicated to the terminal in the form of an index.

The terminal may receive a DL-DCI and may identify an offset of a slot (e.g., sub-slot) in which a PUCCH is transmitted based on an index included in the DL-DCI. According to Method 4.3-7, the above-mentioned index may be extended. Based on the index indicated to the terminal by RRC signaling, the number of PUCCH repetitions as well as the offset of the slot (e.g., sub-slot) may be derived. The terminal may repeatedly transmit the PUCCH in slots (e.g., sub-slots) as many as the number of repetitions indicated by RRC signaling. In this case, the terminal may apply the same index (e.g., the same resource index) to each of the slots (e.g., sub-slots).

In a communication system supporting TDD, a terminal may identify whether a PUCCH instance is transmitted in consideration of a slot pattern. In this case, the terminal may need to interpret a time window in which the PUCCH occasion is received. The interpretation of the time window may vary according to a search space set in which a DCI format 1_0 is received and/or a slot pattern configured to the terminal. Alternatively, the interpretation of the time window may be independent of the search space set and/or slot pattern.

Method 4.3-8: In order to derive a valid PUCCH instance, the terminal may utilize a common slot pattern (e.g., tdd-UL-DL-ConfigurationCommon) included in system information received from the base station.

Method 4.3-9: In order to derive a valid PUCCH instance, the terminal may utilize a UE-specific slot pattern (e.g., tdd-UL-DL-ConfigurationDedicated).

In Methods 4.3-8 and 4.3-9, the terminal may assume that the PUCCH instance is transmitted only in symbols configured as UL symbols. The terminal may assume that a PUCCH instance is not transmitted in a symbol configured as an FL symbol, a symbol configured as a DL symbol, a symbol in which an SS/PBCH block is transmitted, and/or a symbol belonging to a type0-PDCCH CSS set.

In the method of counting the number of repetitions, if a PUCCH instance is not transmitted, the terminal may not include the not-transmitted PUCCH instance in the number of repetitions. When the number of transmissions of the PUCCH instance is the same as the value indicated in the DCI format 1_0, the time window for the PUCCH occasion may be determined in consideration of not only the DCI format 1_0 but also the slot pattern.

4.4 Time Resource Interpretation Method According to an RRC Connection State

When a PUSCH is repeatedly transmitted, not only the number of PUSCH repetitions but also a pattern of a slot in which the PUSCH is transmitted may be derived. When a terminal operates in the RRC_CONNECTED state, a base station may indicate (or configure) the number of repetitions and the slot pattern of the PUSCH to the terminal using RRC signaling. When the terminal operates in the RRC_IDLE or RRC_INACTIVE state, since the base station cannot perform RRC signaling to the specific terminal, the terminal may derive the number of repetitions and the slot pattern of the PUSCH by using system information.

In order to indicate the slot pattern to the terminal, a plurality of steps may be required. A common slot pattern (e.g., tdd-UL-DL-ConfigurationCommon) configured on a cell basis and a slot pattern (e.g., tdd-UL-DL-ConfigurationDedicated) configured on a terminal basis may be indicated (or, configured) to the terminal by RRC signaling. In addition, a DCI format 2_0 may indicate a pattern for some slots. Accordingly, the terminal using only the system information may derive a slot in which PUSCH transmission is possible using the common slot pattern. This operation may also be applied to the transmission operation of the PUCCH.

In order to indicate repeated transmission of the PUSCH, a MAC RAR (or fallback RAR) and/or fallback DCI (e.g., DCI format 0_0) may be used. Initial transmission of a Msg3 PUSCH (i.e., Msg3) may be indicated by the MAC RAR (or fallback RAR), and retransmission of the Msg3 PUSCH may be indicated by the fallback DCI.

In order to indicate repeated transmission of the PUSCH, a fallback DCI (e.g., DCI format 1_0) may be used. Transmission of a HARQ-ACK (e.g., PUCCH) for a Msg4 PDSCH (i.e., Msg4) may be indicated by the fallback DCI.

Method 4.4-1: When an RRC connection is not configured between a terminal and a base station, and the terminal repeatedly transmits a UL signal and/or channel (e.g., PUSCH or PUCCH), the terminal may derive a valid slot(s) in consideration of a common slot pattern, SS/PBCH block, and/or type0-PDCCH CSS set.

Here, the valid slot may mean a time resource including (only) UL symbols. The reason is that transmission of a PUSCH or PUCCH in a semi-static FL symbol may not be valid when only the common slot pattern is utilized. This operation may be similar to that of not using a semi-static FL symbol when a DCI format 2_0 is not received.

The number of repetitions may correspond to the number of slots in which the terminal actually performs transmission. The number of PUSCH repetitions (e.g., Msg3 or MsgA) may be determined based on the number of valid slots. For K repeated transmissions, K slots may be required in a communication system supporting FDD. In this case, if there are K valid slots, the terminal may repeatedly transmit the PUSCH (e.g., Msg3 or MsgA) K times. For K repeated transmissions, K or more slots may be required in a communication system supporting TDD. In this case, if there are K or more valid slots, the terminal may repeatedly transmit the PUSCH (e.g., Msg3 or MsgA) K times. This operation may be the PUSCH repetition type C.

Method 4.4-2: In Method 4.4-1, the PUSCH repetition type C may be applied.

Meanwhile, when an RRC connection between the terminal and the base station is configured or an RRC connection between the terminal and the base station is deactivated, the terminal may perform a PDSCH reception operation or a PUSCH transmission operation based on a received fallback DCI. Here, the PDSCH may be repeatedly received. This operation has been described in Method 4.2-1 and the like. In addition, a PUCCH including a HARQ-ACK for the PDSCH may be repeatedly transmitted. This operation has been described in Method 4.3-4, Method 4.3-5, and Method 4.3-6. Also, the PUSCH may be repeatedly transmitted. This operation has been described in Methods 4.1-7.

4.5 Frequency Resource Interpretation Method and Coherence Application Method

In an initial access procedure, a terminal may perform a separate RA procedure. For example, a base station may inform the terminal of the number of repetitions of a Msg3 PUSCH by using a UL grant belonging to a MAC RAR or a separate UL grant. The terminal may identify the number of repetitions of the Msg3 PUSCH based on the UL grant received from the base station, and may repeatedly transmit the Msg3 PUSCH to the base station.

The terminal may have ability to maintain coherence. Alternatively, the terminal may not have the ability to maintain coherence. The terminal may transmit an RRC signaling message including information indicating whether to support the ability to maintain coherence to the base station. In the RA procedure, the terminal may transmit to the base station information indicating whether repeated Msg3 PUSCH transmission is supported or information indicating whether repeated Msg3 PUSCH transmission is required. In addition, the terminal may transmit information indicating whether to support the ability to maintain coherence together with the above-described information to the base station. The terminal may maintain coherence during K repeated transmissions of the Msg3 PUSCH. K may be defined in technical specification. The reason is that the base station may not know the capability of the terminal in the initial access procedure.

In the separate RA procedure, the terminal may repeatedly transmit the Msg3 PUSCH. In this case, an inter-slot frequency hopping operation and an operation for coherence may be performed based on a combination of one or more methods among methods according to 2.2, 2.3, 2.4, and 2.5 described above.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving first random access (RA) configuration information and second RA configuration information from a base station;
   transmitting a Msg1 to the base station based on the second RA configuration information;
   receiving a Msg2, which is a response to the Msg1, from the base station; and
   repeatedly transmitting a Msg3 K times to the base station,
   wherein the first RA configuration information is used when a first condition is satisfied, the Msg3 is not repeatedly transmitted in a first RA procedure according to the first RA configuration information, the second RA configuration information is used when the first condition is not satisfied, the Msg3 is repeatedly transmitted in a second RA procedure according to the second RA configuration information, and K is a natural number.

2. The operation method according to claim 1, further comprising, before the transmitting of the Msg1, transmitting information indicating whether the terminal supports repeated transmission of the Msg3 to the base station.

3. The operation method according to claim 1, wherein a first RA preamble indicated by the first RA configuration information is distinguished from a second RA preamble indicated by the second RA configuration information, and the Msg1 is generated based on the second RA preamble.

4. The operation method according to claim 1, wherein a first physical random access channel (PRACH) occasion indicated by the first RA configuration information is same as a second PRACH occasion indicated by the second RA configuration information, and the Msg1 according to the second RA configuration information is distinguished from a Msg1 according to the first RA configuration information by a PRACH mask.

5. The operation method according to claim 1, wherein the first condition is a case in which a measurement result of a signal received from the base station exceeds a threshold, and the threshold is included in at least one of system information, the first RA configuration information, and the second RA configuration information.

6. The operation method according to claim 1, wherein the second RA configuration information includes information indicating K.

7. The operation method according to claim 1, wherein a number of start and length indicator values (SLIVs) included in a time domain resource assignment (TDRA) table referenced by an uplink (UL) grant included in the Msg2 indicates K.

8. The operation method according to claim 1, wherein K is indicated by an index included in a TDRA table referenced by a UL grant included in the Msg2.

9. The operation method according to claim 1, wherein a UL grant included in the Msg2 includes information indicating a TDRA table used for repeated transmission of the Msg3, and the TDRA table includes information indicating K.

10. The operation method according to claim 1, wherein K is determined based on a number of valid slots in which repeated transmission of the Msg3 is possible.

11. The operation method according to claim 1, further comprising receiving downlink control information (DCI) including information indicating K from the base station, wherein the Msg3 is repeatedly transmitted according to K indicated by the DCI.

12. An operation method of a base station in a communication system, the operation method comprising:
   generating first random access (RA) configuration information used when a first condition is satisfied;
   generating second RA configuration information used when the first condition is not satisfied;
   transmitting the first RA configuration information and the second RA configuration information to a terminal;
   receiving a Msg1 from the terminal based on the second RA configuration information;
   transmitting a Msg2, which is a response to the Msg1, to the terminal; and
   repeatedly receiving a Msg3 K times from the terminal,
   wherein the Msg3 is not repeatedly transmitted in a first RA procedure according to the first RA configuration information, the Msg3 is repeatedly transmitted in a second RA procedure according to the second RA configuration information, and K is a natural number.

13. The operation method according to claim 12, further comprising, before the receiving of the Msg1, receiving information indicating whether the terminal supports repeated transmission of the Msg3 from the terminal.

14. The operation method according to claim 12, wherein a first RA preamble indicated by the first RA configuration information is distinguished from a second RA preamble indicated by the second RA configuration information, and the Msg1 is generated based on the second RA preamble.

15. The operation method according to claim 12, wherein a first physical random access channel (PRACH) occasion indicated by the first RA configuration information is same as a second PRACH occasion indicated by the second RA configuration information, and the Msg1 according to the second RA configuration information is distinguished from a Msg1 according to the first RA configuration information by a PRACH mask.

16. The operation method according to claim 12, wherein the first condition is a case in which a measurement result of a signal received from the base station exceeds a threshold, and the threshold is included in at least one of system information, the first RA configuration information, and the second RA configuration information.

17. The operation method according to claim 12, wherein the second RA configuration information includes information indicating K.

18. The operation method according to claim 12, wherein a number of start and length indicator values (SLIVs) included in a time domain resource assignment (TDRA) table referenced by an uplink (UL) grant included in the Msg2 indicates K.

19. The operation method according to claim 12, wherein a UL grant included in the Msg2 includes information indicating a TDRA table used for repeated transmission of the Msg3, and the TDRA table includes information indicating K.

20. The operation method according to claim 12, wherein K is determined based on a number of valid slots in which repeated transmission of the Msg3 is possible.

* * * * *